(12) United States Patent
Larson et al.

(10) Patent No.: US 6,542,070 B1
(45) Date of Patent: Apr. 1, 2003

(54) TERMINAL FOR LIBRARIES AND THE LIKE

(75) Inventors: Roger D. Larson, Woodbury, MN (US); James E. Fergen, North St. Paul, MN (US); John E. Nelson, Woodbury, MN (US); Michael J. Kieffer, Apple Valley, MN (US); Gerald L. Karel, Maplewood, MN (US); Gerald G. Marsolek, South St. Paul, MN (US); Joseph E. Schwietz, Jr., Forest Lake, MN (US); Mitchell B. Grunes, Minneapolis, MN (US); Kathleen M. McLeod, London (CA); Richard M. Willems, South St. Paul, MN (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 0 days.

(21) Appl. No.: 09/713,445

(22) Filed: Nov. 15, 2000

Related U.S. Application Data

(62) Division of application No. 09/058,547, filed on Apr. 10, 1998.

(51) Int. Cl.[7] .................................................. G08B 9/00
(52) U.S. Cl. ............................ 340/286.01; 340/286.01; 340/286.02; 235/375; 235/470; 707/10; 710/8; 710/10
(58) Field of Search .................... 340/286.01, 286.02; 235/375, 470; 345/329, 331, 961; 707/1, 10; 710/8, 10; 700/1, 2, 3, 9

(56) References Cited

U.S. PATENT DOCUMENTS 3,686,637 A   8/1972  Zachar et al. ............. 340/172.5
4,141,078 A * 2/1979  Bridges, Jr. et al. ......... 235/375
4,153,931 A * 5/1979  Green et al. ................. 707/104
5,140,141 A   8/1992  Inagaki et al. .............. 235/462
5,288,980 A   2/1994  Patel et al. .................. 235/381
5,594,228 A   1/1997  Swartz et al. ............... 235/383
6,199,133 B1 * 3/2001  Schnell ....................... 710/110

FOREIGN PATENT DOCUMENTS

| DE | 34 09 023 | 9/1985 |
| EP | 0 099 469 | 2/1984 |
| EP | 0 121 810 | 10/1984 |
| EP | 0 349 284 | 1/1990 |
| EP | 0 364 676 | 4/1990 |
| EP | 0 372 716 | 6/1990 |
| GB | 2 217 887 | 11/1989 |

OTHER PUBLICATIONS

Rafferty, "An integrated library circulation control system", Systems Technology, Mar. 1983.
International Preliminary Examination Report.
Website information for ALS regarding a Self Service Library Terminal, pp. 1–3, 1998.

(List continued on next page.)

Primary Examiner—Julie Lieu
(74) Attorney, Agent, or Firm—Schiff Hardin & Waite

(57) ABSTRACT

A library terminal permits a user to execute a loan transaction without assistance. The library terminal (i) provides a visible scan line from a bar code reader indicating the correct positioning of the bar code on a circulating item, (ii) leads a user through a loan transaction, (iii) provides an explicit feedback to a user when an article has an improper position on the article receiving area, (iv) both checks out and checks in circulating items, (v) stores fonts in bit maps of screen displays instead of in a separate font memory, (vi) integrates a security marker reader, a printer, and a controller in the same housing, (vii) processes financial transaction related to the borrowing of circulating items, and/or (viii) displays actions for helping the user to correct errors in use of the terminal.

43 Claims, 36 Drawing Sheets

OTHER PUBLICATIONS

Article from Codeco ApS, Denmark regarding "Book Counter, Mark 2" including procedure and specification of product, Aug. 1997.

Brochure describing "Patron's Self Check–out & Check–In Book Terminals", Oct. 1991.

Advertisement for "3M™ Model 5220 SelfCheck System", 3M, 1997.

Advertisement for "3M™ SelfCheck System Software—Version 2.4", 3M, 1996.

Advertisement for "RapidCirc™II", Checkpoint Systems, Inc., 1997.

Advertisement from the Newcirc Technology brochure regarding "The Fast Track", (publication date unknown).

Brochure describing "Express Self–Service Check–Out Station", Knogo Corporation and system specifications, Feb. 1994.

"Knogo Express Library Self–Service Check–Out Station Owner's Manual", Knogo North America Inc., Nov. 1994, pp. 2–22.

Article describing "Library Freedom—Patron Self–Serve Check–Out", 4th Edition, 3M, 1991.

Brochure describing "3M ABC Automatic Book Circulation"terminal, 3M, Sep. 21, 1988 (with translation).

Brochure describing "Patron Self–Serve Check–Out/Check–In", Finland, Jan. 2, 1989.

Brochure describing "Kingsley Electronic Check Out/In Book System", Kingsley Library Equipment Co., (publication date unknown).

Brochure describing "Library Self–Booking System" translated Jun. 15, 1994.

Website information for "Fast Track" regarding The Latest Advance in Patron Self Service Technology, Vernon Library Supplies, Inc.

Rob McGee: "The University of Chicago Library's JRL 1000 Circulation Terminal and Bar–Coded Labels", Journal of Library Automation, vol. 8, No. 1, Mar. 1975 (1975–03), pp. 5–25, XP000879375 USA.

* cited by examiner

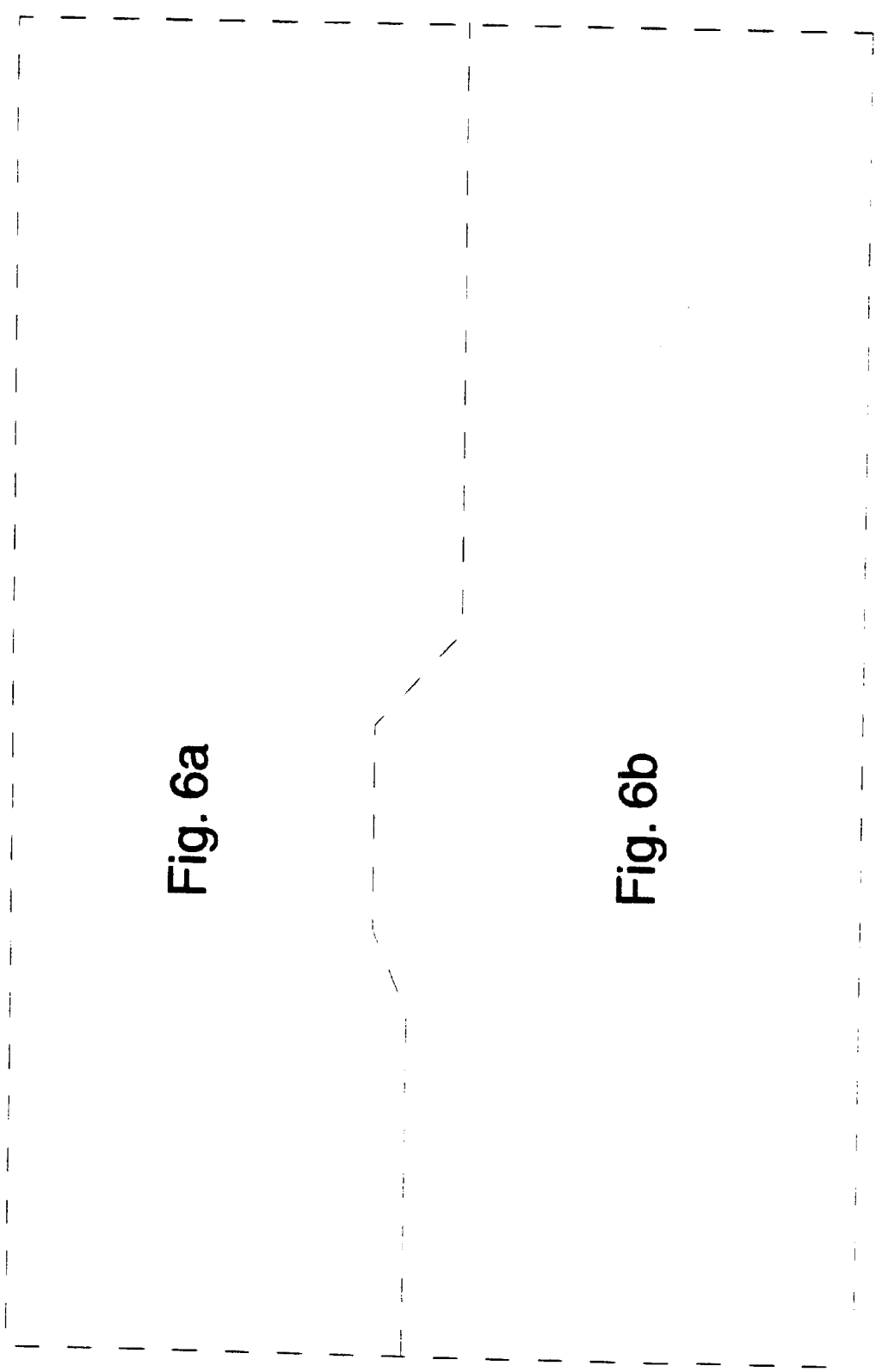

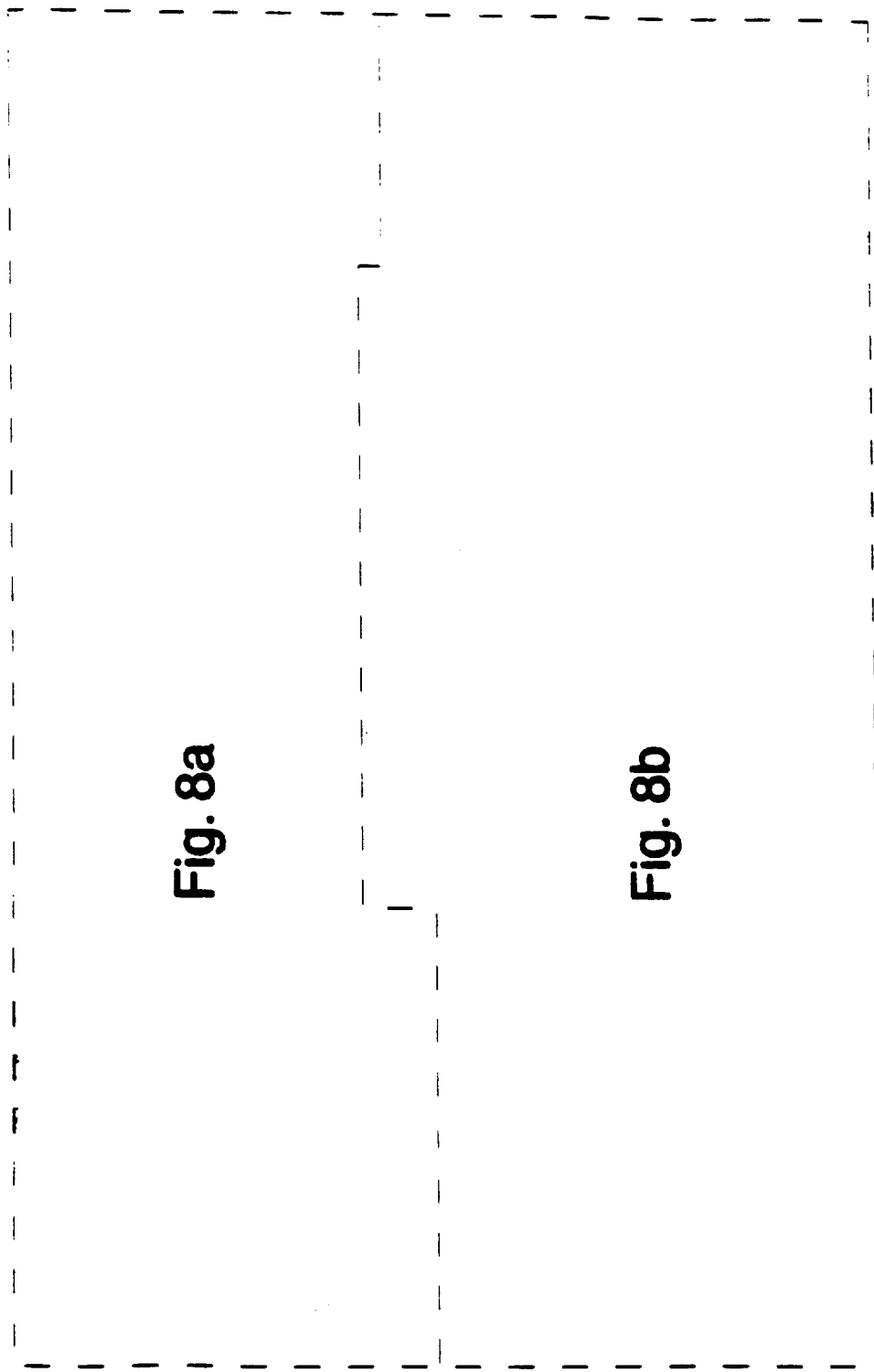

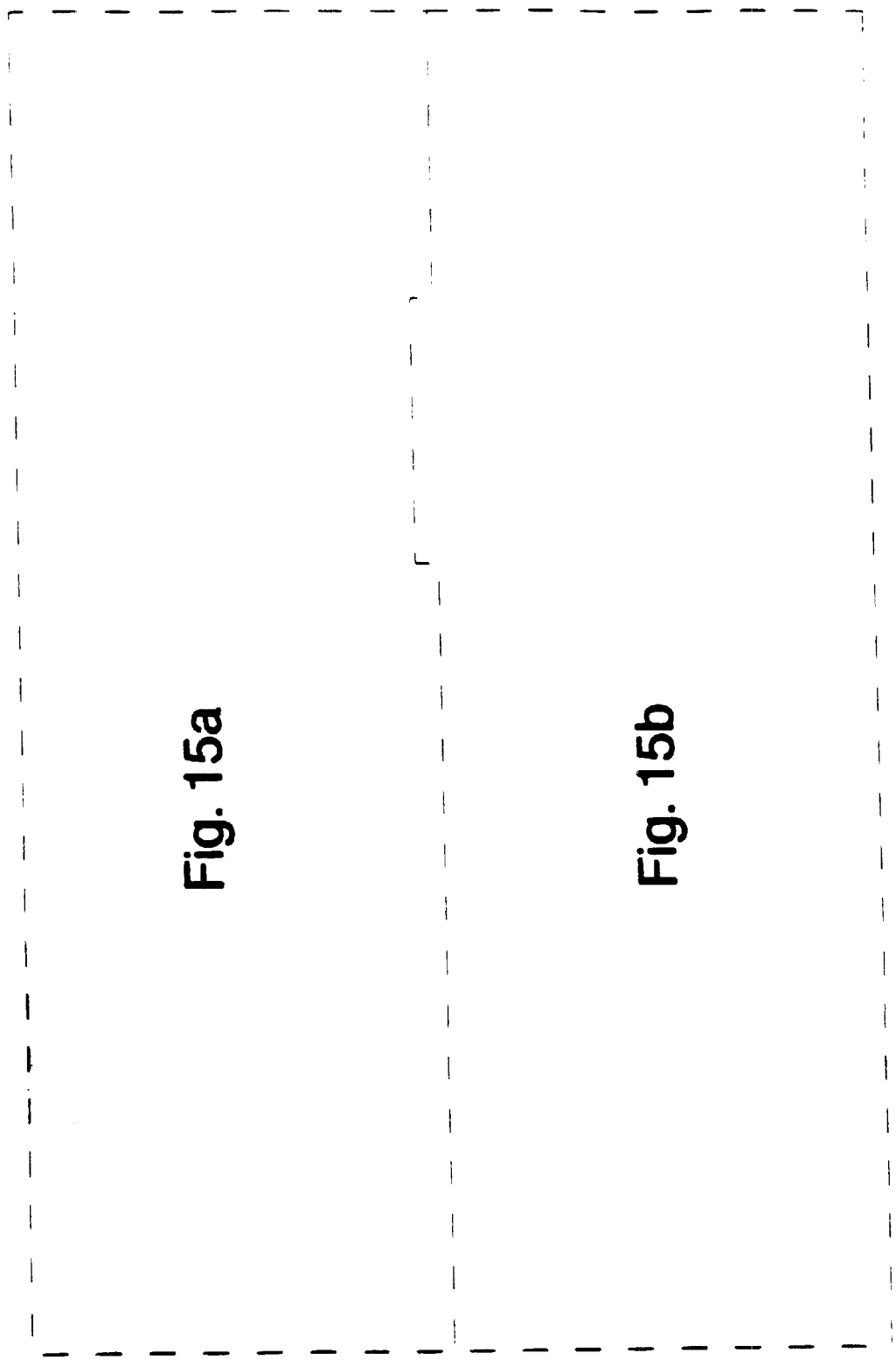

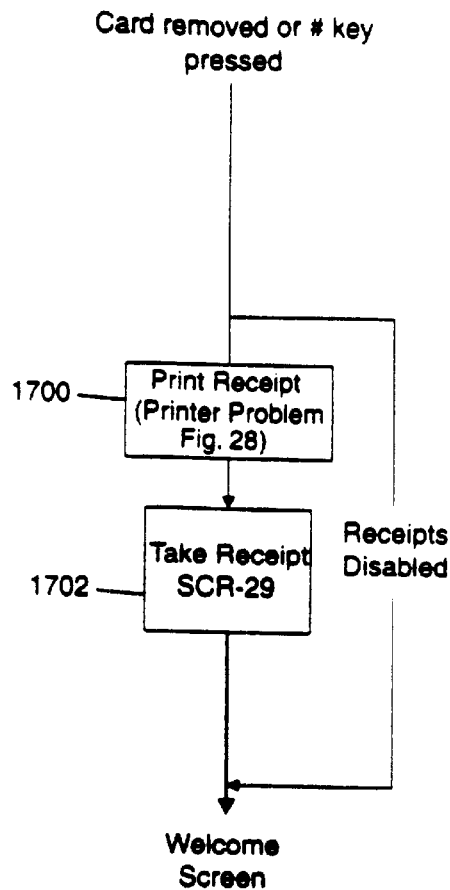
Fig. 21
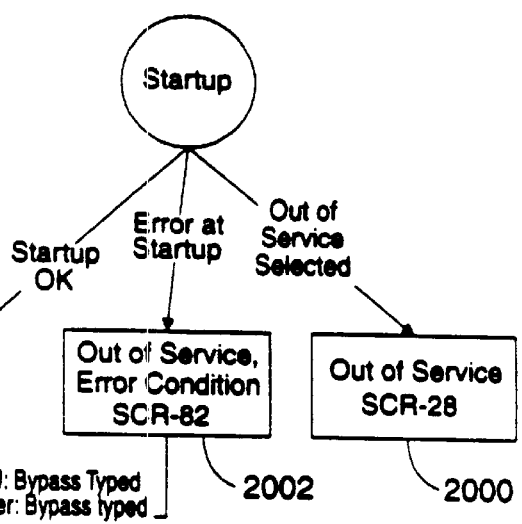
Fig. 24
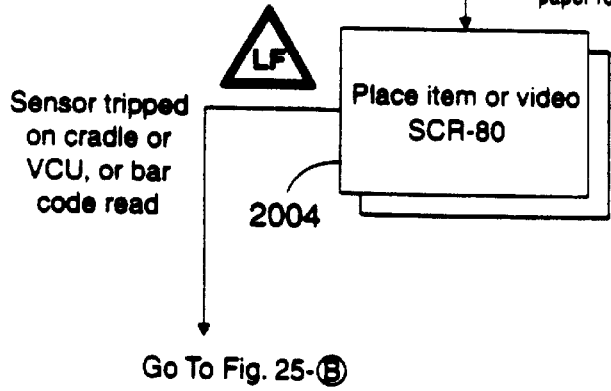

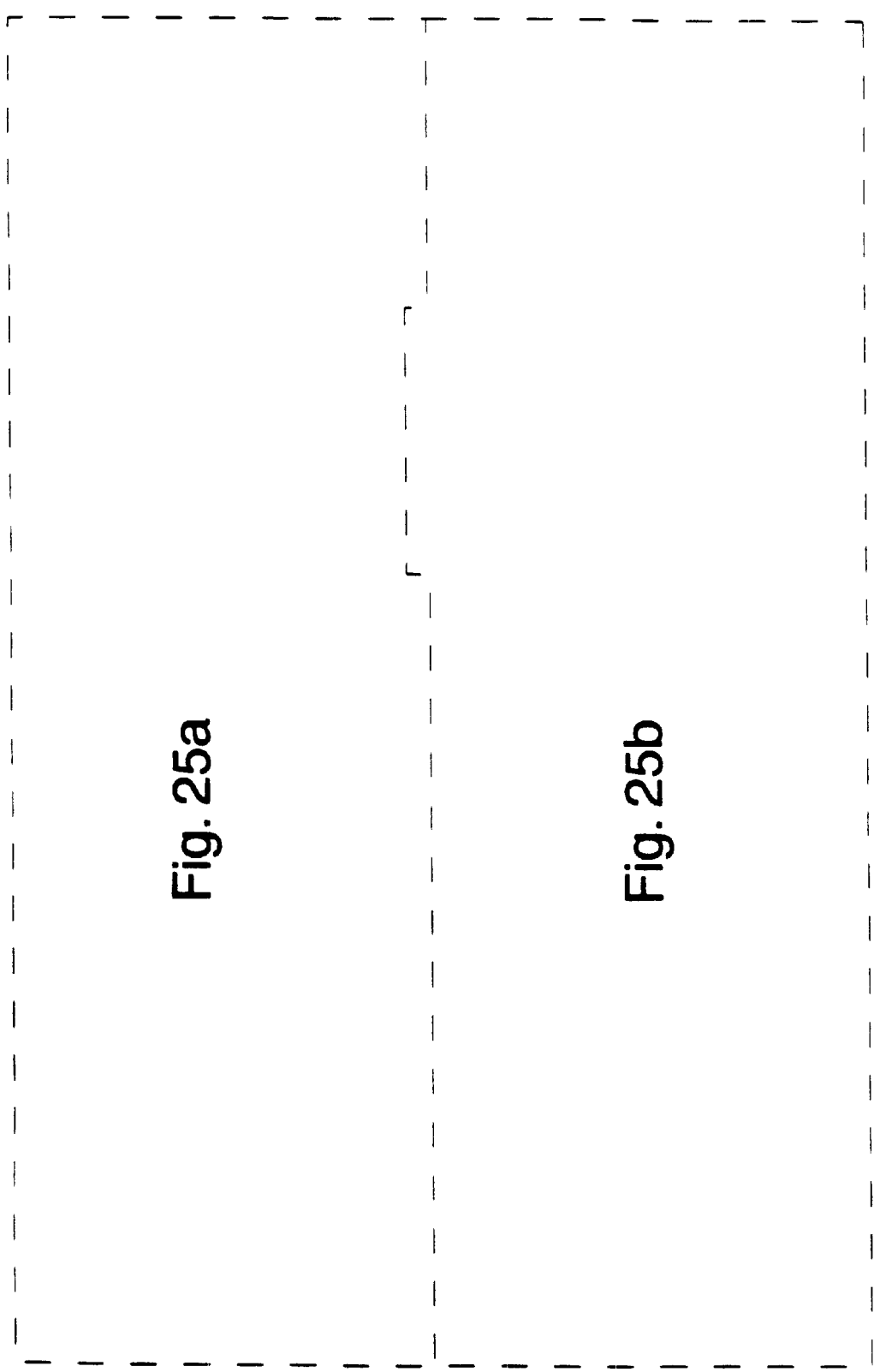

TERMINAL FOR LIBRARIES AND THE LIKE

This a divisional of U.S. application Ser. No. 09/058,547 filed Apr. 10, 1998.

TECHNICAL FIELD OF THE INVENTION

The present invention relates to a library terminal which may be used, for example, by borrowers to check circulating items out of, and/or to return circulating items to, a library.

BACKGROUND OF THE INVENTION

Many businesses and other enterprises are increasingly automating their systems in order to reduce operating cost and improve service. When such systems are used by the customers of these businesses and other enterprises, automation typically involves self-service facilities which allows customers to satisfy their own requirements. For example, financial institutions and library systems are beginning to use self-service terminals in order to reduce costs and to improve service. In the case of libraries, the libraries' patrons may use these self-service library terminals to conduct at least some of their business with the libraries.

Known self-service library terminals typically include a cradle on which circulating items to be checked out from, or returned to, a library can be placed. A scanner reads a code, such as a bar code, which has been placed on the circulating item by library staff and which identifies the circulating item. Typically the scanner projects a visible scan line in order to read the code. The visible scan line used by current scanners do little more than read codes, and are not arranged to provide information back to library patrons. Accordingly, known self-service library terminals are under-utilized.

Known self-service library terminals also do not lead a user through a loan transaction and do not provide feedback to the user regarding the proper use of the self-service library terminal. For example, known self-service library terminals do not indicate to the user when a circulating item has been placed in an improper position on the cradle.

Moreover, when known self-service library terminals are configured according to the specifications of a particular library, the configuration data is not conveniently generated and distributed to each of the self-service library terminals provided by a library. Accordingly, unnecessary expense and time consuming labor are required to configure the self-service library terminals of a library.

In addition, known self-service library terminals typically rely on only one circulating item receiving area, such as a cradle, in order to receive circulating items whose codes are to be scanned by the scanner during check out and/or check in. This limitation means that either current self-service library terminals are limited in the types of circulating items which can be checked out and/or checked in by the patron without the help of a member of the library staff, or library staff must be careful about the placement of codes on the circulating items and patrons must be careful about the placement of the different kinds of circulating items on the cradle so that their codes may be properly scanned.

Furthermore, known library self-service library terminals have many other limitations. For example, (i) known self-service library terminals do not process financial circuit transactions, (ii) they do not store loan transaction information during periods when the communication line between the terminal and the main circulation system of the library is down so that this loan transaction information can be later transferred to the main circulation system when the communication link is back up, (iii) they do not determine incorrect placement of a patron's library card on the cradle so that the identification of the patron processing a check out or check in transaction can be determined, and (iv) they do not permit a library patron to continue a transaction at the option of the patron if the self-service library terminal is in an error state.

The present invention is directed to a library terminal that solves one or more of the above noted problems.

SUMMARY OF THE INVENTION

In accordance with one aspect of the present invention, a library terminal comprises an article receiving area arranged to receive an article, a code reader arranged to read a code on the article when placed on the article receiving area, and a controller coupled to the code reader. The controller is arranged to control the code reader so as to project a visible indicator onto the article receiving area and so as to change the visible indicator between first and second visible states, and the controller is arranged to process a signal from the code reader corresponding to the code read by the code.

In accordance with another aspect of the present invention, a library terminal comprises a display, a transducer, a code reader arranged to read a code on an article involved in a loan transaction, and a controller coupled to the display, the transducer, and the code reader. The controller is arranged to control the code reader so as to read the code on the article, the controller is arranged to control the display so as to lead a user through the loan transaction, and the controller is arranged to control the transducer so as to provide an audible feedback having first and second on-states depending upon operation of the library terminal by the user.

In accordance with still another aspect of the present invention, a self-service library terminal comprises an article receiving area arranged to receive an article, a code reader arranged to read a code on the article when the article is placed on the article receiving area, and a controller coupled to the code reader. The controller is arranged to process signals from the code reader and to provide an explicit feedback to a borrower when an article has an improper position on the article receiving area.

In accordance with an additional aspect of the present invention, a method of the present invention is provided for the preparation of configuration data for multiple self-service library terminals. According to the method, the configuration data is stored in data storage memories of the multiple self-service library terminals. The multiple self-service library terminals are configured by the configuration data to interact with users during loan transactions. The method comprises the following steps: a) preparing the configuration data on an administration terminal; and b) transferring the configuration data from the administration terminal to the data storage memories of the multiple self-service library terminals.

In accordance with yet another aspect of the present invention, a library terminal comprises a monitor, a data storage memory storing screen displays, and a controller. The screen displays include fonts. The controller is arranged to control the display of the screen displays, including the fonts, on the monitor without performing font rendering from fonts stored separately from the screen displays.

In accordance with a further aspect of the present invention, a library terminal comprises a housing, an item receiving area incorporated in the housing, a video receiving area incorporated in the housing, a reader supported by the housing and arranged to read the circulating item and the video when the circulating item is placed in the item receiving area and when the video is placed in the video receiving area, and a controller. The item receiving area is arranged to receive a circulating item. The video receiver area is arranged to receive a video. The controller is contained with the housing, and the controller is coupled to the reader.

In accordance with still a further aspect of the present invention, a self-service library terminal comprises a reader and a controller. The reader is arranged to read identifications on articles involved in library loan transactions. The controller is arranged to process signals from the reader corresponding to the identifications read by the reader, and the controller is arranged to process financial credit transactions related to the library loan transactions and to remind a borrower of the borrower's account status.

In accordance with yet a further aspect of the present invention, an arrangement comprises a self-service library terminal, a circulation system, and a communication link. The communication link couples the self-service library terminal to the circulation system. The self-service library terminal has a controller arranged to process a loan transaction of a borrower of a circulating item. The controller stores the loan transaction during a period when the communication link between the self-service library terminal and the circulation system is down, and the controller transfers the stored loan transaction from the self-service library terminal to the circulation system during a period when the communication link between the self-service library terminal and the circulation system is not down.

In accordance with an additional aspect of the present invention, a library terminal comprises a card receiving area arranged to receive a library card, a card reader arranged to read the library card when the library card is placed on the card receiving area, and a controller coupled to the card reader. The controller is responsive to the card reader in order to determine incorrect library card placement on the card receiving area.

In accordance with a further additional aspect of the present invention, a library terminal comprises a circulating item receiving area arranged to receive a circulating item, a scanner arranged to scan the circulating item when the circulating item is placed on the circulating item receiving area, and a controller coupled to the scanner. The controller is responsive to the scanner in order to determine when the circulating item is in the circulating item receiving area but is not in a reference position.

In accordance with still a further additional aspect of the present invention, a library terminal comprises a first circulating item receiving area arranged to receive a first circulating item of a first type, a first scanner arranged to read the first circulating item when the first circulating item is placed in the first circulating item receiving area, a second circulating item receiving area arranged to receive a second circulating item of a second type, a second scanner arranged to read the second circulating item when the second circulating item is placed in the second circulating item receiving area, and a controller coupled to the first and second scanners. The first and second types are different. The controller is responsive to the first scanner in order to determine when the second circulating item is placed on the first circulating item receiving area.

In accordance with yet a further additional aspect of the present invention, a self-service library terminal comprises a controller and a display. The controller is arranged to detect an error state of the self-service library terminal and, while the self-service library terminal is in the error state, to notify a user through use of the display that the user may continue a transaction at the option of the user.

BRIEF DESCRIPTION OF THE DRAWINGS

These and other features and advantages of the present invention will become more apparent from a detailed consideration of the invention when taken in conjunction with the drawings in which:

FIG. 21 illustrates a session termination routine performed by the self-service library terminal illustrated in FIG. 1;

FIG. 24 illustrates a start up routine performed by the self-service library terminal illustrated in FIG. 1 where the self-service library terminal is arranged to process only checkins;

DETAILED DESCRIPTION

Figure 1:
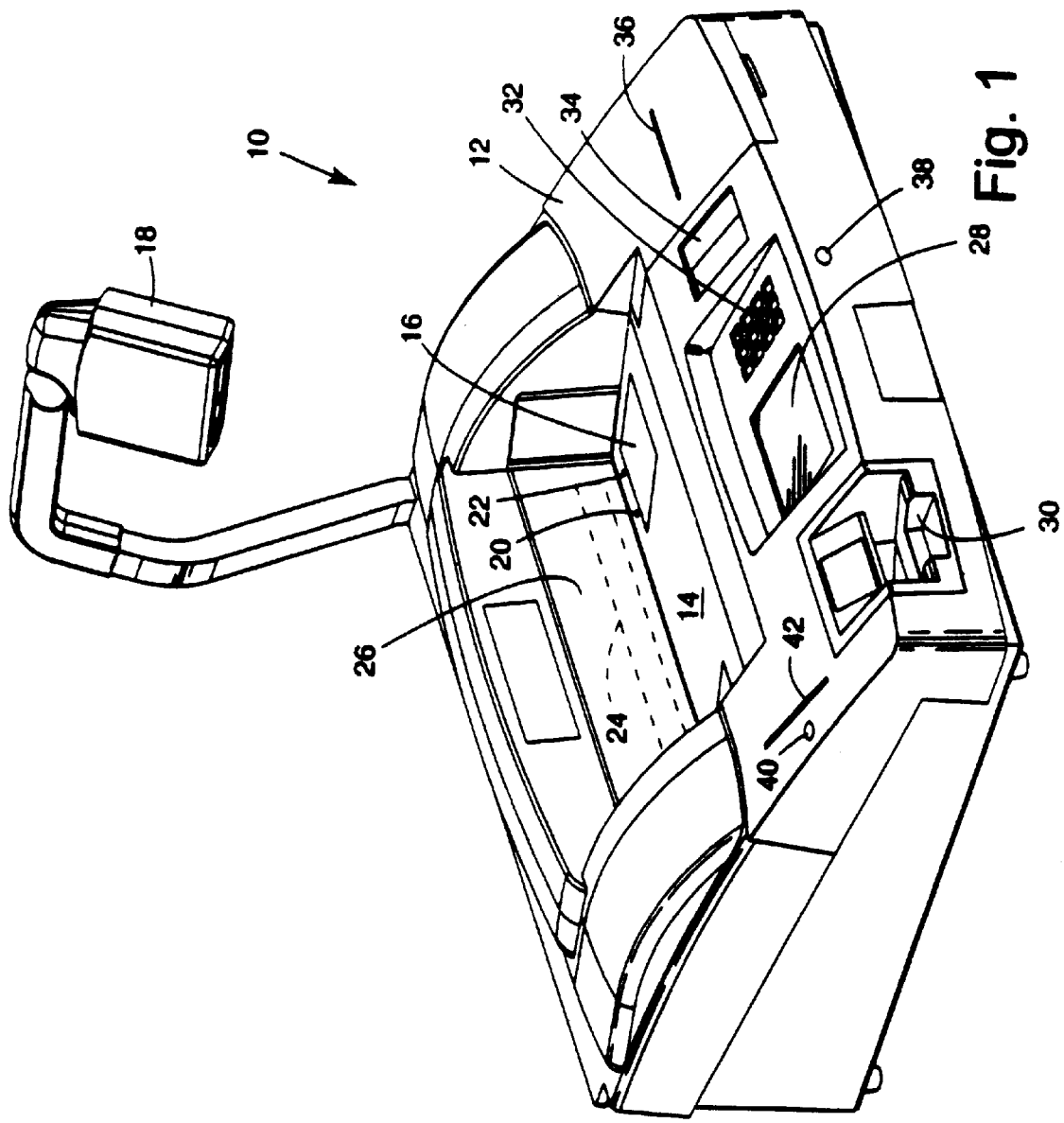
FIG. 1 illustrates a self-service library terminal according to the present invention.

A self-service library terminal 10 is illustrated in FIG. 1. The self-service library terminal 10 has a housing 12 forming a cradle 14, which also may be referred to as a first circulating item receiving area. The cradle 14 is arranged to receive a circulating item such as a book, a magazine, a CD, and/or the like, and has an idle indicator 16. The idle indicator 16, for example, may be a bar code, may be referred to herein as a default bar code, and may be provided in a card holder of the cradle 14. This card holder may be used by the library patron to hold the patron's library card when the patron is entering the patron's ID at the beginning of a loan transaction. A reader 18 is supported on the housing 12 and is arranged to read item identifiers or codes, such as bar codes, on the circulating items and library cards placed on the cradle 14. For example, the reader 18 may be a scanner such as a bar code scanner. The reader 18 also reads the idle indicator 16 in order to determine, for example, when the library card or a circulating item is or is not on the cradle 14. The reader 18 may additionally be arranged to read other features, such as dimensions, of a library card and/or a circulating item.

Photoelectric sensors 20 and 22 are suitably affixed to the cradle 14 and are used to sense circulating items on the cradle 14. For example, when the reader 18 reads the idle indicator 16 on the cradle 14, and neither of the photoelectric sensors 20 and 22 is covered, the self-service library terminal 10 determines that a circulating item is not placed on the cradle 14. On the other hand, if the reader 18 reads the idle indicator 16 and one of the photoelectric sensors 20 and 22 is covered, or if the reader 18 does not read the idle indicator 16 and one or both of the photoelectric sensors 20 and 22 are covered, the self-service library terminal 10 determines that a circulating item is placed on the cradle 14 but is not in the proper position. Thus, a circulating item is in the proper position when its identifier on the circulating item is read by the reader 18 and both of the photoelectric sensors 22 and 20 are covered.

As is also known, a security marker may be provided in or on a circulating item. This security marker typically is a magnetic strip which is placed in the spine and/or along an edge of a circulating item. The security marker can be desensitized when a circulating item is properly checked out by a library patron so that exit scanners will not provide an alarm as the patron passes out of an exit of the library. On the other hand, if the security marker is not desensitized before the circulating item passes through the exit scanners, an alarm will be given to alert the library staff. During check in, the security marker of a circulating item is re-sensitized so that, if the circulating item is not properly checked out before an attempt is made to remove the circulating item from the library, an alarm will be given. Accordingly, the self-service library terminal 10 can include a sensitizer/desensitizer 24 which is provided in a back wall 26 of the housing 12 and which interacts with the security marker. For example, the security marker may be a magnetic security marker, and the sensitizer/desensitizer 24 may be arranged to magnetize or de-magnetize the magnetic security marker. The sensitizer/desensitizer 24 also may be arranged to read the magnetic state of the security marker during multiple book detection and/or to determine the appropriate sensitizing/desensitizing range of the sensitizer/desensitizer 24.

In order for the sensitizer/desensitizer 24 to operate properly, the portion of the circulating item having the security marker must be against the back wall 26 of the cradle 14. The item identifier which uniquely identifies a circulating item is placed by the library staff on the circulating item so that, when the reader 18 reads the item identifier on the circulating item, and when the photoelectric sensors 20 and 22 are covered, the portion of the circulating item having the security marker must be against the sensitizer/desensitizer 24. Thus, when the reader 18 fails to read either the item identifier of a circulating item or the idle indicator 16, and when the photoelectric sensors 20 and 22 are covered, then either the circulating item has been placed on the cradle 14 so that the portion of the circulating item having the security marker is not against the sensitizer/desensitizer 24, or the circulating item must be slid sufficiently along the back wall 26 to enable the reader 18 to read the item identifier on the circulating item.

In the case where the reader 18 is a scanner such as a bar code scanner, the visible scan line projected by the reader 18 may be used to indicate proper placement of the circulating item on the cradle 14 so that the identifier on the circulating item may be read. Thus, this scan line helps guide the patron in properly positioning the circulating item on the cradle 14. Also, the self-service library terminal 10 has a display 28 which is used to provide instructions to the patron regarding proper placement of a circulating item on the cradle 14 in response to feedback from the reader 18 and the photoelectric sensors 20 and 22. Also, the display 28 may be used to provide other information to the patron.

The self-service library terminal 10 may also be provided with a video slot 30, which may also be referred to as a second circulating item receiving area. The video slot 30 may be used to receive such circulating items as videos and the like. The self-service library terminal 10 further has a keypad 32, a magnetic stripe reader 34, a printer (not shown in FIG. 1), a printer slot 36, a proximity sensor 38, and an audible transducer 40. The keypad 32 may be used by a patron to enter appropriate data. The magnetic stripe reader 34 may be used, for example, to read a magnetic stripe on a patron's library card, debit card, credit card, or the like. The patron may present the magnetic stripe of a library card to the magnetic stripe reader 34 so that the patron processing a transaction at the self-service library terminal 10 may be identified. The magnetic stripe reader 34 may also be used to read a magnetic stripe on a patron's debit card or credit card in order to process a financial transaction involving the patron. The printer may be used to issue printed matter through the printer slot 36. For example, the printer may be used to print various items such as system diagnostics, receipts based on financial transactions conducted by library patrons, or receipts for circulating items being checked out indicating the date by which the circulating items should be checked in. The proximity sensor 38 may be used to detect when a library patron has approached the self-service library terminal 10, and the audible transducer 40 may be used to provide audible feedback to the patron. The housing 12 may also be provided with a cash slot 42 that may be used to receive and dispense cash involved in financial transactions. As shown in FIG. 1, the cash slot 42 is a separate box which is in communication with the self-service library 10 terminal by way of a connection in the rear of the housing 12. Alternatively, the cash slot 42 may be formed integrally with the self-service library 10.

Figure 2:
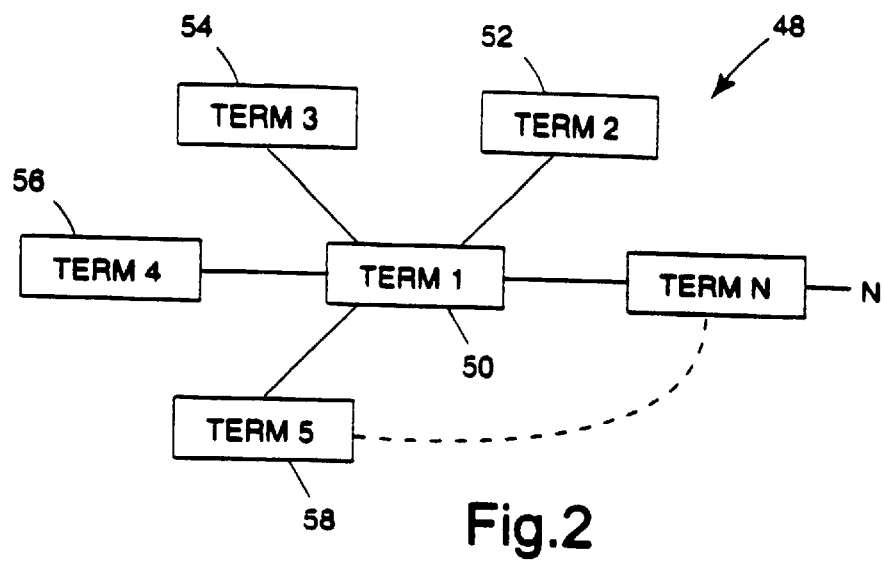
FIG. 2 illustrates a library system in which a plurality of library terminals are interconnected.

As shown in FIG. 2, a circulation system 48 of a library typically has multiple terminals some or all of which may be self-service library terminals such as the self-service library terminal 10 shown in FIG. 1. Accordingly, the circulation system 48 includes a data server 50 and a plurality of library terminals 52, 54, 56, 58, . . . n which, as shown in FIG. 2, are interconnected in a star configuration. However, it should be understood that the data server 50 and the library terminals 52, 54, 56, 58, . . . n may be instead interconnected in any network configuration. The data server 50 is at the hub of the star and, for example, may include the functions of a main circulation terminal and/or an administration terminal which are used by library staff in order to administer the circulating system 48 in which the library terminals 52, 54, 56, 58, . . . n are used. Indeed, for the discussion below, it is assumed that the data server 50 performs the function of an administration terminal. However, it should be understood that a separate administration terminal may be used.

Alternatively, the data server 50 may be a gateway permitting the other library terminals shown in FIG. 2 to communicate with one another. The other library terminals 52, 54, 56, 58, . . . n may be self-service library terminals such as the self-service library terminal 10 shown in FIG. 1.

Configuration data may be generated by use of one of the library terminals shown in FIG. 2. If the data server 50 performs the functions of an administration terminal, the configuration data can be generated there. On the other hand, if the data server 50 is also a gateway, one of the library terminals 52, 54, 56, 58, . . . n shown in FIG. 2 functioning as an administration terminal may be used in order to generate the configuration data. Alternatively, any of the library terminals 52, 54, 56, 58, . . . n may be used to generate the configuration data. As a still further alternative, all of the library terminals 52, 54, 56, 58, . . . n shown in FIG. 2 may be self-service library terminals.

The configuration data includes, for example, screen display formats. These screen display formats are used to generate screen displays in one or more languages which are then presented to the user on the display 28 shown in FIG. 1 depending upon the nature of the information to be conveyed to the user or depending upon the information which is to be elicited from the patron. The configuration data may also include receipt formats and message responses. Accordingly, the configuration data is generated using the designated library terminal and is then downloaded to the other library terminals of the circulation system 48.

Figure 3:
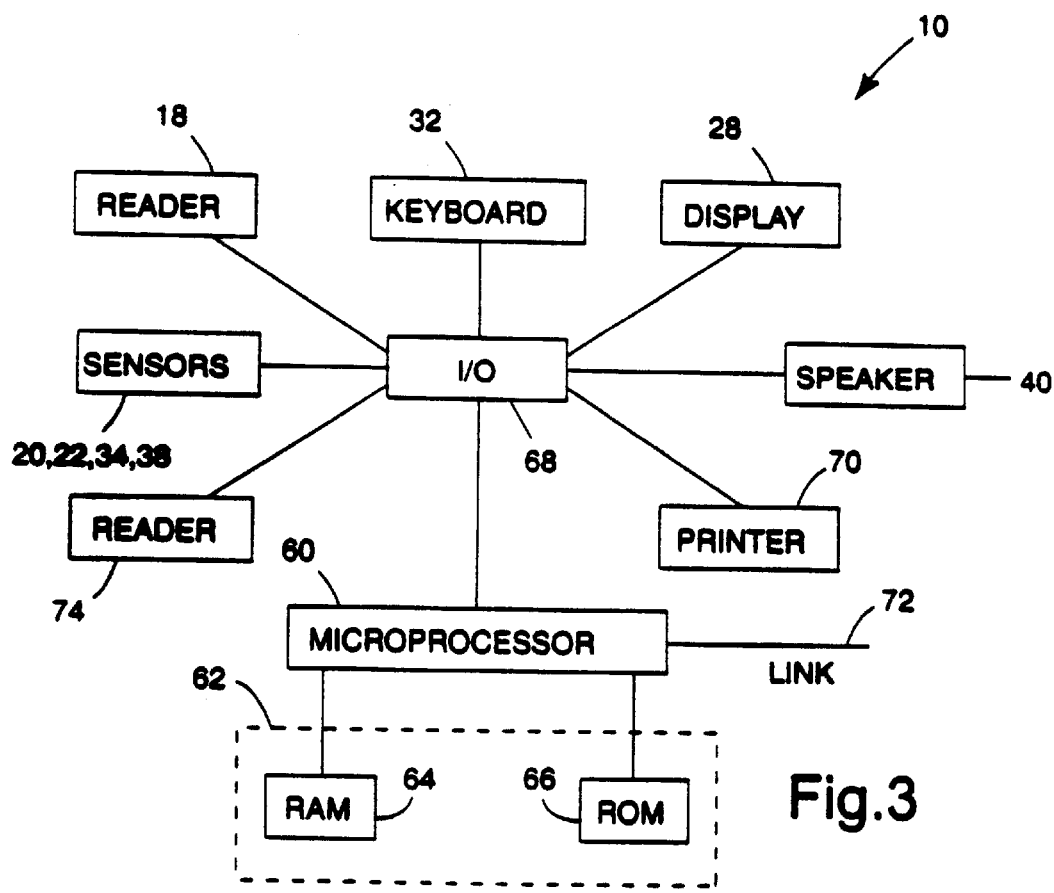
FIG. 3 illustrates an exemplary set of internal components for the self-service library terminal illustrated in FIG. 1.

The components housed by the housing 12 of the self-service library terminal 10 are illustrated in FIG. 3. As shown in FIG. 3, the self-service library terminal 10 includes a microprocessor 60 and a memory 62 associated therewith. The memory 62 may include, for example, a RAM 64 and a ROM 66. The microprocessor 60 also has I/O ports 68 in order to receive information from, and to provide information to, various devices. For example, the microprocessor 60 receives information from the reader t8, the photoelectric sensors 20 and 22, the keypad 32, the magnetic stripe reader 34, and the proximity season 38. The information from these devices is read by the microprocessor 60 through the I/O ports 68.

The microprocessor 60 also provides information to the display 28, the audible transducer 40, and the printer 70 through the I/O ports 68. Accordingly, the microprocessor 60, for example, provides screen displays and other information for display by the display 28, feedback and other information for transmission by the audible transducer 40, and information to be printed by the printer 70. A communication link 72 is provided so that the microprocessor 60 can transmit and receive information to and from other self-service library terminals and/or the data server 50. For example, the microprocessor 60 may be arranged to determine whether the communication link 72 is down at any time that it needs to communicate with the data server 50 over the communication link 72. During periods when the communication link 72 is down, the microprocessor 60 stores in the memory 62 any loan transaction information that it is required to communicate to the data server 50 so that this loan transaction information can be later transferred to the data server 50 when the communication lick 72 is back up. A reader 74, which may be similar to the reader 18 and which is housed in the housing 12, is provided for reading item identifiers on videos that are inserted by the library patron into the video slot 30.

Figure 4:
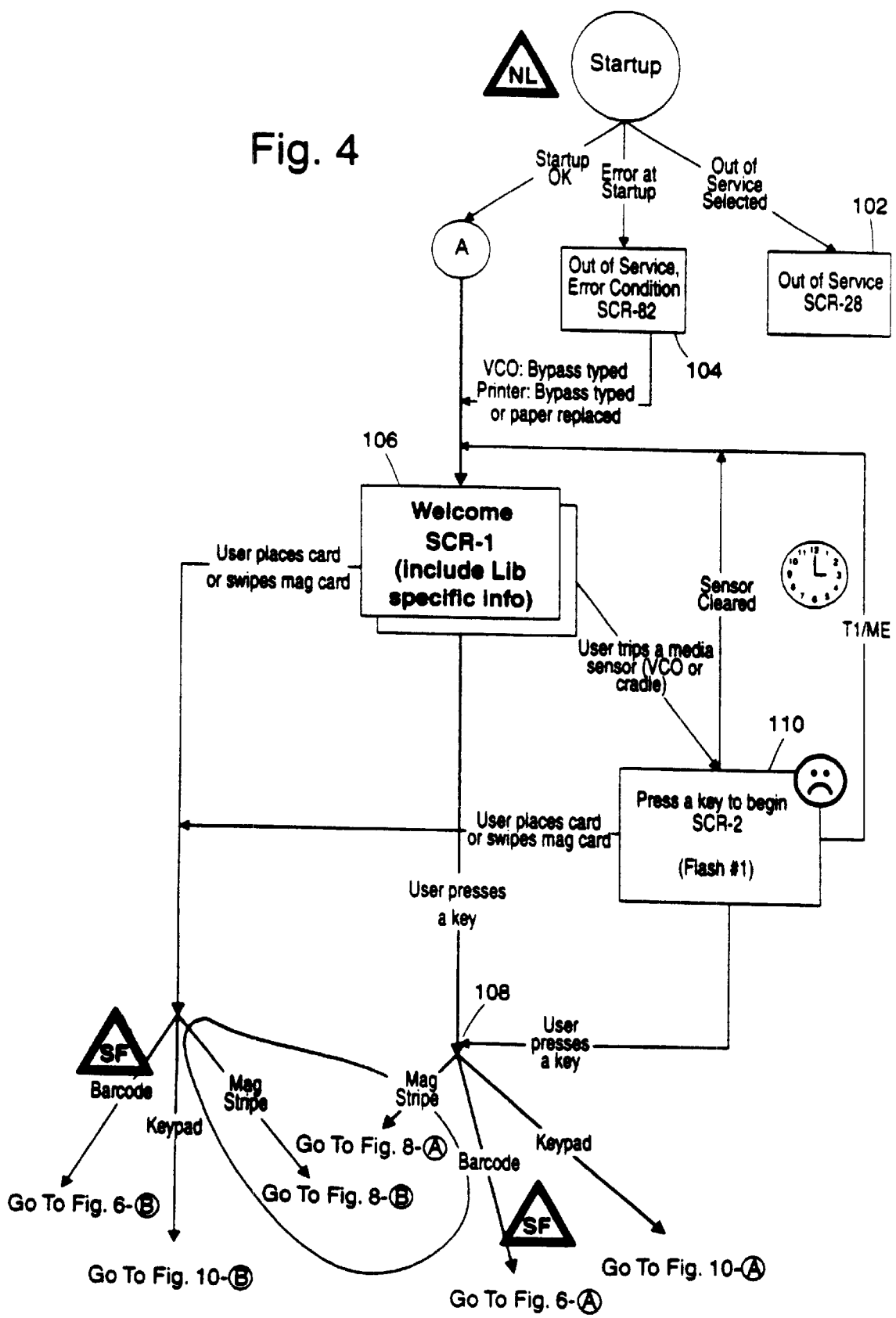
FIG. 4 illustrates a start up routing performed by the self-service library terminal illustrated in FIG. 1 where the self-service library terminal is arranged to process only checkouts.

The microprocessor 60 executes a program represented by the flow charts shown in FIGS. 4–29. The flow chart shown in FIG. 4 governs start-up of the self-service library terminal 10 when the self-service library terminal 10 is used only for checkout of circulating items. At start-up, if the staff of the library in which the self-service library terminal 10 is used determines that the self-service library terminal 10 is not to be used during a particular time period, then the microprocessor 60 at a block 102 retrieves an out-of-service screen display SCR-28 from the memory 62 and displays that out-of-service screen display on the display 28. On the other hand, if the microprocessor 60 detects an error at start up, then the microprocessor 60 as indicated by a block 104 retrieves an error condition out-of-service screen display SCR-82 from the memory 62 and displays this error condition out-of-service screen display on the display 28. As indicated in FIG. 4, the self-service library terminal 10 may be arranged to allow the patron to continue wader certain error conditions. The self-serve library terminal 10 may be arranged so that whether the patron is allowed to continue under certain error conditions is an option that the library staff can enable.

However, assuming that the staff of the library has not determined that the self-service library terminal 10 is not to be used during a particular time period, and assuming that the microprocessor 60 does sot detect an error at start up, or if the patron is allowed to continue even though there is an error, the microprocessor 60 at a block 106 retrieves a welcome screen SCR-1 from the memory 62 and supplies the welcome screen to the display 28.

The screen displays described herein may be stored as bit maps in the memory 62 and may be accessed from the memory 62 when needed.

This welcome screen SCR-1 may provide certain library specific information as designated by the staff of the library in which the self-service library terminal 10 is used. For example, the welcome screen may direct the patron to first enter the patron's identification by placing the patron's library card in the cradle 14 or by swiping the magnetic stripe on the patron's library card through the magnetic stripe reader 34 or by using the keypad 32. Alternatively, a screen saver initial screen may be presented on the display 28 to the patron directing the patron to press any key, upon which the welcome screen SCR-1 is presented to the patron. As a still further alternative, the welcome screen SCR-1 is not presented on the display 28 until a sensor, such as the proximity sensor 38, detects the presence of a patron at the self-service library terminal 10. As a yet further alternative, or in addition to any of the alternatives described above, the scan line projected by the reader 18 is changed from a first state to a second state. When a sensor, such as the proximity sensor 38, detects the presence of a patron at the self-service library terminal 10. For example, the first state may be off and the second state may be on or the first state may be steady and the second state may be blinking, or the first state may be blinking sad the second state may be steady, or the first state may be long and the second state may be short, or the first state may be short and the second state may be long, or the like.

The microprocessor 60 remains in the block 106 state until it detects that the patron (i) has placed the patron's library card in the cradle 14, or has presented the magnetic stripe on the patron's library card to the magnetic stripe reader 34, or has entered the patron's identification through use of the keypad 32, or (ii) has pressed an identification entry key of the keypad 32 indicating that the patron wishes to eater the patron's identification through use of the reader 18, the magnetic stripe reader 34, or the keypad 32, or (iii) has tripped a media sensor such as covering one or more of the photoelectric sensors 20 and 22 or covering the idle indicator 16. If the patron had places the patron's library card is the cradle 14, program flow proceeds to point B of FIG. 6. If the patron has entered the patron's identification through use of the keypad 32, program flow proceeds to point B of FIG. 10. If the patron has presented the magnetic stripe on the patron's library card to the magnetic stripe reader 34, program flow proceeds to point B of FIG. 8.

On the other hand, if the patron has pressed an identification entry key on the keypad 32, program flow proceeds to a point 108 is FIG. 4. Thus, if the patron has pressed a bar code identification entry key of the keypad 32 indicating that the patron wishes to enter the patron's identification through use of the reader 18, program flow proceeds to point A of FIG. 6. If the patron has pressed a keypad identification entry key of the keypad 32 indicating that the patron wishes to enter the patron's identification through use of the keypad 32, program flow proceeds to point A of FIG. 10. If the patron has pressed a magnetic stripe identification entry key of the keypad 32 indicating that the patron wishes to eater the patron's identification through use of the magnetic stripe reader 34, program flow proceeds to point A of FIG. 8.

If the patron has tripped a media sensor (such as by placing a circulating item on the cradle 14 to cover at least one of the photoelectric sensors 20 and 22), then the microprocessor 60 at a block 110 provides a sad tone (indicated by the sad face) through the audible transducer 40 and causes a screen display SCR-2 to be displayed to the library patron in which the library patron is requested to press one of the identification entry keys on the keypad 32 in order to begin a transaction or to clear the media sensor. If the patron presses one of the identification entry keys, program flow proceeds to point 108 of FIG. 4. If the library patron clears the sensor without pressing a key or taking some other action indicating the beginning of a transaction, program flow returns to the block 106. If the library patron takes no action at the block 110 for a predetermined amount of time as determined by a maximum event timer T1, program flow returns to the block 106.

Figure 5:
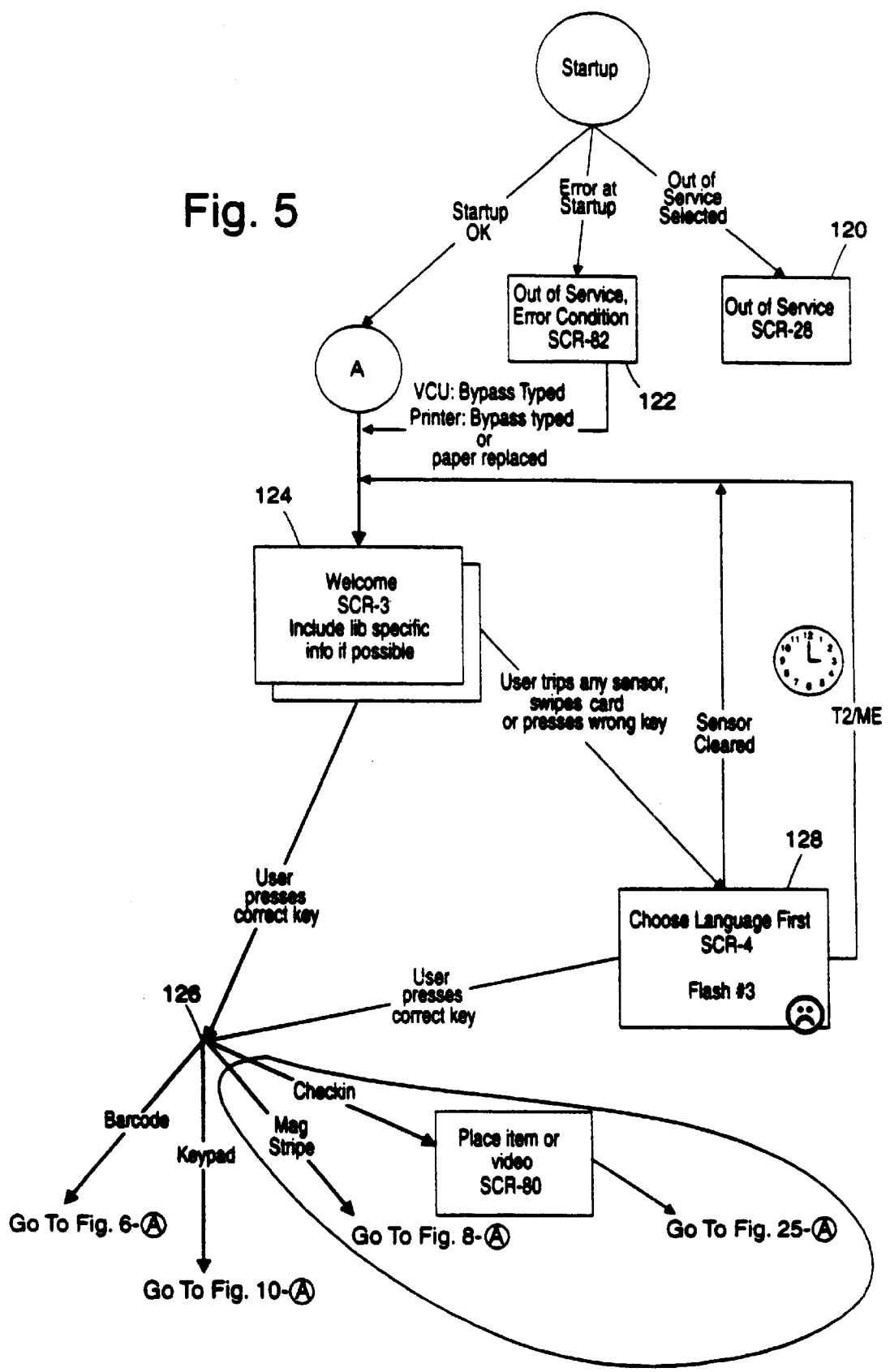
FIG. 5 illustrates an alternative start up routine which may be performed by the self-service library terminal illustrated in FIG. 1 when the terminal has multiple language capability and when the terminal is used for both checkout and checkin.

In the case where a library patron is allowed to choose a language in order to execute a check in and/or check out transaction using the self-service library terminal 10, the flow chart shown in FIG. 5 instead of the flow chart shown is FIG. 4 governs start-up of the self-service library terminal 10. As shown in FIG. 5, at start-up, if the staff of the library in which the self-service library terminal 10 is used determines that the self-service library terminal 10 is not to be used during a particular time period, then the microprocessor 60 at a block 120 retrieves the out-of-service screen display SCR-28 from the memory 62 and displays that out-of-service screen display on the display 28. On the other hand, if the microprocessor 60 detects an error at start up, then the microprocessor 60 as indicated by a block 122 retrieves the error condition out-of-service screen display SCR-82 from the memory 62 and displays this error condition out-of-service screen display on the display 28. (The screen displays SCR-28 and SCR-82 may provide the same out-of-service information in multiple languages.) As indicated in FIG. 4, the self-service library terminal 10 may be arranged to allow the patron to continue under certain error conditions.

However, assuming that the staff of the library has not determined that the self-service library terminal 10 is not to be used during a particular time period, and assuming that the microprocessor 60 does not detect an error at start up, or if the patron is allowed to continue even though there is an error, the microprocessor 60 at a block 124 retrieves a welcome screen from the memory 62 and supplies the welcome screen SCR-3 to the display 28.

This welcome screen SCR-3 may be in multiple languages, may instruct the patron to choose one of the multiple languages such that all subsequent screen displays will be in the chosen language, and may provide certain library specific information as designated by the staff of the library is which the self-service library terminal 10 is used. For example, the welcome screen SCR-3 may direct the patron to press an identification entry key. Alternatively, a screen saver initial screen may be presented on the display 28 directing the patron to press any key, upon which the welcome screen SCR-3 is presented to the patron. As a still further alternative, the welcome screen SCR-3 is not presented on the display 28 until a sensor, such as the proximity sensor 38, detects the presence of a patron at the self-service library terminal 10.

The microprocessor 60 remains in the block 124 state until it detects that the patron has pressed an identification entry key or a checkin indicating key of the keypad 32 (indicated in FIG. 5 as "correct key"), or has tripped a media sensor such as covering one or more of the photoelectric sensors 20 and 22 or covering the idle indicator 16. Pressing an identification entry key indicates that the patron wishes to eater the patron's identification through use of the reader 18, the magnetic stripe reader 34, or the keypad 32. If the patron has pressed an identification entry key or a checkin indicating key on the keypad 32, program flow proceeds to a point 126 in FIG. 5.

Figure 6A:
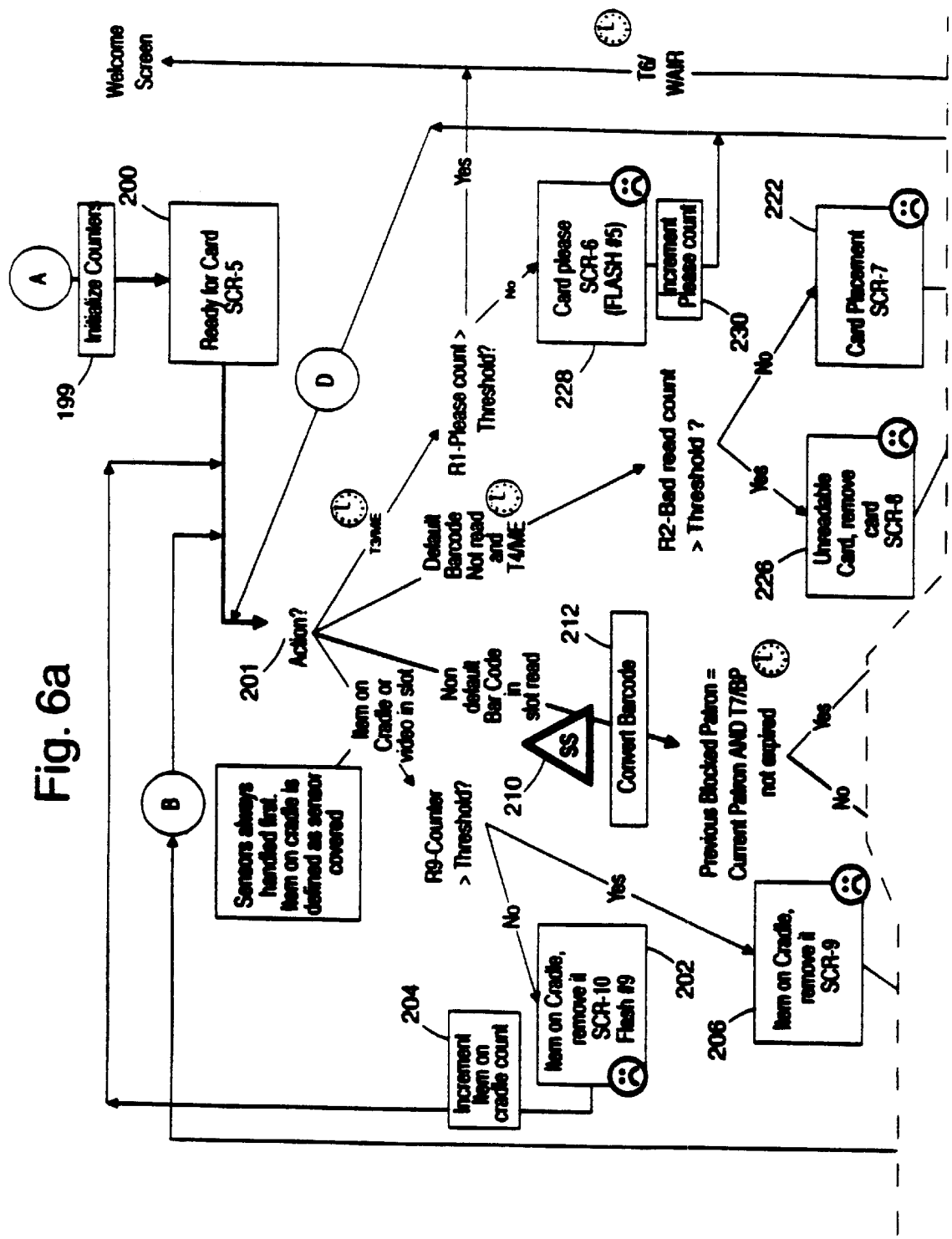
FIGS. 6–14 illustrate a patron identification routine performed by the self-service library terminal illustrated in FIG. 1.
Figure 6B:
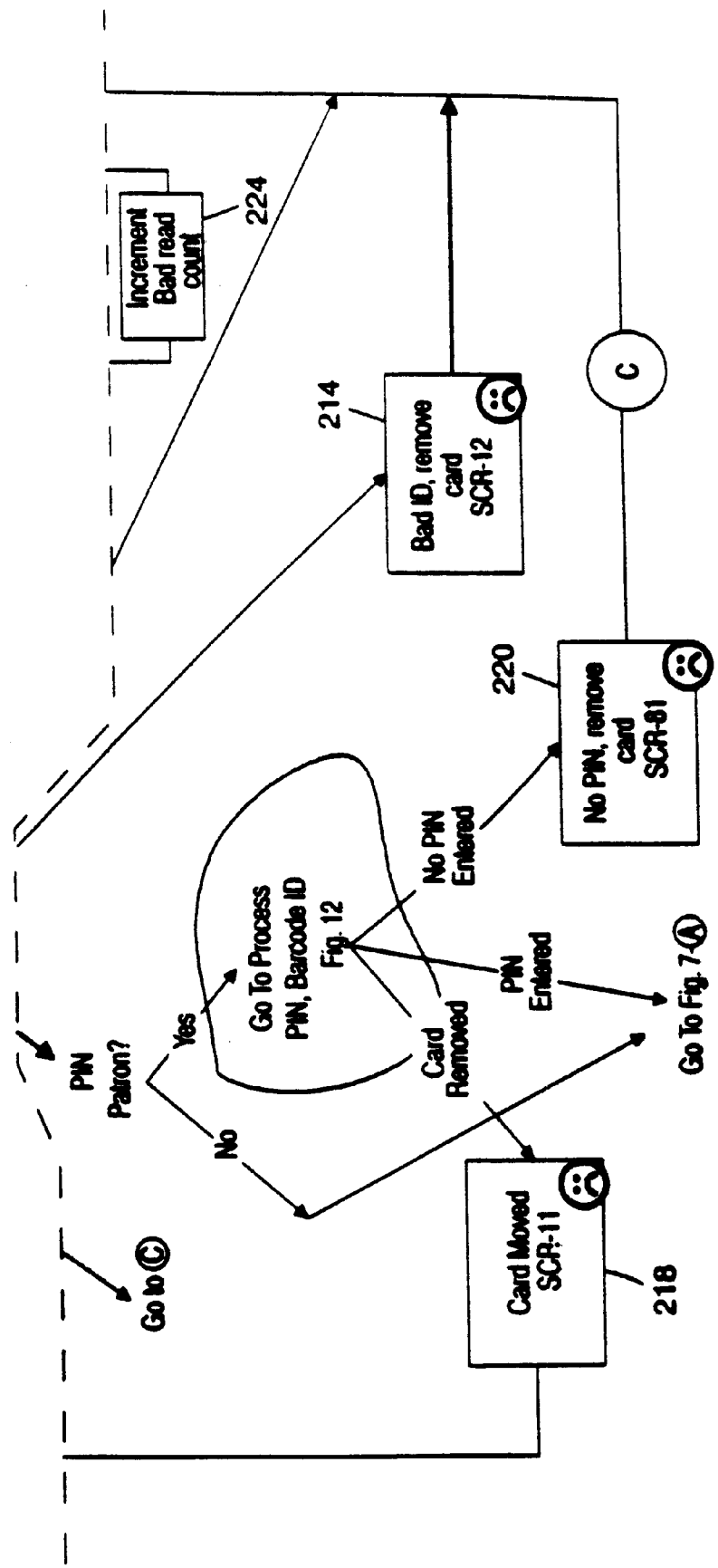

Thus, if the patron has pressed a bar code identification entry key of the keypad 32 indicating that the patron wishes to enter the patron's identification through use of the reader 18, program flow proceeds to point A of FIG. 6. If the patron has pressed a keypad identification entry key of the keypad 32 indicating that the patron wishes to enter the patron's identification through use of the keypad 32, program flow proceeds to point A of FIG. 10. If the patron has pressed a magnetic stripe identification entry key of the keypad 32 indicating that the patron wishes to enter the patron's identification through use of the magnetic stripe reader 34, program flow proceeds to point A of FIG. 8. If the patron has pressed the checkin indicating key, a screen display SCR-80 directing the patron to place a circulating item on the cradle or in the video slot 30 is provided on the display 28, and program flow proceeds to point A of FIG. 25.

If the patron has tripped a media sensor or has pressed the wrong key on the keypad 32, then the microprocessor 60 at a block 128 provides a sad tone through the audible transducer 40 sad causes a screen display SCR-4 to be displayed to the library patron. The screen display SCR-4 again instructs the patron to choose one of the multiple languages such that all subsequent screen displays will be in the chosen language. The screen display SCR-4 also requests the library patron to press a correct key on the keypad 32 in order to begin a transaction or to clear the media sensor. If the patron presses a correct key, program flow proceeds to the point 126 of FIG. 5. If the library patron clears the sensor without pressing a key or taking some other action indicating the beginning of a transaction, program flow returns to the block 124. If the library patron takes no action at the block 128 for a predetermined amount of time as determined by a maximum event timer T2, program flow returns to the block 124.

As described above, when a user begins a transaction at the self-service library terminal 10, the library patron must first be identified. FIGS. 6–14 illustrate the patron identification routine performed by the self-service library terminal 10. When the flow chart of FIG. 6 is entered through point A, the microprocessor 60 at a block 199 initializes all counters and at a block 200 causes a screen display SCR-5 to be displayed to the patron. This screen display indicates that the self-service library terminal 10 is ready for the library patron to place the patron's library card in the proper position on the cradle 14. On the other hand, when the flow chart of FIG. 6 is entered through point B, processing at the block 200 is bypassed because the patron's library card is already in the proper position on the cradle 14.

After the screen display SCR-5 is presented to the patron at the block 5, or if the flow chart of FIG. 6 is entered through point B, the microprocessor 60 at a point 201 determines which action is appropriate. If a circulating item instead of a library card has been first placed on the cradle 14 as determined by the particular identifier read by the reader 18 and/or the photoelectric sensors 20 and 22, and if an item-on-cradle counter R9 has a count not exceeding a predetermined threshold (hereinafter referred to as a predetermined R9 threshold), a screen display SCR-10 at a block 202 is presented to the library patron instructing the library patron to remove the circulating item from the cradle 14 and to instead place the patron's library card on the cradle 14. Also, the microprocessor 60 provides a sad tone through the audible transducer 40. The item-on-cradle counter R-9 is then incremented at a block 204, and program flow returns to the point 201 in order to determine the next appropriate action. If the count of the item-on-cradle counter R9 has exceeded the predetermined R9 threshold, however, then the microprocessor 60 at a block 206 provides a screen display SCR-9 to the library patron instructing the library patron to remove the item from the cradle 14 and indicating to the library patron that the library patron has exceeded the number of allowable attempts to put a library card on the cradle 14. Also, the microprocessor 60 provides a sad tone through the audible transducer 40 indicating improper operation. If the patron removes the item, program flow then returns through point C of FIG. 6 to the welcome screen. If the patron does not remove the item before a walkaway-item-removed timer T6 times out, program flow proceeds to the walkaway routine of FIG. 22.

If the action determined by the microprocessor 60 at the point 201 is that a bar code other than the idle indicator 16 is read by the reader 18, the scan line projected by the reader 18 is provided as a short solid (SS) scan line and, as indicated at a block 212, the bar code read by the reader 18 is converted into a format processable by the microprocessor 60. Thereafter, the microprocessor 60 determines whether the library patron identified by the bar code on the library card read by the reader 18 has previously been determined to be a blocked patron (i.e., a library patron who is not permitted to use library services through the self-service library terminal 10), and the microprocessor 60 also determines whether the time accumulated by a blocked patron timer T7 has exceeded a predetermined T7 threshold. If the current library patron is a blocked patron and the time accumulated by the blocked patron timer T7 has not reached the predetermined T7 threshold, the microprocessor 60 at a block 214 provides the patron with a screen display SCR-12 indicating that the patron has a bad library card and instructing the patron to remove the library card. Also, a sad tone is provided to the library patron. If the patron removes the library card before the walkaway-item-removed timer T6 times out, program flow returns to the welcome screen. However, if the walkaway-item-removed timer T6 times out before the patron removes the library card, program flow proceeds to the walkaway routine of FIG. 22.

If either the current library patron is not a blocked library patron, or the time accumulated by the blocked patron timer T7 has exceeded the predetermined T7 threshold, the microprocessor 60 determines whether the library patron identified by the library card has a personnel identification number (PIN). If the patron does not have a PIN, program flow proceeds to point A of FIG. 7. If the patron has a PIN, the microprocessor 60 executes the program represented by the program flow shown in FIG. 12 which returns PIN ENTERED, NO PIN ENTERED, or CARD REMOVED. If PIN ENTERED is returned, program flow proceeds to point A of FIG. 7. If CARD REMOVED is returned, then the microprocessor 60 at a block 218 provides a screen display SCR-11 informing the patron that the patron's library card has been removed. Also, a sad tone is provided to the library patron. Program flow then returns to point 201. If NO PIN ENTERED is returned, then the microprocessor 60 at a block 220 provides a screen display SCR-81 informing the patron that the patron did not enter a PIN and directing the library patron to remove the patron's library card. Also, a sad tone is provided to the library patron. If the patron removes the library card before the walkaway-item-removed timer T6 times out, program flow returns to the welcome screen. However, if the walkaway-item-removed timer T6 times out before the patron removes the library card, program flow proceeds to the walkaway routine of FIG. 22.

If the microprocessor 60 determines that the action is that the idle indicator 16 in not read by the reader 18 (indicating, for example, that there is an object on the cradle 14 but that a bar code is not being read from the object) and a maximum event timer T4 has accumulated a predetermined amount of time, the microprocessor 60 determines whether a bad-read counter R2 has a count greater than a predetermined R2 threshold. The maximum event time T4 times out if the patron places something on the cradle 14 so as to cover the idle indicator 16 but thereafter takes no action for the time allowed by the maximum event timer T4. If the bad-read counter R2 does not have a count greater than the predetermined R2 threshold, the microprocessor 60 at a block 222 causes a screen display SCR-7 to be displayed to the library patron requesting the patron to place the patron's library card on the cradle 14. Also, a sad tone is provided to the library patron. The bad-read counter R2 is incremented at a block 224, and program flow returns to the point 201.

On the other hand; if the bad-read counter R2 has a count greater than the predetermined R2 threshold, the microprocessor 60 at a block 226 causes a screen display SCR-S to be displayed to the library patron indicating that the patron's library card is unreadable and to remove the item. Thereafter, program flow returns to the welcome screen if the walkaway-item-removed timer T6 does not time out before the item is removed from the cradle 14. However, if the walkaway-item-removed timer T6 times out before the item is removed from the cradle 14, program flow proceeds to the walkaway routine of FIG. 22.

If the microprocessor 60 is at the point 201, and if a maximum event timer T3 has timed out before (i) an item is placed on the cradle 14 or an item identifier is read from a video in the video slot 30, (ii) an identifier on a library card is read by the reader 18 when a library card is in the card holder described above, and (iii) the idle indicator 16 is not read by the reader 18 and the maximum timer T4 times out, the microprocessor 60 determines whether a please counter R1 has a count that exceeds a predetermined R1 threshold. If the count of the please counter R1 has exceeded the predetermined R1 threshold, program flow returns to the welcome screen. However, if the count of the please counter R1 has not exceeded the predetermined R1 threshold, the microprocessor 60 at a block 228 provides a screen display SCR-6 requesting the patron to please place the library patron's library card on the cradle 14 in the correct position. The please counter R1 is incremented at a block 230, and program flow returns to the point 201.

Figure 7:
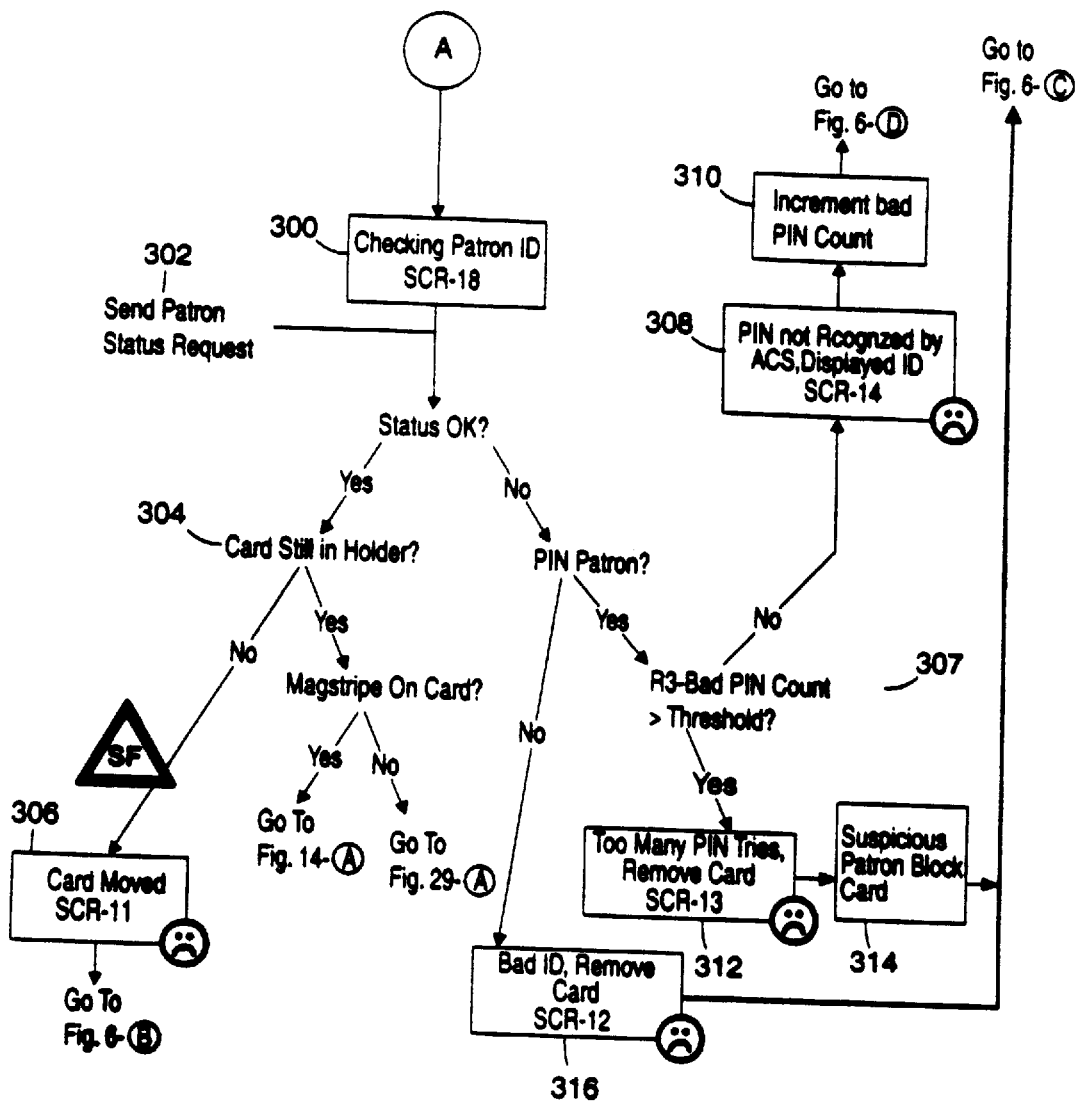

When the flow chart of FIG. 7 is entered through point A, the microprocessor 60 at a block 300 provides a screen display SCR-18 indicating that the library patron's identification is being checked. At a block 302, the self-service library terminal 10 transmits a patron'status request over the communication link 72 to the data server 50. If the status returned by the data server 50 to the self-service library terminal 10 indicates that the status of the library patron is acceptable, the microprocessor 60 determines at a point 304 whether the library card is still on the cradle 14 by sampling the output of the reader 18. If the library card is sot still on the library cradle 14, the scan line provided by the reader 18 is changed by the microprocessor 62 to a short flashing scan line SF, the microprocessor 60 at a block 306 provides a screen display SCR-11 indicating to the library patron that the patron's library card has been improperly moved, and program flow proceeds to point B of FIG. 6. However, if the microprocessor 60 determines that the library card of the library patron is still on the cradle 14 in the proper position, the microprocessor 60 determines whether the library card carries a magnetic stripe. For example, the microprocessor 60 may access the memory 62 for this information If the patron's library card has a magnetic stripe, program flow proceeds to point A of FIG. 14 in order to ensure that the library card is removed before any security markers in circulating items are sensitized or de-sensitized. If the patron's library card has no magnetic stripe, program flow proceeds to point A of FIG. 29.

If the status returned by the data server 50 to the self-service library terminal 10 indicates that the status of the library patron is not acceptable, the microprocessor 60 determines if the library patron has a PIN. If the patron has a PIN, the microprocessor 60 at a point 307 determines whether a bad-PIN counter R3 has accumulated a count exceeding a predetermined R3 threshold. If sot, the microprocessor 60 at a block 308 provides a screen display SCR-14 indicating that the PIN entered by the patron is not recognized by the library system, the bad-PIN counter R3 is incremented at a block 310, and program flow returns to the point D of FIG. 6.

However, if the count accumulated by the bad-PIN counter R3 has exceeded the predetermined R3 threshold, then the microprocessor 60 at a block 312 provides a screen display SCR-13 indicating that the library patron has made too many attempts at entering a PIN number, and instructing the library patron to remove the card. The microprocessor 60 at a block 314 also determines that the library patron is suspicious and, accordingly, blocks the patron's library card. Thereafter, program flow returns to point C of FIG. 6.

If the status returned to the self-service library terminal 10 indicates that the status of library patron is not acceptable, and if the patron had no PIN, the microprocessor 60 at a block 316 provides the screen display SCR-12 indicating that the patron's ID is bad, and instructs the patron to remove the patron's library card. Thereafter, program flow returns to point C of FIG. 6.

Figure 8A:
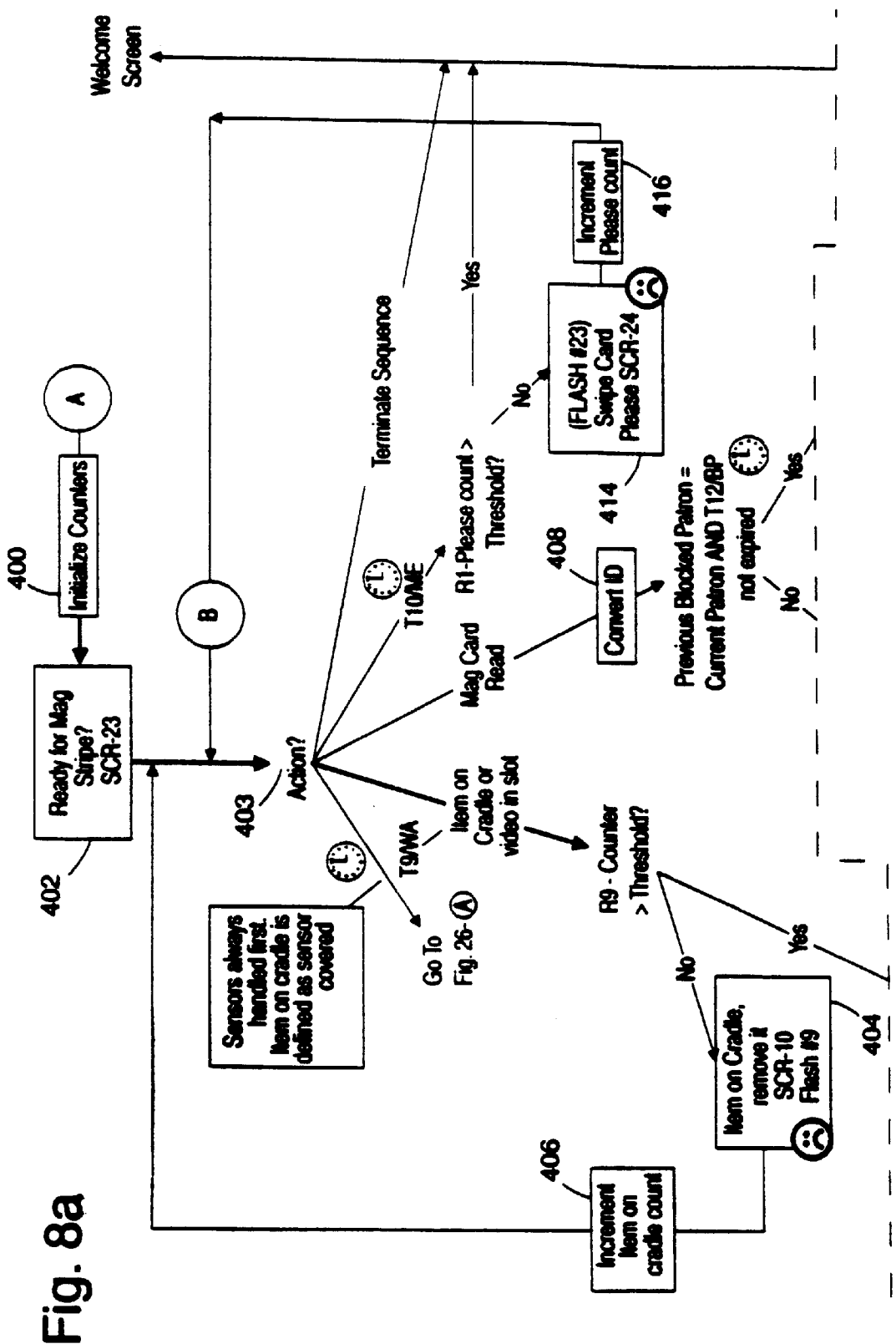
Figure 8B:
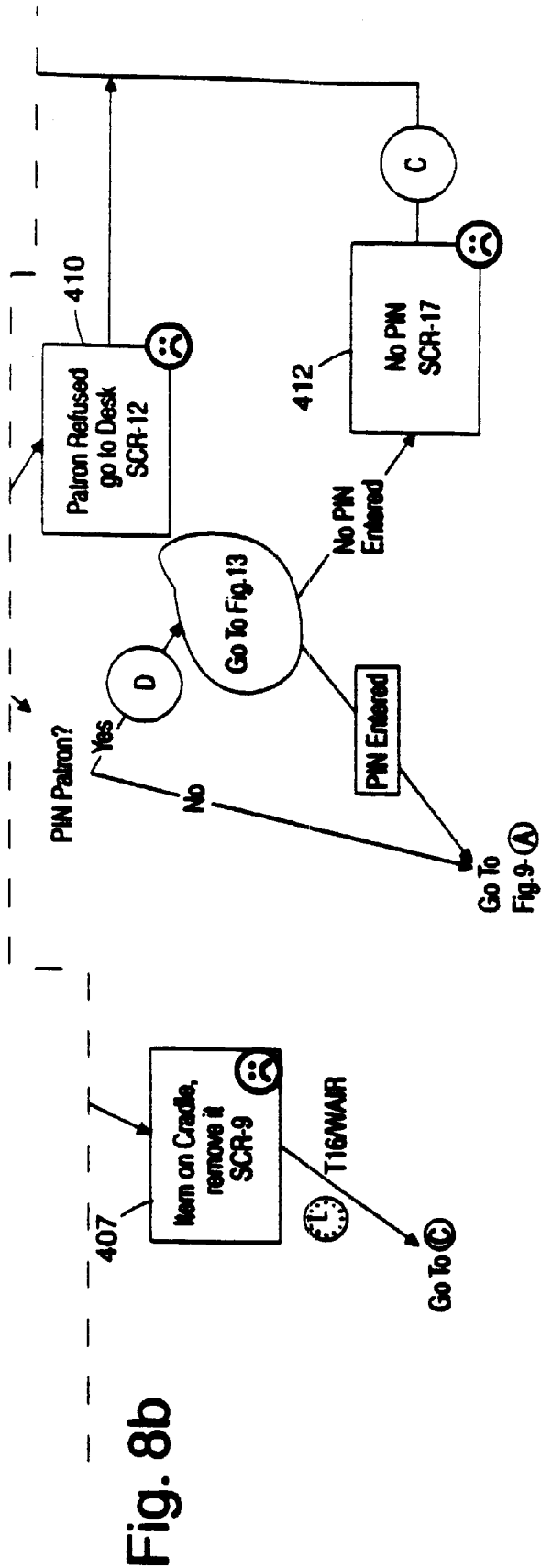

When the flow chart of FIG. 8 is entered through point A, the microprocessor 60 at a block 400 initializes all counters sad, at a block 402, provides a screen display SCR-23 indicating that the self-service library terminal 10 is ready for the library patron to present the magnetic stripe of the patron's library card to the magnetic stripe reader 34. Thereafter, or if the flow chart of FIG. 8 is entered through point B, the microprocessor 60 at a point 403 determines an appropriate action. For example, if a walkaway timer T9 times out (indicating no activity at the self-service library terminal 10 for a predetermined amount of time), program flow proceeds to point A of FIG. 23 because the library patron may have walked away from the self-service library terminal 10 without further processing of the current loan transaction.

On the other hand, the microprocessor 60 may determine that an item has been placed on the cradle 14 because one or both of the photoelectric sensors 20 and 22 is covered or a code is read by the reader 18. If so, the microprocessor 60 determines whether the count of the item-on-cradle counter R9 has exceeded the predetermined R9 threshold. If not, the microprocessor 60 at a block 404 provides the screen display SCR-10 indicating that a circulating item or a library card has been placed on the cradle 14 and that it should be removed. The microprocessor 60 also increments the item-on-cradle counter R9 at a block 406, and program flow returns to the point 403.

If the microprocessor 60 determines that the count of the item-on-cradle counter R9 has exceeded the predetermined R9 threshold, the microprocessor 60 at a block 407 provides the screen display SCR-9 indicating that an item has been placed on the cradle 14, that it should be removed, and that the patron has exceeded the allowable number of attempts to properly process the patron's library card through the magnetic stripe reader 34. If the patron removes the item before a walkaway-item-removed timer T16 times out, program flow proceeds through point C of FIG. 8. However, if the patron does not remove the item before the walkaway-item-removed timer T16 times out, program flow proceeds to the walkaway routine of FIG. 23.

If the action determined at the point 403 is that the magnetic stripe on a patron's library card is read by the magnetic stripe reader 34, then the microprocessor 60 at a block 408 converts the magnetic stripe ID to a machine processable code and determines from the code whether the library patron is a previously blocked patron (i.e., a library patron whose card has been previously blocked) and whether a blocked patron timer T12 has not expired. If the library patron is a previously blocked patron and the blocked patron timer T12 has not expired, the microprocessor 60 at a block 410 provides the screen display SCR-12 indicating that the library patron is refused service at the self-service library terminal 10, and directs the library patron to go to the circulation desk of the library. Thereafter, program flow returns to the welcome screen. If the library patron is a previously blocked patron, or if the blocked patron timer T12 has expired, the microprocessor 60 determines whether the patron has a PIN. If not, a program flow proceeds to point A of FIG. 9. The blocked patron timer T12 gives the patron the time to go to the circulation desk in order to resolve any problems with the patron's library card. Once the patron's problem has been resolved, the blocked patron timer T12 will have expired, and the patron will no longer be blocked.

Figure 13:
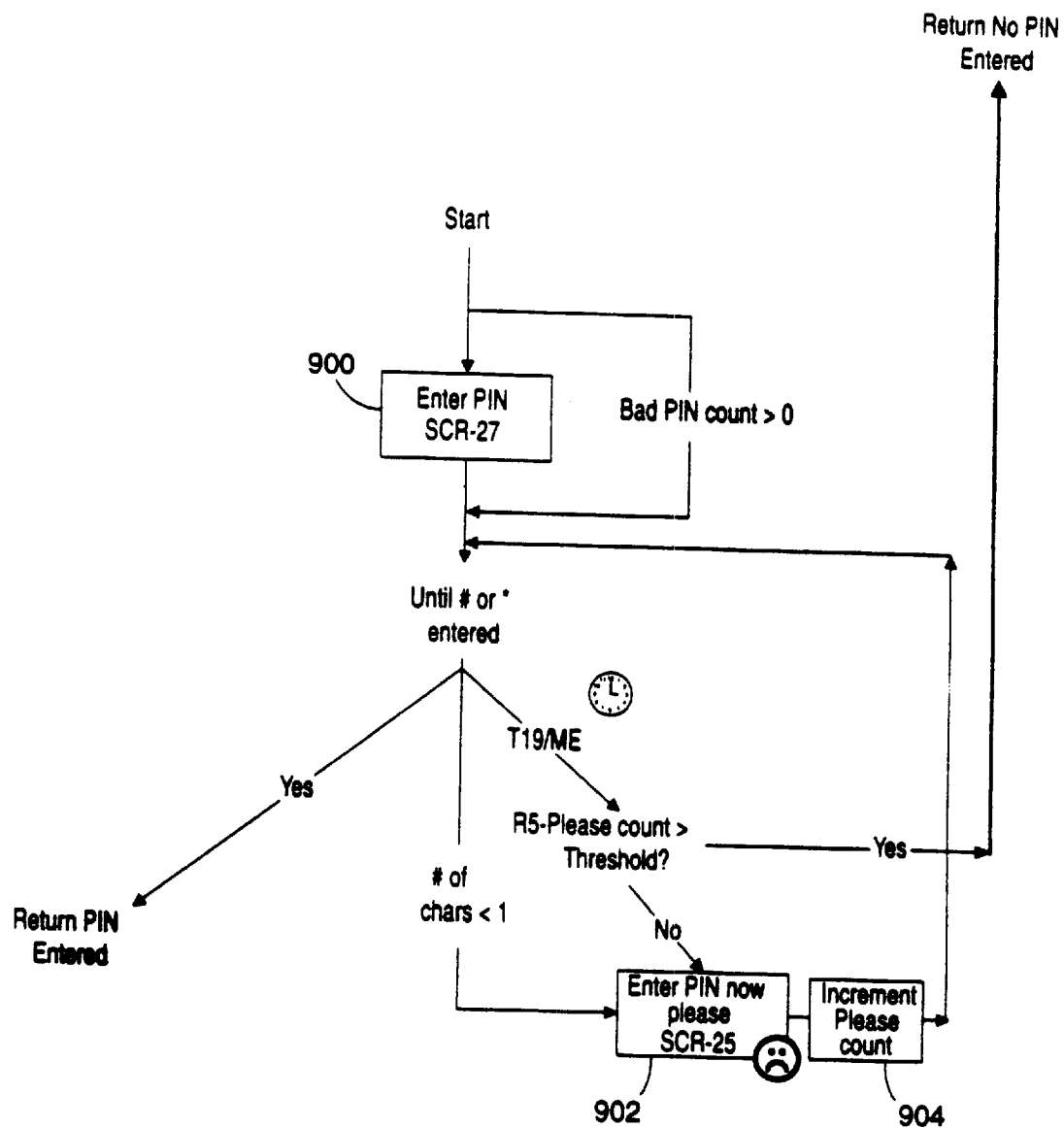

On the other hand, if the microprocessor 60 determines that the patron has a PIN, the microprocessor 60 executes the program represented by the flow chart shown in FIG. 13 with returns PIN ENTERED or NO PIN ENTERED, as appropriate. If PIN ENTERED is returned, program flow proceeds to point A of FIG. 9. If NO PIN ENTERED is returned, then the microprocessor 60 at a block 412 provides a screen display SCR-17 informing the patron that the patron did not enter a PIN. Thereafter, program flow returns to the welcome screen.

If the microprocessor 60 is at the point 403, and if a maximum event timer T10 times out before (i) an item is placed on the cradle 14 or a video is placed in the video slot 30, (ii) a magnetic card is read by the magnetic stripe reader 34, and (iii) the patron begins a termination sequence, then the microprocessor 60 determines whether the count accumulated by the please counter R1 has exceeded the predetermined R1 threshold. If so, program flow returns to the welcome screen. If not, the microprocessor 60 at a block 414 provides a screen display SCR-24 instructing the patron to present the patron's library card to the magnetic stripe reader 34. Also, the microprocessor 60 at a block 416 increments the count of the please counter R1, and program returns to point 403 of FIG. 8.

If the library patron chooses to terminate the transaction, the microprocessor executes the program represented by the flow chart of FIG. 21, and program flow returns to the welcome screen.

Figure 9:
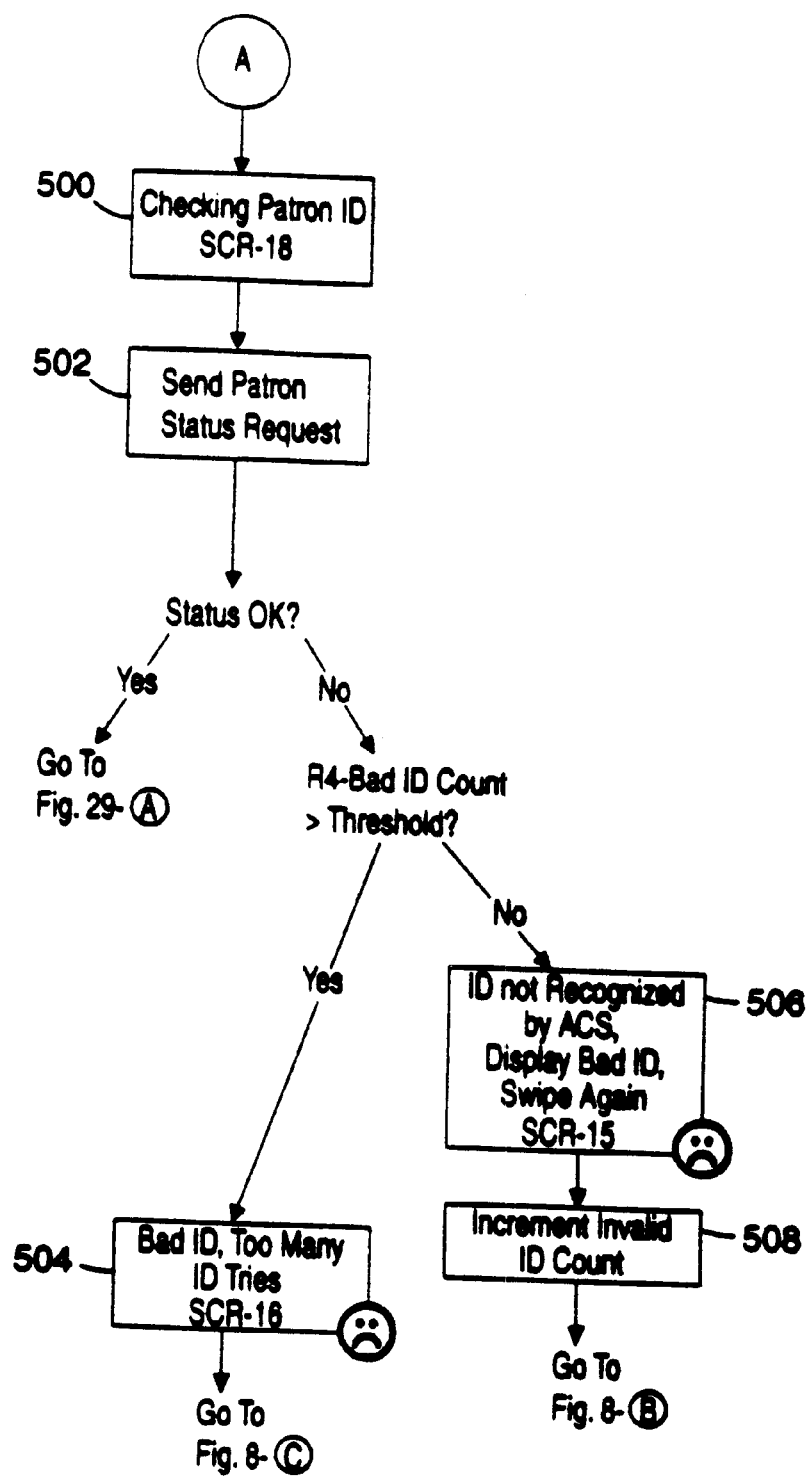

When the flow chart of FIG. 9 is entered through point A, the microprocessor 60 at a block 500 provides a screen display SCR-18 to the library patron indicating that the self-service library terminal 10 is processing the patron's ID contained on the patron's library card. The microprocessor 60 at a block 502 also sends a request to the data server 50 for the patron's status, and the data server 50 returns the patron's status to the self-service library terminal 10. An unacceptable status may be returned if the magnetic stripe on the library card was not properly read, or if the patron entered a bad PIN. If the microprocessor 60 determines on the basis of the returned status that the status of the library patron is acceptable, program flow proceeds to point A of FIG. 29. On the other hand, if the status is not acceptable, the microprocessor 60 determines whether the count accumulated by a bad-ID counter R4 has exceeded a predetermined R4 threshold. If the microprocessor 60 determines that the count accumulated by the bad-ID counter R4 has exceeded the predetermined R4 threshold, the microprocessor 60 at a block 504 provides the screen display SCR-16 indicating that the library patron has a bad identification and has made too many attempts to enter the correct identification. Program flow then returns to point C of FIG. 8, and thereafter to the welcome screen.

However, if the microprocessor 60 determines that the count accumulated by the bad-ID counter R4 has not exceeded the predetermined R4 threshold, the microprocessor 60 at a block 506 provides a screen display SCR-15 indicating that the self-service library terminal 10 cannot recognize the identification provided by the library patron and requests the library patron to present the magnetic stripe on the patron's library card to the magnetic stripe reader 34 again. Also, the microprocessor 60 increments the count of the bad-ID counter R4 at a block 508, and program returns to point B of FIG. 8.

Figure 10:
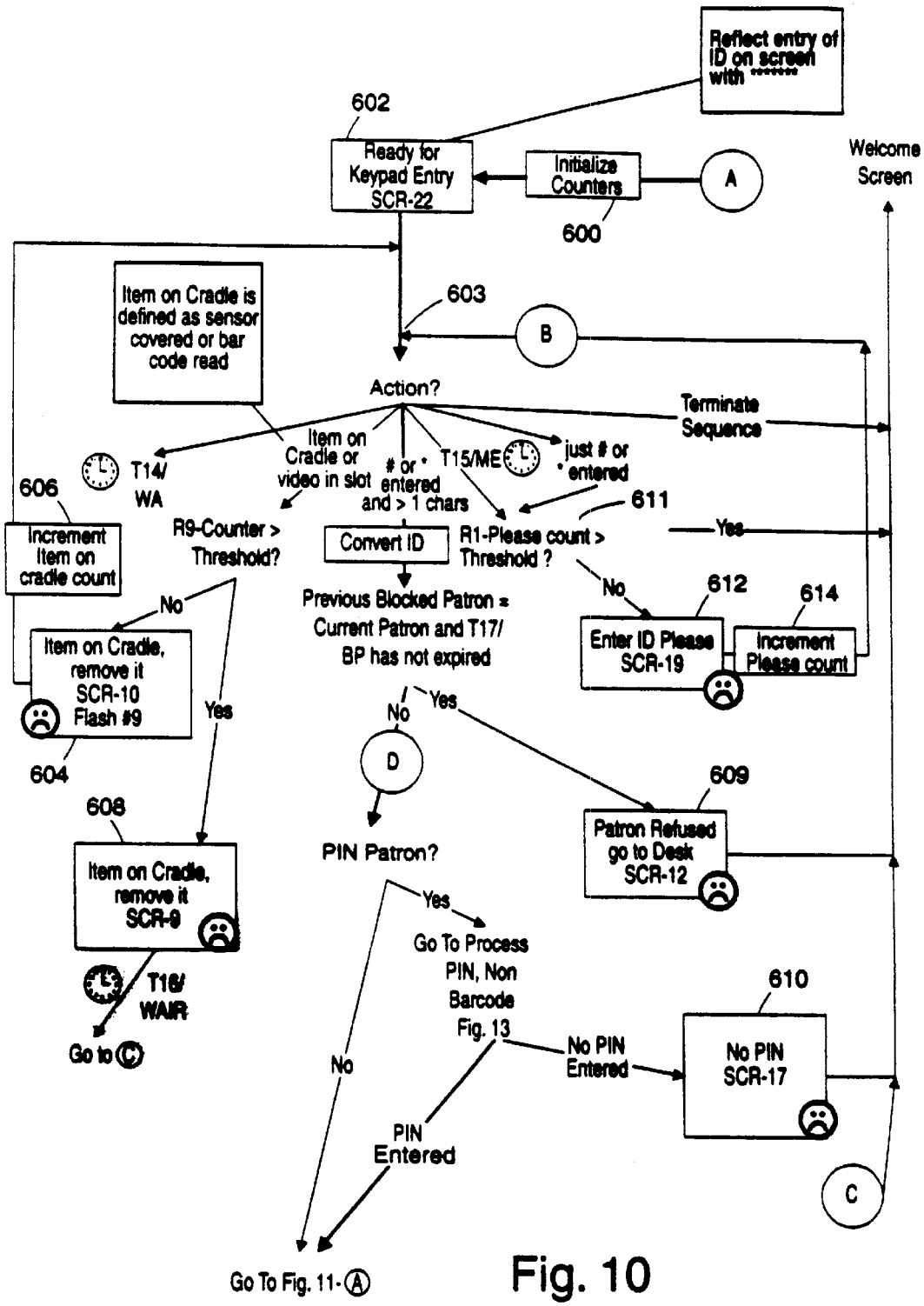

When the flow chart of FIG. 10 is entered through point A, the microprocessor 60 at a block 600 initializes counters and at a block 602 provides a screen display SCR-22 indicating to the library patron that the self-service library terminal 10 is ready for the library patron to enter the patron's identification through use of the keypad 32. (The microprocessor 60 may cause an asterisk or other symbol to appear on the display 28 as the patron enters each character of the patron's identification.) Thereafter, or if the flow chart of FIG. 10 is entered through point B, the microprocessor 60 determines an appropriate action at a point 603. For example, if a walkaway timer T14 has timed out before the patron takes action at this point, program flow proceeds to FIG. 23 because the microprocessor 60 assumes that the library patron has walked away from the self-service library terminal 10 without completing a transaction.

On the other hand, if a circulating item is placed on the cradle 14 or a video is placed in the video slot 30, the microprocessor 60 determines whether the item-on-cradle counter R9 has accumulated a count greater than the predetermined R9 threshold. If not, the microprocessor 60 at a block 604 provides the screen display SCR-10 indicating that the patron has incorrectly placed an item on the cradle 14 or in the video slot 30 and instructs the patron to remove the item. Also, the microprocessor 60 increments the item-on-cradle counter R9 at a block 606. If the item-on-cradle counter R9 has accumulated a count greater than the predetermined R9 threshold, the microprocessor 60 at a block 608 provides the screen display SCR-9 indicating that a circulating item is placed on the cradle and instructing the patron to remove the circulating item. If the patron removes the item before a walkaway-item-removed timer T16 times out, program flow proceeds through point C of FIG. 10. However, if the patron does not remove the item before the walkaway-item-removed timer T16 times out, program flow proceeds to the walkaway routine of FIG. 23.

If the microprocessor 60 determines that the library patron has entered an identification number through the use of the keypad 32 followed by the # or * sign, the microprocessor 60 converts the identification number to the patron's ID and determines whether the patron is a previously blocked patron. The microprocessor 60 also determines if a blocked patron timer T17 has timed out. If the patron is a previously blocked patron and if the blocked patron timer T17 has not timed out, the microprocessor 60 at a block 609 provides the screen display SCR-12 indicating that the patron's loan transaction is being refused and instructing the patron to go to the circulation desk for further processing. Thereafter, flow returns to the welcome screen.

If the patron is not a previously blocked patron, or if the blocked patron timer T17 has timed out, the microprocessor 60 determines whether the library patron has a PIN number in the memory 62. If not, flow proceeds to point A of FIG. 11. If so, the microprocessor 60 executes the program represented by the flow chart of FIG. 13 which returns either PIN ENTERED or NO PIN ENTERED. If PIN ENTERED is returned, program flow proceeds to point A of FIG. 11. If NO PIN ENTERED is returned, then the microprocessor 60 at a block 610 provides the screen display SCR-17 indicating that the patron has not entered a PIN number, and program flow then returns to the welcome screen.

If a maximum event timer T15 times out before (i) an item is placed on the cradle 14 or in the video slot 30, (ii) the patron presses the # or * key, and (iii) the patron initiates a termination sequence, the microprocessor 60 at a point 611 determines whether the count of the please counter R1 has exceeded the predetermined R1 threshold. If the count of the please counter R1 has exceeded the predetermined R1 threshold, program flow returns to the welcome screen. On the other hand, if the count of the please counter R1 has not exceeded the predetermined R1 threshold, the microprocessor 60 at a block 612 provides a screen display SCR-19 instructing the library patron to enter the patron's ID. Also, the microprocessor 60 at a block 614 increments the please counter R1. Thereafter, flow returns to point 603 of FIG. 10.

Finally, if the patron presses the # or * key without pressing any other key, program flow proceeds to point 611, and if the library patron elects to terminate the current transaction, the microprocessor executes the program represented by the flow chart of FIG. 21, and program flow returns to the welcome screen.

Figure 11:
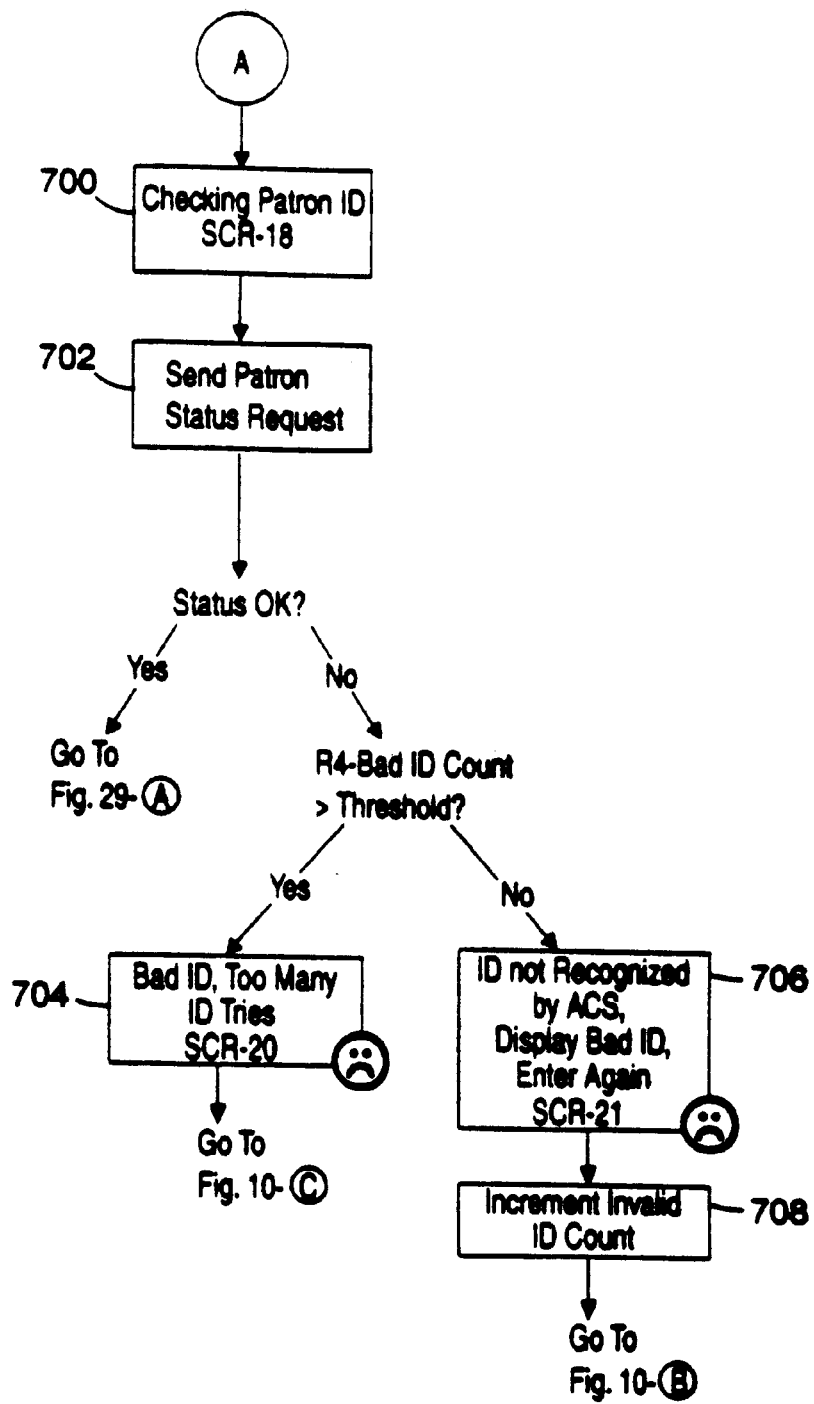

When the flow chart of FIG. 11 is entered through point A, the microprocessor 60 at a block 700 provides the screen display SCR-18 to the library patron informing the library patron that the self-service library terminal 10 is checking the patron's identification. The microprocessor 60 at a block 702 sends a request to the data server 50 for the patron's status which is returned to the self-service library terminal 10. (The status of a patron may be unacceptable if, for example, the patron entered an incorrect PIN.) If the microprocessor 60 determines from this returned status that the library patron's status is acceptable, program flow proceeds to point A of FIG. 29. On the other hand, if the status of the library patron returned to the self-service library terminal 10 is not acceptable, the microprocessor 60 determines if the count accumulated by the bad-ID counter R4 has exceeded the predetermined R4 threshold. If the count accumulated by the bad-ID counter R4 has exceeded the predetermined R4 threshold, the microprocessor 60 at a block 704 provides a screen display SCR-20 informing the library patron that the patron's ID is bad and that the library patron has exceeded the allowable number of attempts to enter the correct ID. Thereafter, flow returns to point C of FIG. 10. On the other hand, if the count accumulated by the bad-ID counter R4 has not exceeded the predetermined R4 threshold, the microprocessor 60 at a block 706 provides a screen display SCR-21 informing the library patron that the patron's ID is not recognized and instructing the patron to retry entering the patron's ID. Thereafter, the microprocessor 60 at a block 708 increments the bad-ID counter R4, and program flow returns to point B of FIG. 10.

Figure 12:
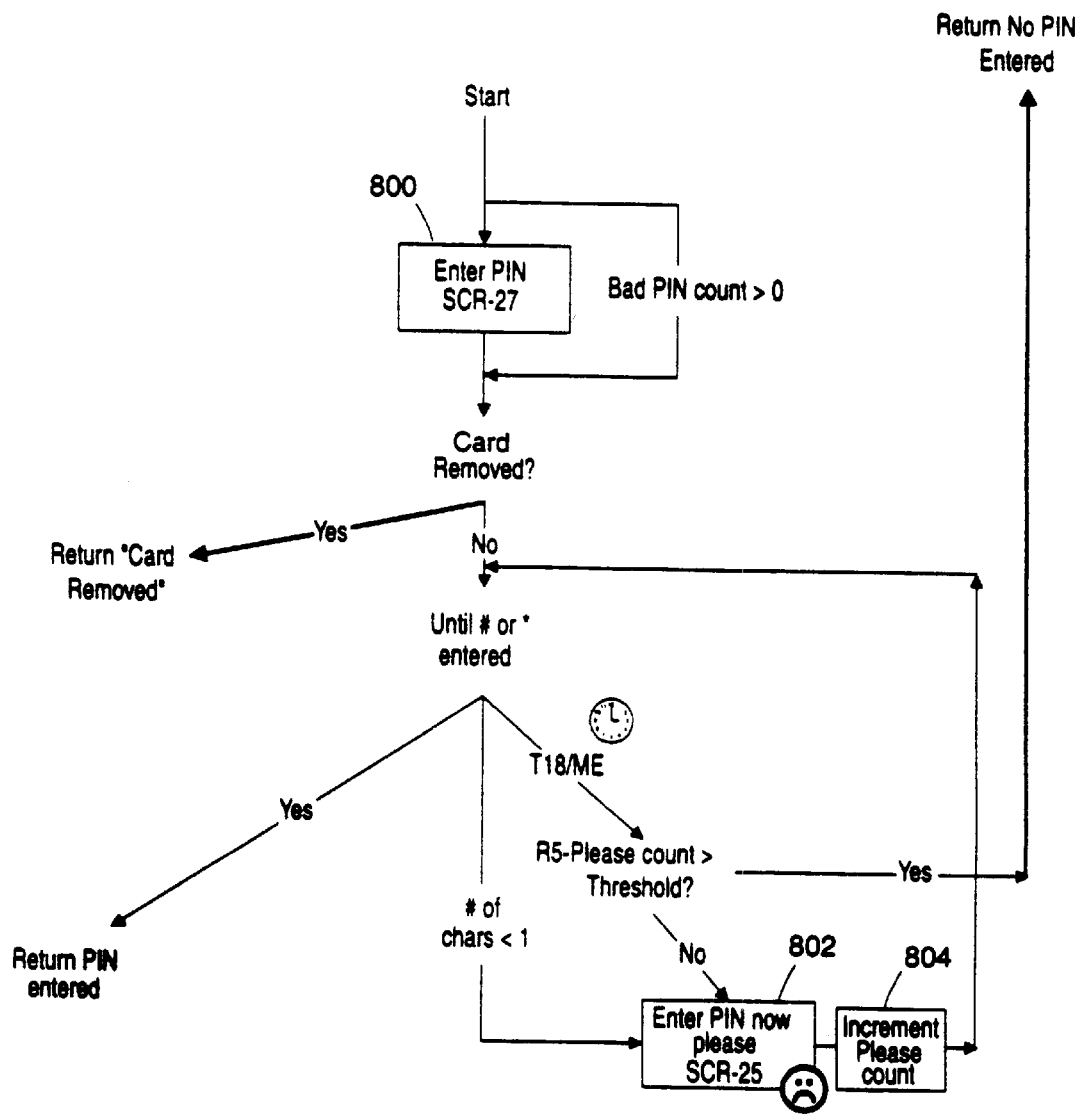

When the flow chart of FIG. 12 is entered from FIG. 6, the microprocessor 60 at a block 800 provides a screen display SCR-27 instructing the library patron to enter the library patron's PIN number. The microprocessor 60 skips the block 800 if the count accumulated by the bad-PIN counter R3 is greater than zero. Thereafter, the microprocessor 60 determines whether the library patron has removed the patron's library card from the cradle 14. If the patron's library card has been removed, CARD REMOVED is returned to FIG. 6. If the patron's library card has not been removed, the microprocessor 60 performs a loop as shown in FIG. 12 as each character of the patron's PIN is entered until the patron presses the # or * key on the keypad 32. When the # or * key is pressed, PIN ENTERED is returned to FIG. 6. If the # or * key is pressed before the first character of the patron's PIN is entered, the microprocessor 60 at a block 802 provides a screen display SCR-25 instructing the user to enter the PIN number. Also, the microprocessor 60 increments the count of the please counter R5 at a block 804 and another pass is made through the loop. Similarly, if the maximum event timer T18 times out before the patron presses the # or * key, and if the count accumulated by the please counter R5 has not exceeded a predetermined R5 threshold, the microprocessor 60 provides the screen display SCR-25 and increments the count of the please counter R5, and another pass is made through the loop. If the maximum event timer T18 times out before the patron presses the # or * key, and if the count accumulated by the please counter R5 exceeds the predetermined R5 threshold, NO PIN ENTERED is returned to FIG. 6.

When the flow chart of FIG. 13 is entered from FIG. 8 or FIG. 10, the microprocessor 60 at a block 900 provides the screen display SCR-27 instructing the library patron to enter the library patron's PIN number. The microprocessor 60 skips the block 900 if the count accumulated by the bad-PIN counter R3 is greater than zero. The microprocessor 60 performs a loop as shown in FIG. 13 as each character of the patron's PIN is entered, until the patron presses the # or * key on the keypad 32. When the # or * key is pressed, PIN ENTERED is returned to FIG. 8 or FIG. 10. If the # or * key is pressed before the first character of the patron's PIN is entered, the microprocessor 60 at a block 902 provides the screen display SCR-25 instructing the user to enter the PIN number. Also, the microprocessor 60 increments the count of the please counter R5 at a block 902 and another pass is made through the loop. Similarly, if a maximum event timer T19 times out before the patron presses the # or * key, and if the count accumulated by the please counter R5 has not exceeded the predetermined R5 threshold, the microprocessor 60 provides the screen display SCR-25 and increments the count of the please counter R5, and another pass is made through the loop. If the maximum event timer T19 times out before the patron presses the # or * key times out, and if the count accumulated by the please counter R5 exceeds the predetermined R5 threshold, NO PIN ENTERED is returned to FIG. 8 or FIG. 10.

Figure 14:
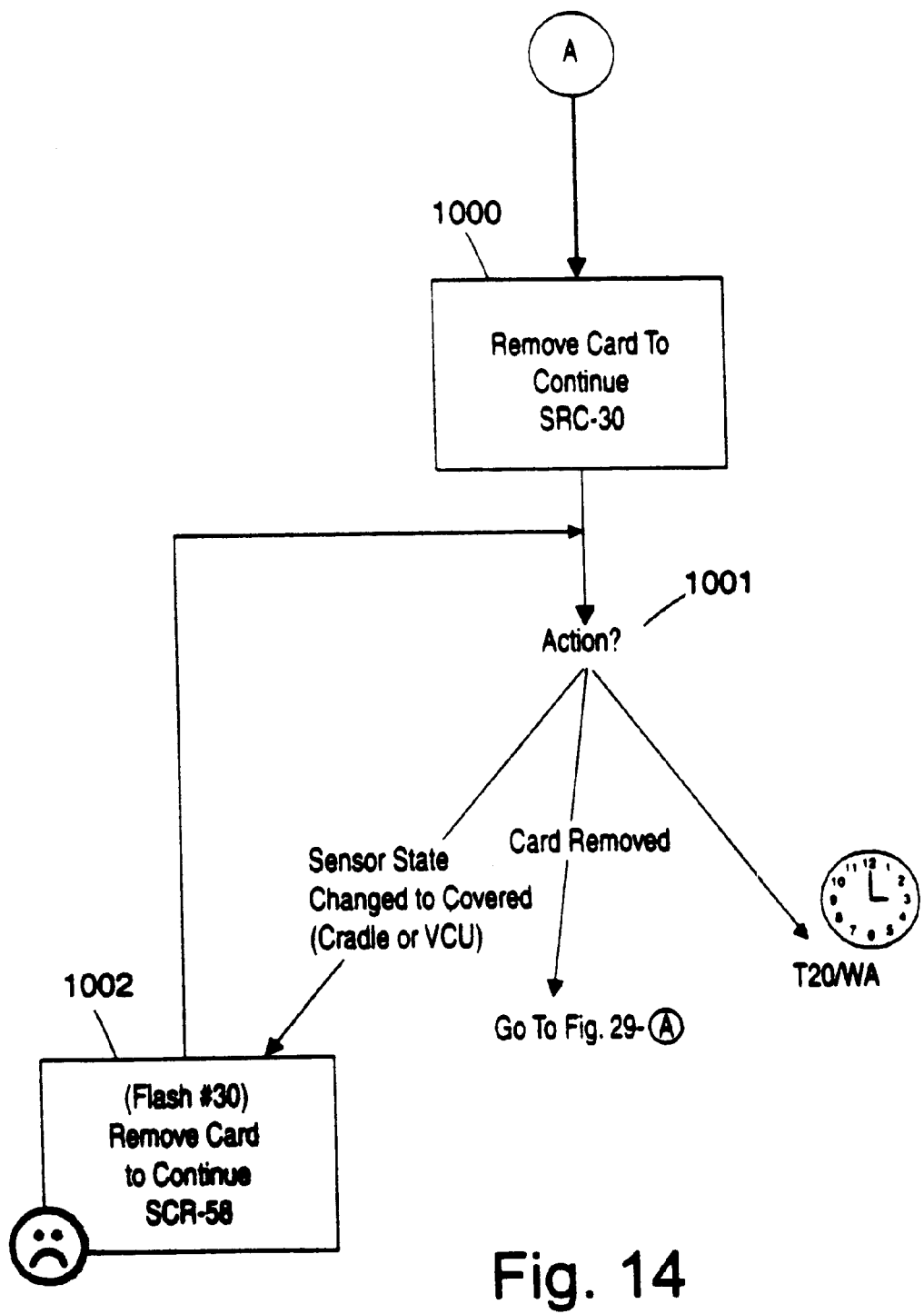

When the flow chart of FIG. 14 is entered through point A from the routine shown in FIG. 7, the microprocessor 60 at a block 1000 provides a screen display SCR-30 to the patron instructing the patron to remove the patron's library card. Accordingly, the magnetic stripe on the patron's library card will not be demagnetized when the security marker in the circulating item being checked out is desensitized or when the security marker in the circulating item being checked in is sensitized. Thereafter, the microprocessor 60 determines an appropriate action at a point 1001. For example, if a sensor, such as the idle indicator 16, the photoelectric sensor 20, the photoelectric sensor 22, and/or the like, determines that the patron has taken an action other than removing the patron's library card, the microprocessor 60 at a block 1002 provides a screen display SCR-58 instructing the library patron to remove the library card in order to continue with the transaction. Thereafter, the program flow returns to the point 1001. If the microprocessor 60 determines that the card has been removed, program flow proceeds to point A of FIG. 29. If a walkaway timer T20 times out before the card is removed and the microprocessor 60 determines no change of state of any of the sensors, program flow proceeds to the walkaway routine of FIG. 22.

Figure 15A:
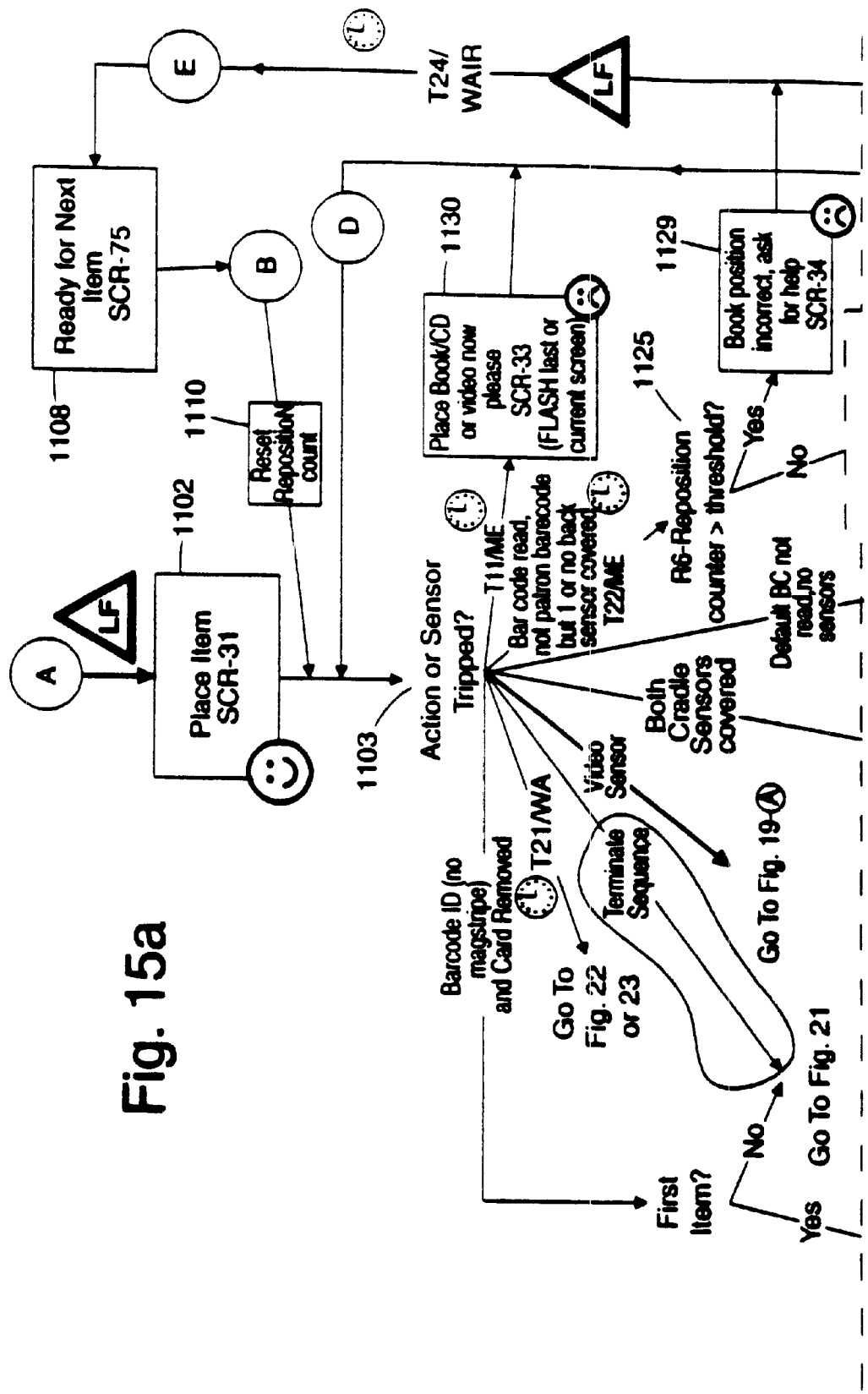
FIGS. 15–20 illustrate a circulating item checkout routine performed by the self-service library terminal illustrated in FIG. 1.
Figure 15B:
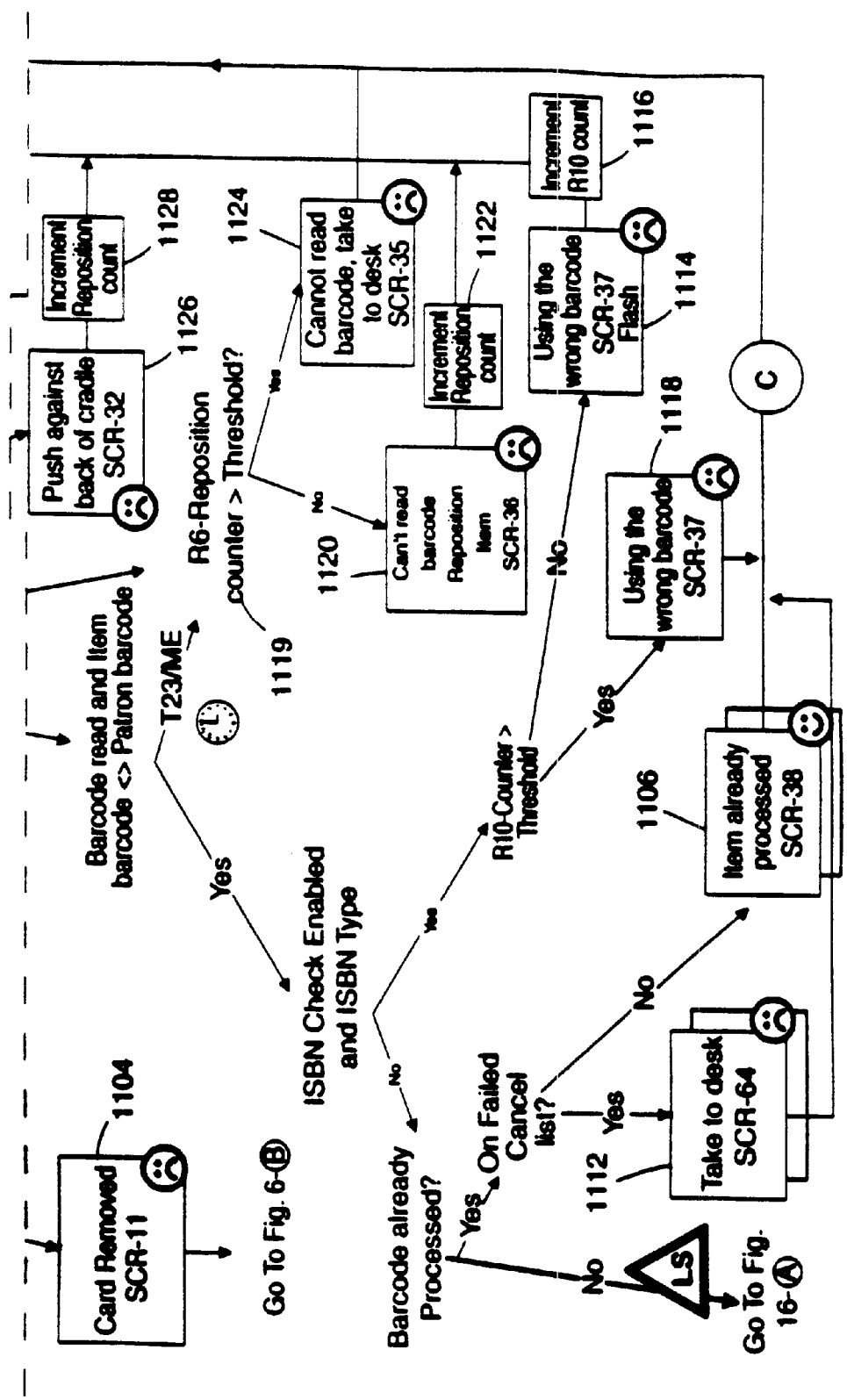

The flow chart of FIG. 15 is entered through point A, point B, point C, point D, or point E. When the flow chart of FIG. 15 is entered through point A from FIG. 29, the microprocessor 60 controls the scan line projected on to the cradle 14 by the reader 18 as a long flashing (LF) scan line, and the microprocessor 60 at a block 1102 provides a screen display SCR-31 instructing the library patron to place a circulating item in an appropriate item receiving area. Thereafter, the microprocessor 60 at a point 1103 determines an appropriate action. For example, if the patron's library card is removed from the cradle 14 before a circulating item is placed on the cradle 14, the microprocessor 60 determines whether a first circulating item has already been processed during the current loan transaction. If a first circulating item is yet to be processed during the current loan transaction, the microprocessor 60 at a block 1104 provides a screen display SCR-11 indicating that the card has been removed. (If the patron entered the patron's ID through use of the reader 18, the patron's library card must remain on the cradle 14 throughout the loan transaction.) Thereafter, program flow returns to point B of FIG. 6 in order to lead the patron back through the identification process. If patron's library card is removed but a first circulating item has already been processed, program flow proceeds to FIG. 21.

Figure 22:
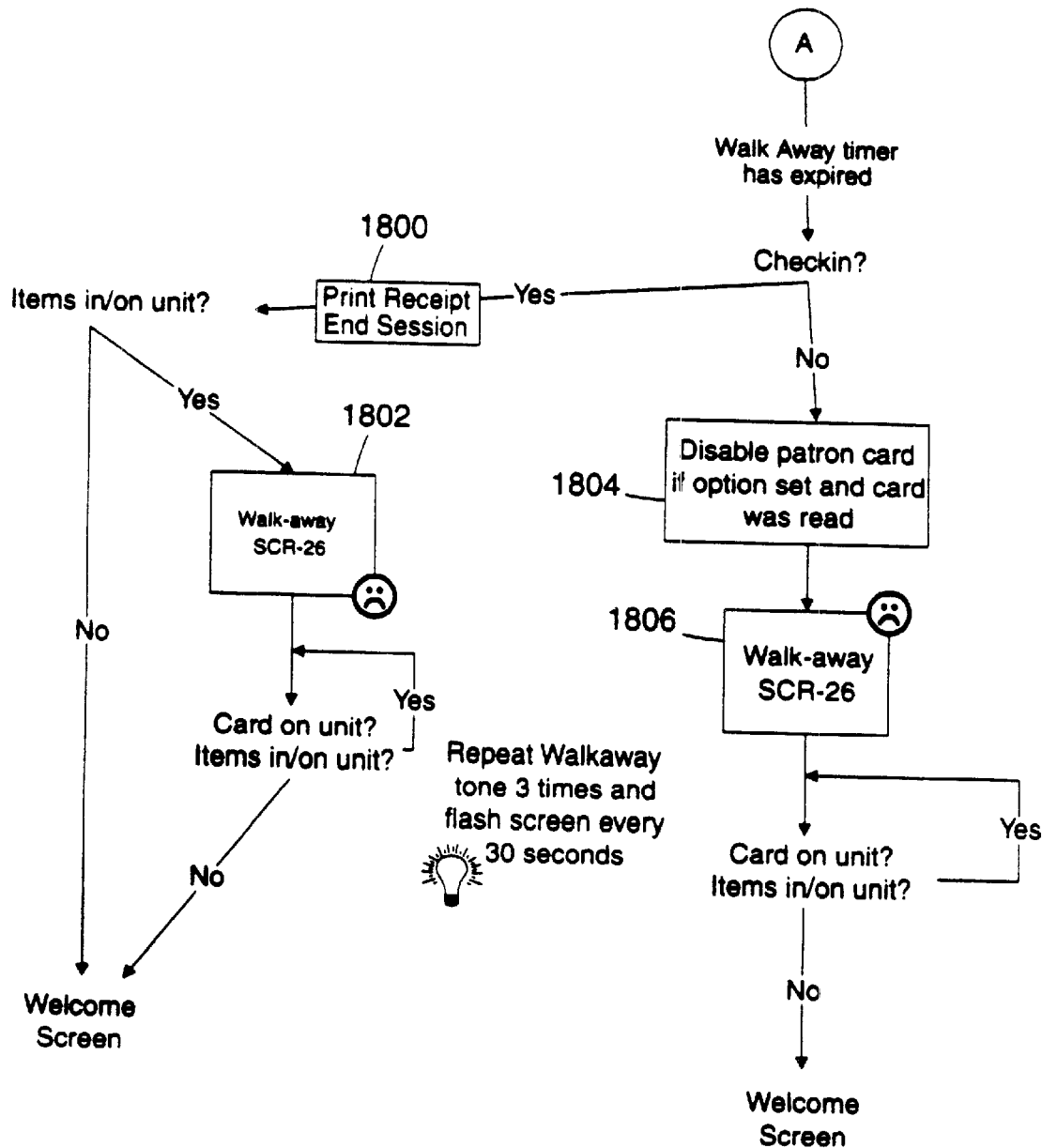
FIGS. 22 and 23 illustrates a patron walk-away routine performed by the self-service library terminal illustrated in FIG. 1.
Figure 23:
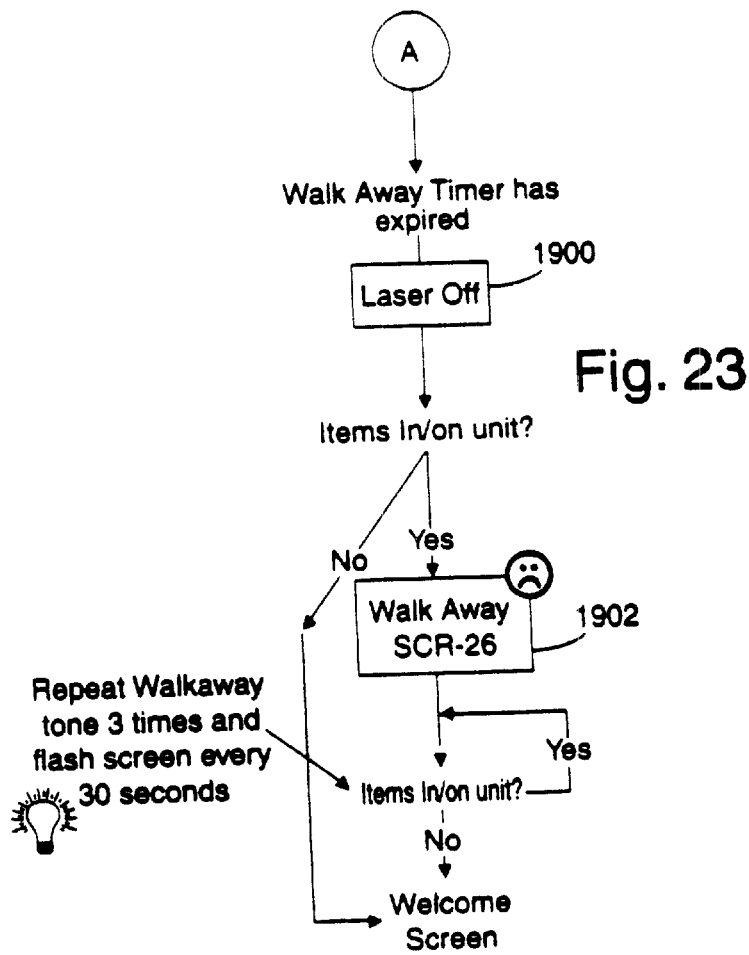

If a walkaway timer T21 has timed out before the patron takes any action at the point 1103, program flow proceeds to FIG. 22 or FIG. 23, as appropriate. If the action determined by the microprocessor 60 is that the library patron desires to terminate the current transaction, the microprocessor 60 executes the program represented by the flow chart of FIG. 21.

Figure 19:
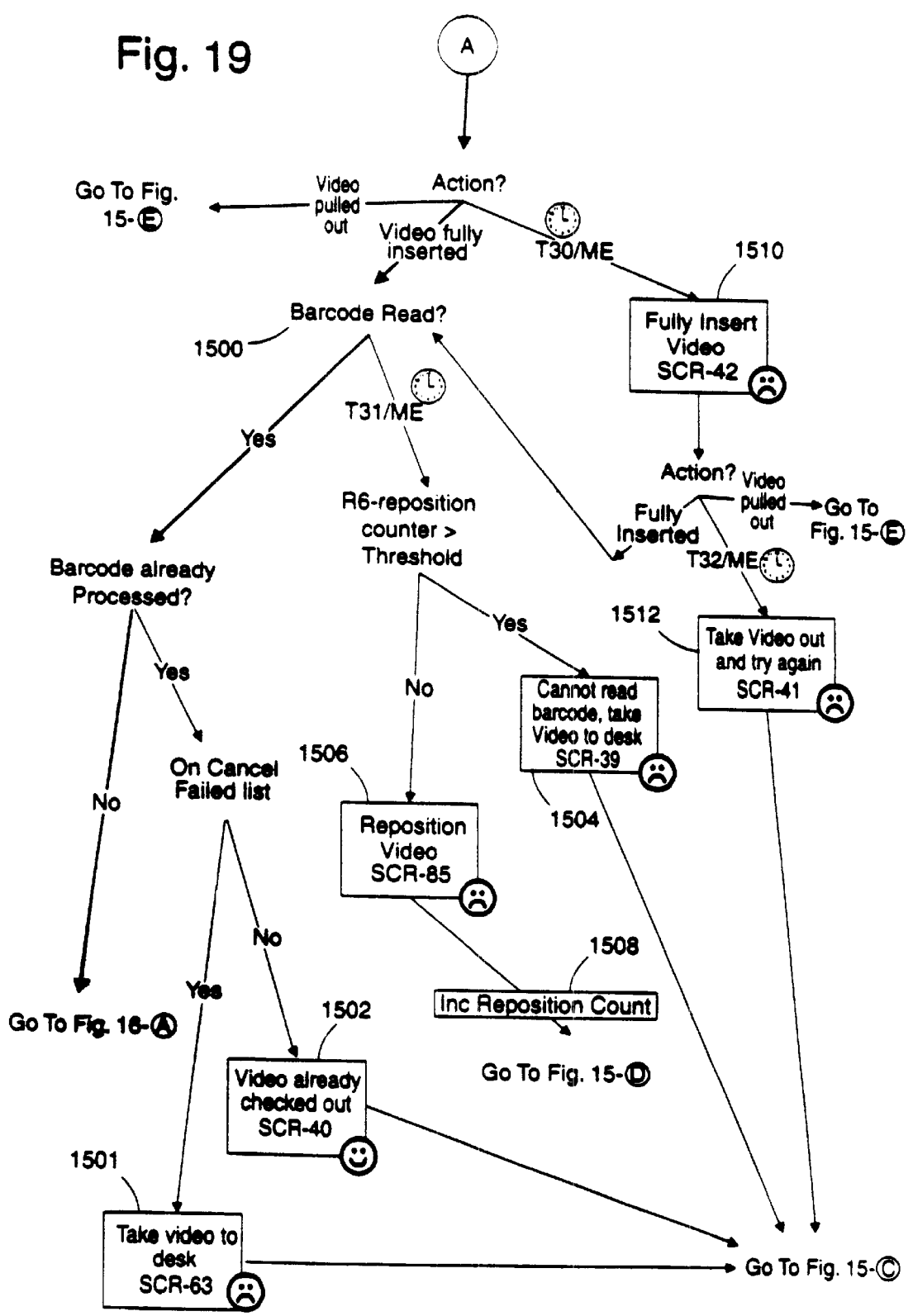

If the action determined by the microprocessor 60 is that a video cassette has been inserted into the video slot 30 of the self-service library terminal 10, program flow proceeds to point A of FIG. 19.

If the action determined by the microprocessor 60 is that both of the photoelectric sensors 20 and 22 are covered, the microprocessor 60 determines whether an item identifier is being read by the reader 18 from a circulating item, and whether the item identifier being read is not a patron ID. If an item identifier is being read by the reader 18 from a circulating article, and if the item identifier being read is not a patron ID, the microprocessor 60 determines whether a code-type check (inspection) is enabled and, if so, whether the item identifier being read by the reader 18 is of an incorrect type (i.e., a type which is different from the item identifier used on circulating items meant to be processed on the cradle 14). For example, the patron may have placed a correct circulating item on the cradle 14 but in such a position that the reader 18 is reading a code other then the item identifier. If the code-type check is not enabled, or if the reader 18 is reading an item identifier used on circulating items meant to be processed on the cradle 14, the microprocessor 60 determines whether the item identifier read by the reader 18 has been previously processed during the patron's current transaction. If the item identifier read by the reader 18 has not been previously processed during the patron's current transaction, the scan line projected by the reader 18 is controlled so that it is long and steady (LS), and program flow proceeds to point A of FIG. 16 in order to proceed with the checkout of the circulating item that is currently on the cradle 14.

On the other hand, if the item identifier read by the reader 18 has been previously processed during the patron's current transaction, the microprocessor 60 determines whether the item identifier currently being processed is on a failed or canceled list. If the item identifier currently being processed is not on a failed or canceled list, the microprocessor 60 provides a screen display SCR-38 at a block 1106 indicating that the item has already been processed. Also, a happy tone (indicated by the smiley face) is provided to the library patron. Thereafter, the microprocessor 60 changes the scan line projected by the reader 18 to a long and flashing (LF) scan line. If the patron does not acknowledge that the item has already been processed before a walkaway-item-removed timer T24 times out, the walkaway routine of FIG. 22 is entered. If the patron does acknowledge that the item has already been processed before the walkaway-item-removed timer T24 times out, program flow proceeds to a block 1108 where a screen display SCR-75 is provided indicating that the self-service library terminal 10 is ready for the next circulating item to be checked out by the library patron, and a reposition counter R6 is reset at a block 1110. The microprocessor 60 is then ready to determine another appropriate action.

If the item identifier currently being processed is on a failed or canceled list, the microprocessor 60 provides a screen display SCR-64 at a block 1112 instructing the library patron to take the circulating item to the circulation desk. Thereafter, the microprocessor 60 sets the scan line projected by the reader 18 to long and flashing and, if the walkaway-item-removed timer T24 has not timed out, provides the screen display SCR-75, and resets the reposition counter R6. The microprocessor 60 is then ready to determine another appropriate action.

If the code-type check is enabled, and if the reader 18 is reading an item identifier used on circulating items meant to be processed on the cradle 14, the microprocessor 60 determines whether a wrong-identification counter R10 has accumulated a count that exceeds a predetermined R10 threshold. If the wrong-identification counter R10 has not accumulated a count that exceeds the predetermined R10 threshold, the microprocessor 60 provides a screen display SCR-36 at a block 1114 indicating that the library patron is using the wrong bar code, the microprocessor 60 at a block 1116 increments the wrong-identification counter R10, and program flow returns to point 1103 of the routine shown in FIG. 15. If the wrong-identification counter R10 has accumulated a count which exceeds the predetermined R10 threshold, the microprocessor 60 provides the screen display SCR-37 at a block 1118 indicating that the library patron is using the wrong identification under the reader 18. Thereafter, the microprocessor 60 sets the scan line projected by the reader 18 to long and flashing and, if the walkaway-item-removed timer T24 has not timed out, provides the screen display SCR-75, and resets the reposition counter R6.

If both of the photoelectric sensors 20 and 22 are covered, and if a maximum event timer T23 times out before the reader 18 reads an item identifier on a circulating item, the microprocessor 60 at a point 1119 determines whether the reposition counter R6 has accumulated a count greater than a predetermined R6 threshold. If the reposition counter R6 has not accumulated a count greater than the predetermined R6 threshold, the microprocessor 60 at a block 1120 provides a screen display SCR-36 indicating that the reader 18 cannot read the item identifier and directing the patron to reposition the circulating item on the cradle 14. Also, the microprocessor 60 at a block 1122 increments the reposition counter R6, and program flow proceeds to the point 1103.

If the count accumulated by the reposition counter R6 exceeds the predetermined R6 threshold, the microprocessor 60 at a block 1124 provides a screen display SCR-35 indicating that the reader 18 cannot read the bar code on the circulating item and to take the circulating item to the circulation desk for processing by a member of the library staff. Thereafter, the microprocessor 60 sets the scan line projected by the reader 18 to long and flashing. Assuming that the walkaway-item-removed timer T24 does not time out, program flow proceeds to the block 1108.

If the action determined by the microprocessor 60 at the point 1103 is that the idle indicator 16 is not read (indicating that a circulating item may be on the cradle 14 and covering the idle indicator 16), and that neither of the photoelectric sensors 20 and 22 is covered, the microprocessor 60 proceeds to the point 1119 and follows the flow through the blocks 1120 and 1122, or the block 1124, as described above.

If the action determined by the microprocessor 60 at the point 1103 is that an item identifier is read by the reader 18, that the identification read by the reader 18 is not a patron's ID, that both of the photoelectric sensors 20 and 22 are not covered, and a maximum event timer T22 has accumulated a predetermined amount of time, the microprocessor 60 at a point 1125 determines whether the reposition counter R6 has accumulated a count greater than the predetermined R6 threshold. If the reposition counter R6 has not accumulated a count greater than the predetermined R6 threshold, the microprocessor 60 at a block 1126 provides a screen display SCR-32 indicating that the patron should push the circulating item against the back wall 26. Also, the microprocessor 60 at a block 1128 increments the reposition counter R6, and program flow proceeds to the point 1103.

If the count accumulated by the reposition counter R6 exceeds the predetermined R6 threshold, the microprocessor 60 at a block 1129 provides a screen display SCR-34 indicating that the position of the circulating item on the cradle 14 is incorrect and directing the patron to ask for help. Thereafter, the microprocessor 60 sets the scan line projected by the reader 18 to long and flashing. Assuming that the walkaway-item-removed timer T24 does not time out, program flow proceeds to the block 1108.

If the microprocessor 60 is at the point 1103, and if a maximum event timer T11 times out before (i) the patron's library card is removed from the cradle 14, (ii) the patron initiates a termination sequence, (iii) a video cassette has been inserted into the video slot 30 of the self-service library terminal 10, (iv) both of the photoelectric sensors 20 and 22 are covered, (v) the idle indication is not read and neither of the photoelectric sensors 20 and 22 is covered, and (vi) an item identifier is read by the reader 18, the identification read by the reader 18 is not a patron's ID, both of the photoelectric sensors 20 and 22 are not covered, and the maximum event timer T22 has timed out, the microprocessor 60 at a block 1130 provides a screen display SCR-33 directing the patron to place a book, a CD, or a video in the appropriate circulating item receiving area, and program flow proceeds to the point 1103.

Figure 16:
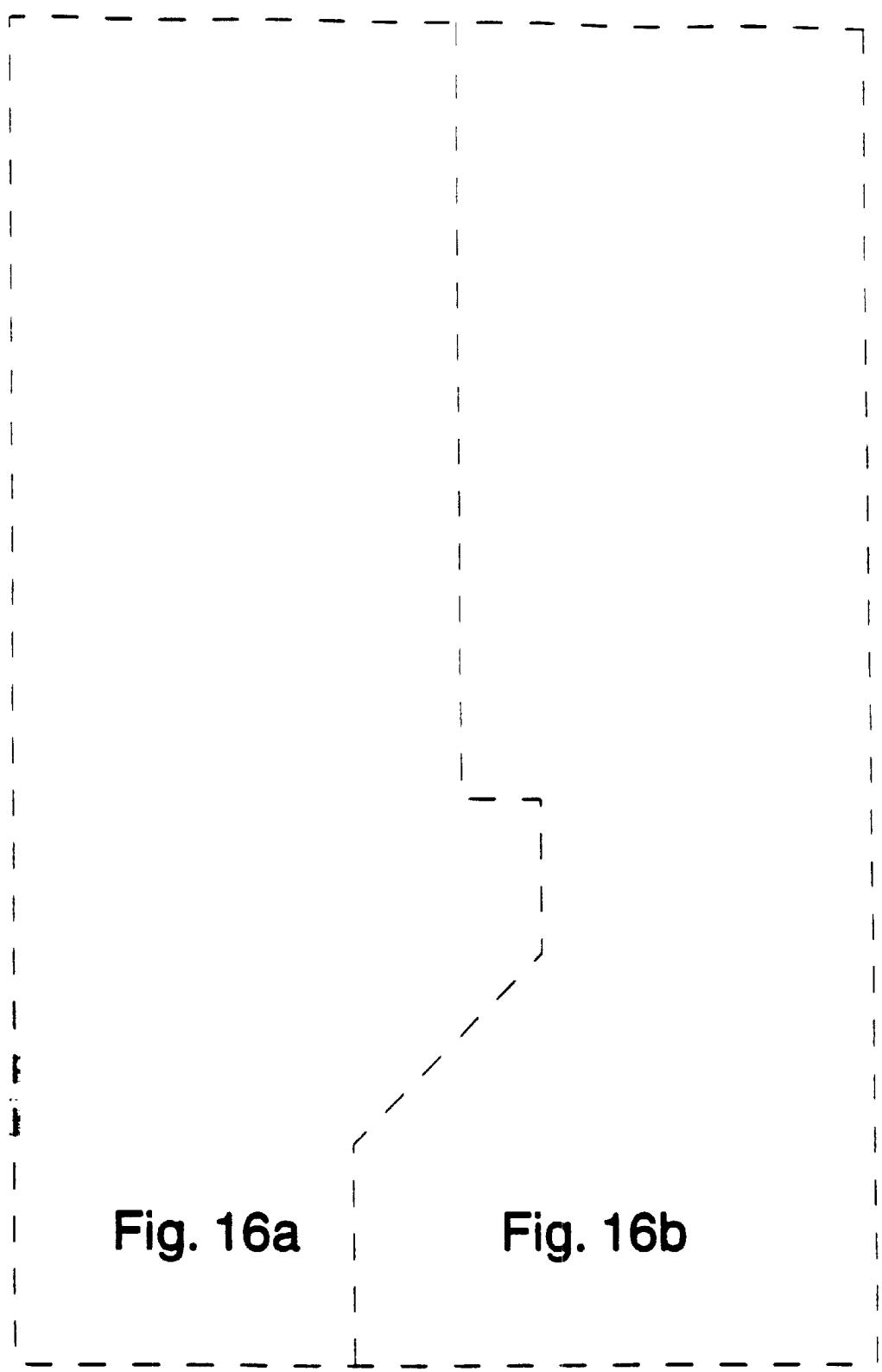
Figure 16A:
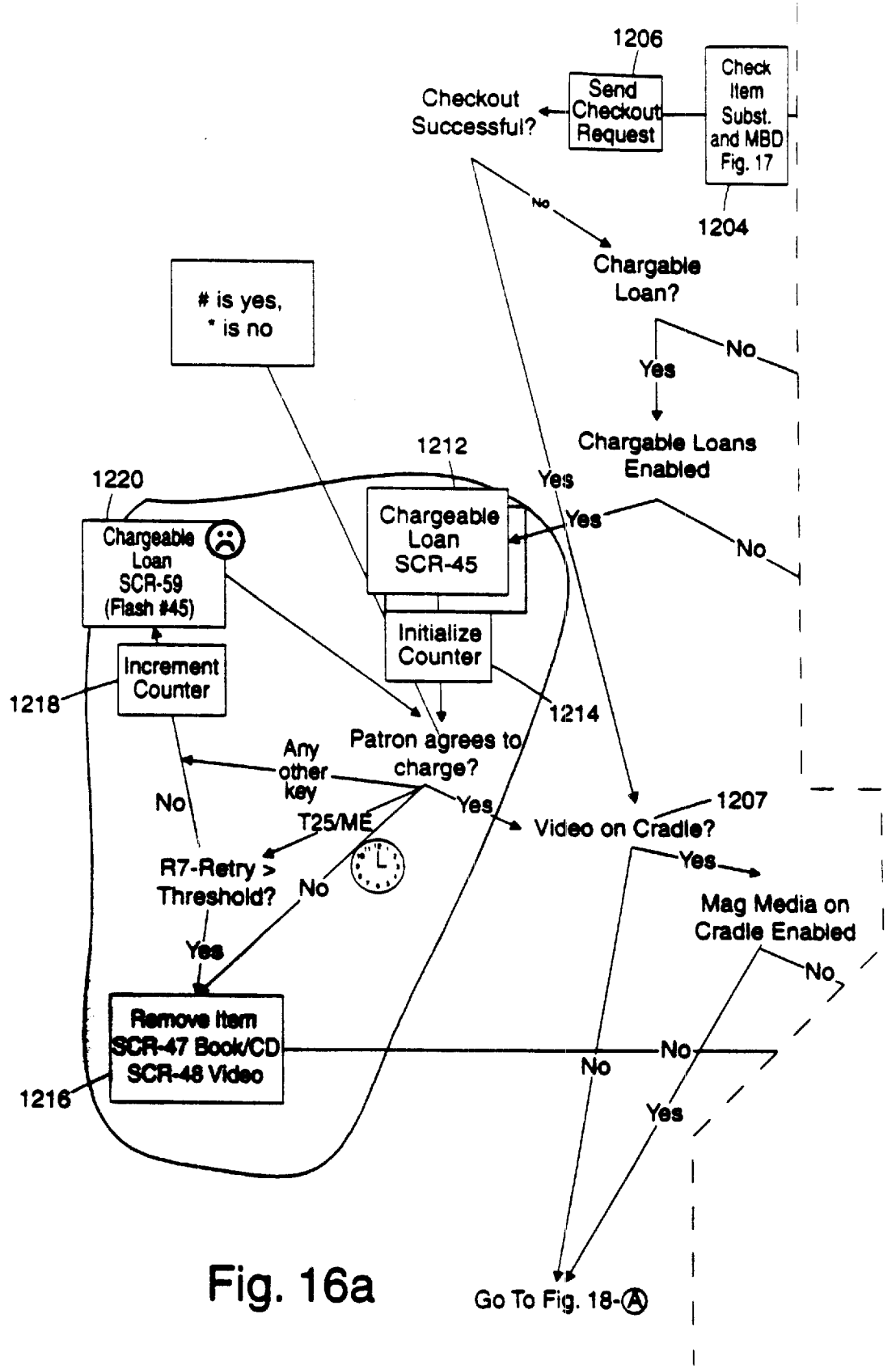
Figure 16B:
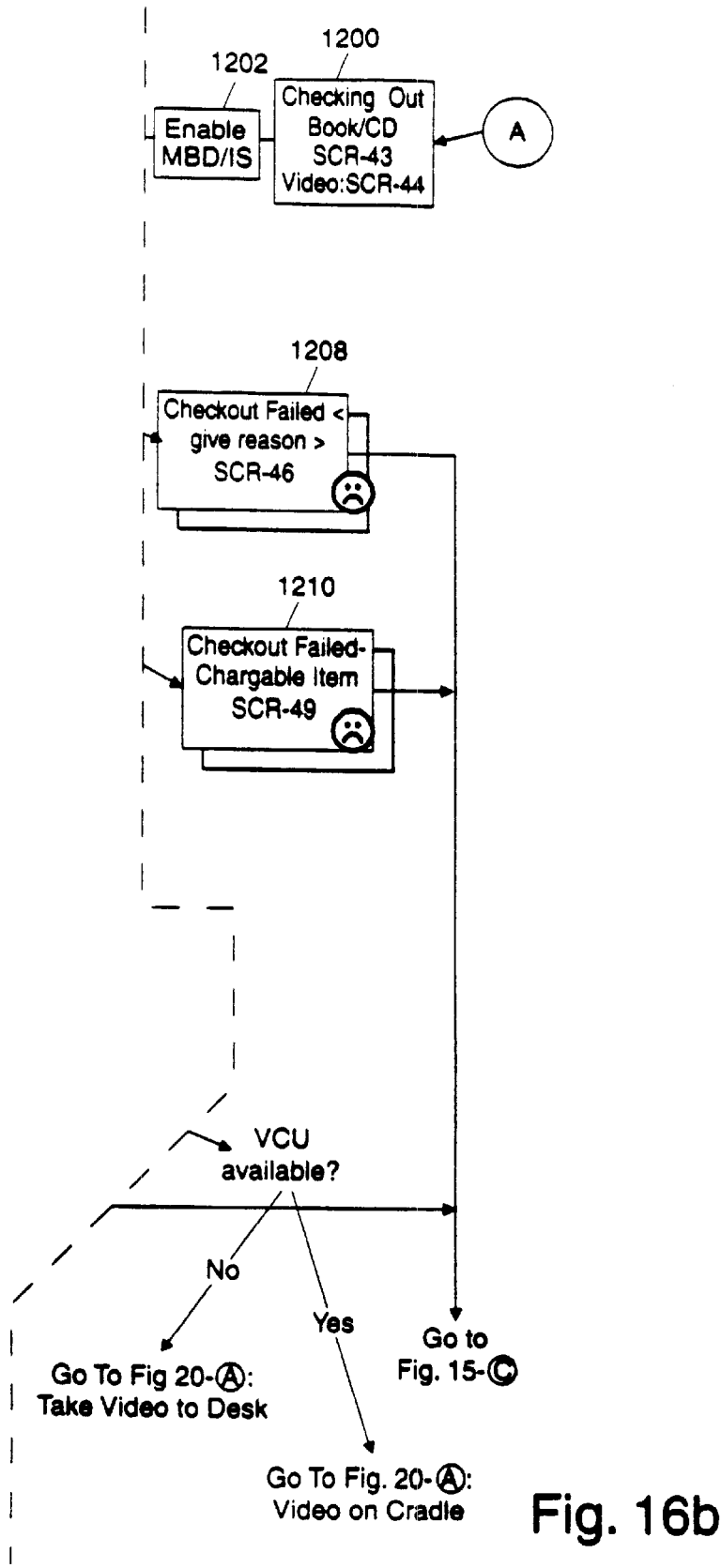

The routine shown in FIG. 16 is entered from FIG. 15. When the routine shown in FIG. 16 is entered, the microprocessor 60 at a block 1200 provides a screen display SCR-43 indicating that a book/CD is being checked out by the self-service library terminal 10, or a screen display SCR-44 indicating that a video is being checked out by the self-service library terminal 10. Thereafter, the microprocessor 60 at a block 1202 enables multiple book detection (so that this function begins running) and, at a block 1204, enters the multiple book detection routine shown in FIG. 17. Assuming that the routine shown in FIG. 17 returns to the routine shown in FIG. 16, the microprocessor 60 at a block 1206 sends a checkout request to the data server 50 of the library. If the data server 50 determines that checkout is successful, the microprocessor 60 at a point 1207 determines whether a video is on the cradle 14. If a video is not on the cradle 14, program flow proceeds to point A of FIG. 18 in order to execute final checkout processing.

However, if a video is on the cradle 14, then the microprocessor 60 determines whether a Magnetic Media on Cradle option is enabled. (A library may decide to allow a patron to check out videos from the cradle 14.) If so, program flow proceeds to point A of FIG. 18. If the library decides not to allow a patron to check out videos from the cradle 14, the microprocessor 60 determines whether a VCU (video check out unit) is available. For example, the microprocessor 60 determines whether the self-service library terminal 10 is equipped with the video slot 30 and a video identification reader in order to process video checkouts. If a VCU is not available, program flow proceeds to point A of FIG. 20 in order to undo all of the checkout processing executed thus far, and a take-video-to-desk flag is set. If a VCU is available, then program flow proceeds to point A of FIG. 20, and a video-on-cradle flag is set.

If the checkout is not successful, the microprocessor 60 determines whether the patron must pay a charge in order to check out the particular circulating item being processed. If a charge for this circulating item is not required, the microprocessor 60 at a block 1208 provides a screen display SCR-46 indicating that the checkout has failed and provides the specific reason why the checkout failed. Thereafter, program flow proceeds to point C of FIG. 15.

If a charge for this circulating item is required, the microprocessor 60 determines whether the self-service library terminal 10 is enabled to process chargeable loans. If the self-service library terminal 10 is not enabled to process chargeable loans, the microprocessor 60 at a block 1210 provides a screen display SCR-49 indicating that the checkout has failed and further indicates that the particular item being checked out is a chargeable item. Thereafter, flow proceeds to point C of FIG. 15.

If the self-service library terminal 10 is enabled to process chargeable loan, the microprocessor 60 at a block 1212 provides a screen display SCR-45 indicating that the circulating item is a chargeable item and asking the patron if the patron agrees to the charge. The microprocessor 60 also initializes a please-answer counter R7 at a block 1214. Thereafter, the microprocessor 60 at a point 1215 determines whether the patron agrees to the charge. If the patron agrees to the charge (by pressing the # key on the keypad 32), program flow proceeds to the point 1207. If the patron does not agrees to the charge (by pressing the * key on the keypad 32), the microprocessor 60 at a block 1216 provides either a screen display SCR-47 instructing the patron to remove the book or CD from the cradle 14, or a screen display SCR-48 instructing the patron to remove the video from the video slot 30, as appropriate. Thereafter, program flow returns to point C of FIG. 15.

If the patron at the point 1215 presses a key other than the # or * key on the keypad 32, the microprocessor 60 at a block 1218 increments the please-answer counter R7, and the microprocessor 60 at a block 1220 provides a screen display SCR-59 reminding the patron that the loan is a chargeable loan. Thereafter, program flow returns to the point 1215. If the patron at the point 1215 does not press any key before a maximum event time T25 times out, the microprocessor 60 determines whether the count accumulated by the please-answer counter R7 has exceeded a predetermined R7 threshold. If the count accumulated by the please-answer counter R7 has exceeded the predetermined R7 threshold, program flow proceeds to the block 1216. If the count accumulated by the please-answer counter R7 has not exceeded the predetermined R7 threshold, program flow proceeds to the block 1218.

Figure 17:
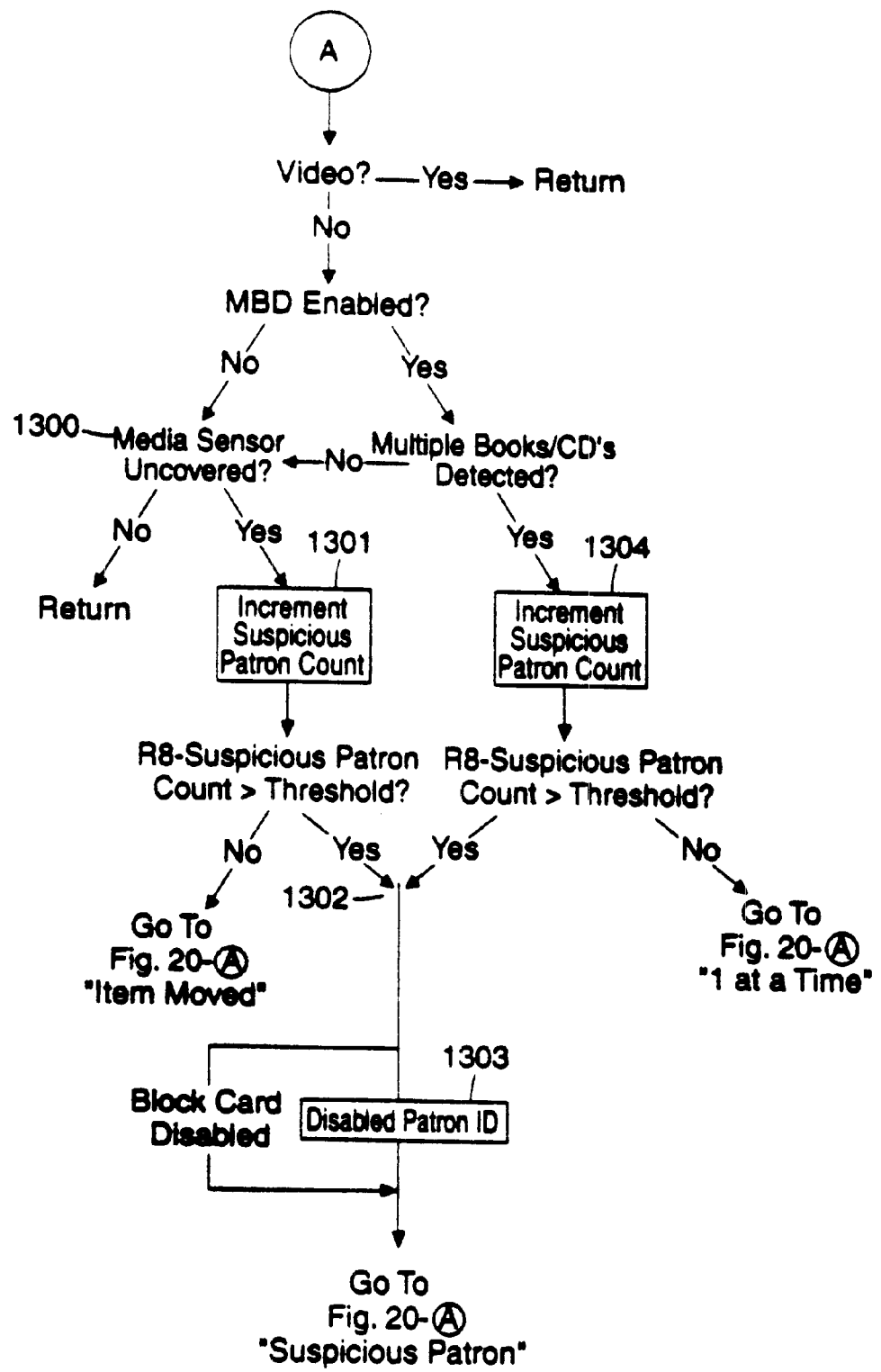

The multiple book detection processing indicated at the block 1204 in FIG. 16 is shown in FIG. 17. When the routine of FIG. 17 is entered, the microprocessor 60 first determines whether the circulating item being checked out is a video. If the circulating item is a video, then execution of the processing shown in FIG. 17 is inappropriate and flow returns to the block from which the routine shown in FIG. 17 was entered.

If the circulating item is not a video, the microprocessor 60 determines whether the multiple book detection (MBD) option has been enabled, such as by the library staff. If the multiple book detection option has not been enabled (so that the block 1202 has no practical effect), the microprocessor 60 at a point 1300 determines whether the photoelectric sensors 20 and 22 are uncovered. If the photoelectric sensors 20 and 22 are covered, program flow returns to the block from which the routine shown in FIG. 17 was entered. On the other hand, if the photoelectric sensors 20 and 22 are uncovered (for example, the patron using the self-service library terminal 10 may have started the checkout process with a book that can be checked out and thereafter substituted a book that cannot be checked out), the microprocessor 60 at a block 1301 increments a suspicious-patron counter R8. The microprocessor 60 then determines whether the count accumulated by the suspicious-patron counter R8 is in excess of a predetermined R8 threshold. If the count accumulated by the suspicious-patron counter R8 is not in excess of the predetermined R8 threshold, program flow proceeds to point A of FIG. 20 and an item-moved flag is set. If the count accumulated by the suspicious-patron counter R8 is in excess of the predetermined R8 threshold, program flow proceeds through a point 1302 where the microprocessor 60 at a block 1303 disables the patron's ID if the library has elected the blocked card option. After the patron's library card has been blocked at the block 1303, or if the blocked card option is not elected, program flow proceeds to point A of FIG. 20 and a suspicious-patron flag is set.

If multiple book detection has been enabled, the microprocessor 60 determines whether multiple books and/or CD's are detected on the cradle 14. If multiple books and/or CD's are not detected on the cradle 14, program flow proceeds to the point 1300. On the other hand, if multiple books and/or CD's are detected on the cradle 14, the microprocessor 60 at a block 1304 increments the suspicious-patron counter R8 and then determines whether the count accumulated by the suspicious-patron counter R8 is in excess of the predetermined R8 threshold. If the count accumulated by the suspicious-patron counter R8 is in excess of the predetermined R8 threshold, program flow proceeds to point 1302. If the count accumulated by the suspicious-patron counter R8 is not in excess of the predetermined R8 threshold, program flow proceeds to point A of FIG. 20 and a one-at-a-time flag is set.

Figure 18:
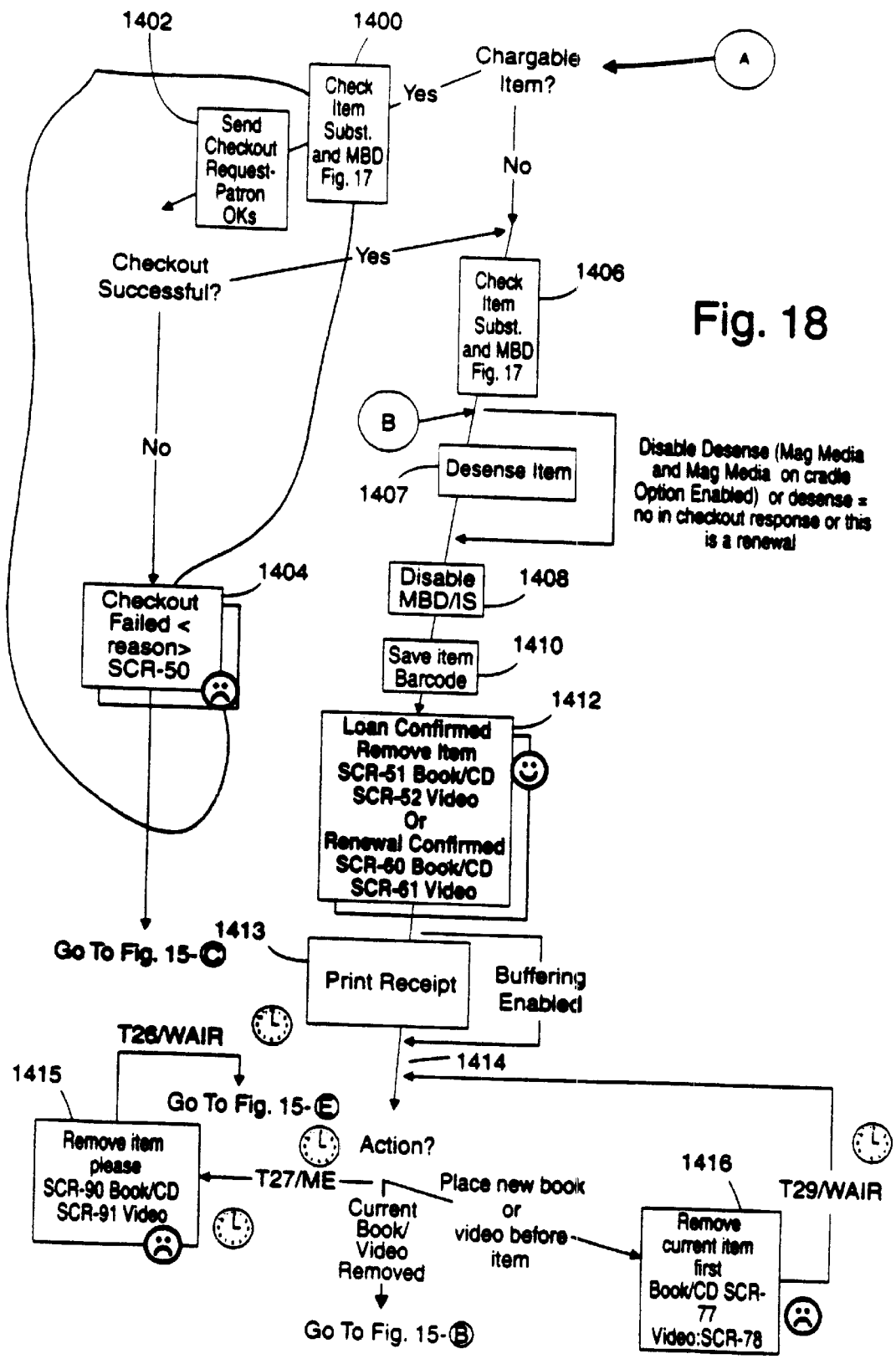

The routine shown in FIG. 18 is entered from the routine shown in FIG. 16. When the routine shown in FIG. 18 is entered, the microprocessor 60 determines whether the circulating item being processed is a chargeable item. If the item is a chargeable item, the microprocessor 60 at a block 1400 then executes the routine shown in FIG. 17 and, assuming a return from FIG. 17 to FIG. 18, the microprocessor 60 at a block 1402 sends a patron check-out request to the data server 50 of the library. If the check-out is not authorized by the data server 50 (for example, the library patron has overdue fines and/or other monies owing and past due), the microprocessor 60 at a block 1404 provides a screen display SCR-50 indicating that checkout has failed and provides the specific reason for checkout failure, and then program flow proceeds to point C of FIG. 15.

If the loan is not a chargeable loan, or if the checkout authorization is given, the microprocessor 60 at a block 1406 executes the multiple book detection routine shown in FIG. 17. Assuming that the multiple book detection routine of FIG. 17 returns to FIG. 18, the microprocessor 60 at a block 1407 energizes the sensitizer/desensitizer 24 in order to desense the security marker in the circulating item currently being checked out. On the other hand, the block 1407 is bypassed if the desensitization function is disabled or if the loan transaction is a renewal. Thereafter, the microprocessor 60 disables multiple book detection at a block 1408, saves the item identifier of the circulating item being checked out at a block 1410, and at a block 1412 provides a screen display SCR-51 indicating that the loan of a book or CD has been confirmed or a screen display SCR-52 indicating that the loan of a video has been confirmed. Each of these screens displays also instructs the library patron to remove the book or CD from the cradle 14, or the video slot 30, as appropriate. Alternatively, the microprocessor 60 at the block 1412 provides a screen display SCR-60 indicating that a renewal of a book or CD has been confirmed, or a screen display SCR-61 indicating that a renewal of a video has been confirmed, as appropriate. Each of these screens displays also instructs the library patron to remove the book or CD from the cradle 14, or the video slot 30, and also instructs the library patron to place the next item on the cradle 14 or in the video slot 30, as appropriate.

Thereafter, the microprocessor 60 at a block 1413 controls the printer 70 to print a receipt at this time, unless print buffering is enabled in which case the loan transaction is buffered in the memory 62. Thereafter, the microprocessor 60 at a point 1414 determines an appropriate action. For example, if a maximum event timer T27 times out before the current book or CD is removed from the cradle 14 or the current video is removed from the video slot 30, the microprocessor 60 at a block 1415 provides either a screen display SCR-90 directing the patron to remove the book or CD from the cradle 14 or a screen display SCR-91 directing the patron to remove the video from the video slot 30, as appropriate. Thereafter, once the item is removed, program flow proceeds to point E of FIG. 15 unless a walkaway-item-removed timer T26 first times out before the circulating item is removed, in which case program flow proceeds to either FIG. 22 or FIG. 23, as appropriate. If the microprocessor 60 determines that the book or CD has been removed from the cradle 14 or that the video has been removed from the video slot 30, as appropriate, program flow proceeds to point B of FIG. 15. If the microprocessor 60 determines that a new book has been placed on the cradle 14 or a new video has been placed in the video slot 30 before the current book or CD is removed from the cradle 14 or before the current video is removed from the video slot 30, the microprocessor 60 at a block 1416 provides either a screen display SCR-77 requesting the library patron to first remove the current book or CD from the cradle 14 or a screen display SCR-78 requesting the library patron to first remove the current video from the video slot 30, as appropriate. Thereafter, program flow returns to the point 1414 unless all items are removed before a walkaway-item-removed timer T29 times out, in which case program flow proceeds to either FIG. 22 or FIG. 23, as appropriate.

The routine shown in FIG. 19 is entered from the routine shown in FIG. 15. When the routine shown in FIG. 19 is entered, the microprocessor 60 determines an appropriate action. For example, if a video is pulled out of the video slot 30, program flow proceeds to point E of FIG. 15 where the library patron is informed that the self-service library terminal 10 is ready to process the next item.

If the microprocessor 60 determines that a video has been fully inserted into the video slot 30, the microprocessor 60 at a point 1500 determines whether an item identifier is read from the video in the video slot 30. If an item identifier is read from the video in the video slot 30, the microprocessor 60 determines whether the item identifier has already been processed. If the item identifier has not already been processed, program flow proceeds to point A of FIG. 16. If the item identifier has already been processed, the microprocessor 60 determines whether the item identifier is on a list of canceled or failed item identifiers. If the item identifier is on this list, the microprocessor 60 at a block 1501 provides a screen display SCR-63 directing the patron to take the video to the circulation desk. Thereafter, program flow proceeds to point C of FIG. 15. If the item identifier is not on the canceled or failed list, the microprocessor 60 at a block 1502 provides a screen display SCR-40 indicating that the video has already been checked out. Thereafter, program flow proceeds to point C of FIG. 15.

If a maximum event timer T31 times out before an item identifier is read from the video fully inserted into the video slot 30, the microprocessor 60 determines whether the count of the reposition counter R6 has exceeded the predetermined R6 threshold. If the count accumulated by the reposition counter R6 is greater than the predetermined R6 threshold, the microprocessor 60 at a block 1504 provides a screen display SCR-39 informing the patron that the self-service library terminal 10 cannot read the item identifier from the video and to take the video to the circulation desk. Thereafter, program flow proceeds to point C of FIG. 12. On the other hand, if the count accumulated by the reposition counter R6 is less than the predetermined R6 threshold, the microprocessor 60 at a block 1506 provides a screen display SCR-85 directing the patron to reposition the video in the video slot 30. The microprocessor 60 also increments the count of the reposition counter R6 at a block 1508, and program flow then proceeds to point D of FIG. 15.

If a maximum event timer T30 times out before the video is pulled out of the video slot 30 or before the video is fully inserted into the video slot 30, the microprocessor 60 at a block 1510 provides a screen display SCR-42 instructing the patron to fully insert the video into the video slot 30. Thereafter, the microprocessor 60 functions in one of three ways. First, if the video is fully inserted into the video slot 30, program flow proceeds to the point 1500. Second, if a maximum event timer T32 times out before the video is pulled out of the video slot 30 or before the video is fully inserted into the video slot 30, the microprocessor 60 at a block 1512 provides a screen display SCR-41 indicating that the patron should take the video out of the video slot 30 and to try reinserting the video into the video slot 30. Thereafter, program flow proceeds to point C of FIG. 15. Third, if the microprocessor 60 determines that the video has been pulled out of the video slot 30 before its item identifier has been read, program flow proceeds to point E of FIG. 15.

Figure 20:
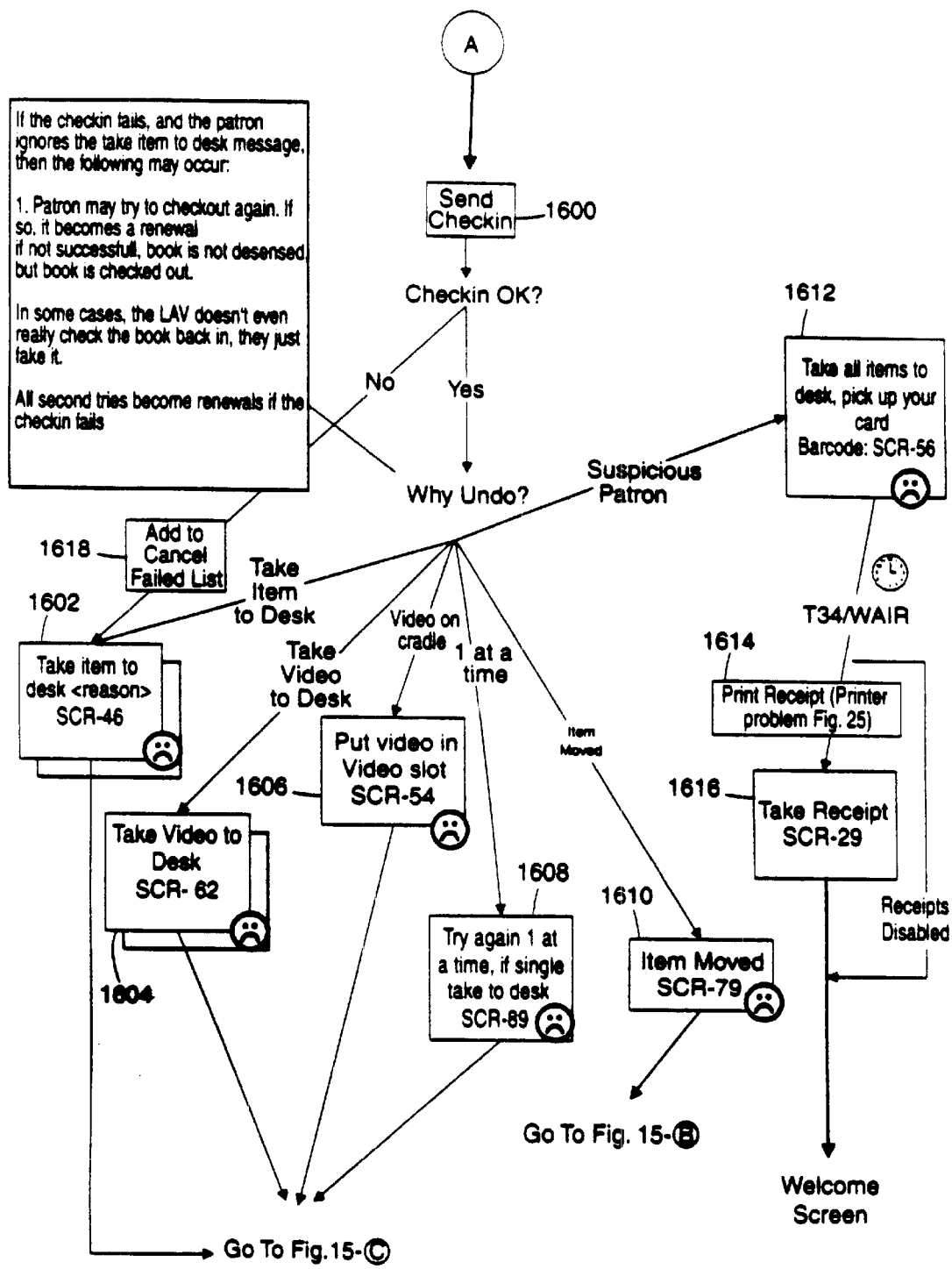

The routine shown in FIG. 20 is entered from the routine shown in FIG. 16 or the routine shown in FIG. 17, as appropriate. When the routine shown in FIG. 20 is entered, the microprocessor 60 at a block 1600 sends a check-in request to the data server 50. If check-in is authorized by the data server 50, the microprocessor 60 determines the reason for the checkin. These reasons depend upon which flags were set as a result of processing by the routines of FIGS. 16 and 17.

For example, if the take-item-to-desk flag is set, the microprocessor 60 at a block 1602 provides the screen display SCR-46 directing the patron to take the circulating item (the book or CD) to the circulation desk. Thereafter, program flow proceeds to point C of FIG. 15.

On the other hand, if the take-video-to-desk flag is set, the microprocessor 60 at a block 1604 provides a screen display SCR-62 directing the patron to take the video to the circulation desk, and program flow thereafter proceeds to point C of FIG. 15.

If the video-on-cradle flag is set, the microprocessor 60 at a block 1606 provides a screen display SCR-54 directing the patron to put the video in the video slot 30. Thereafter, program flow proceeds to point C of FIG. 15.

If the one-at-a-time flag is set, the microprocessor 60 at a block 1608 provides the screen display SCR-89 directing the library patron to try again checking out items one at a time and, if the library patron had been trying to check out items one at a time, to take the item to the circulation desk for further processing. Thereafter, program flow proceeds to point C of FIG. 15.

If the item-moved flag is set, the microprocessor 60 at a block 1610 provides a screen display SCR-79 informing the library patron that the item has been moved. Thereafter, processing proceeds to point B of FIG. 15.

If the suspicious-patron flag is set, the microprocessor 60 at a block 1612 provides a screen display SCR-56 directing the library patron to take all circulating items to the circulation desk and to pick up the patron's library card. Thereafter, if a walkaway-item-removed timer T34 times out before the patron picks up the patron's library card from the self-service library terminal 10, program flow proceeds to a walkaway routine similar to the routines shown in FIGS. 22 and 23. On the other hand, if the patron picks up the patron's library card from the self-service library terminal 10 before the walkaway-item-removed timer T34 times out, the microprocessor 60 at a block 1614 causes the printer 70 to print a receipt, unless the printer 70 has a problem, and the microprocessor 60 at a block 1616 provides a screen display SCR-29 directing the library patron to take the receipt from the printer slot 36. However, if the printing of receipts is disabled, program flow bypasses the blocks 1614 and 1616. Thereafter, program flow returns to the welcome screen.

If checkin is not authorized by the data server 50, the microprocessor 60 at a block 1618 adds the circulating item to the canceled or failed list, and program flow proceeds to the block 1602.

Figure 28:
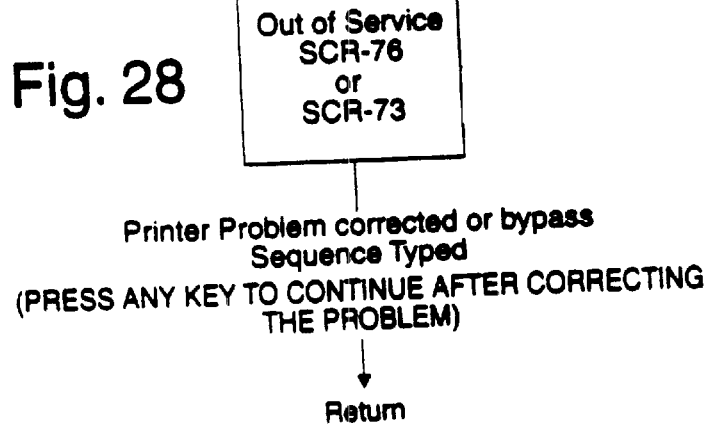
FIG. 28 illustrates an out-of-service routine performed by the self-service library terminal illustrated in FIG. 1.

The terminate session routine is entered from FIGS. 8, 10, and 15 and is shown in FIG. 21. This routine is entered when a library card is removed or the terminate session key sequence has been pressed. Upon those occurrences, the microprocessor 60 at a block 1700 causes the printer 70 to print a receipt (unless the printer 70 has a problem, in which case the routine of FIG. 28 is executed), and at a block 1702 provides the screen display SCR-29 directing the patron to take the receipt from the printer slot 36. If the printing of receipts is disabled, the blocks 1700 and 1702 are bypassed. Thereafter, program flow returns to the welcome screen.

When the routine shown in FIG. 22 is entered, the microprocessor 60 has determined that an appropriate walkaway timer has expired. The microprocessor 60 determines whether the current transaction is a check-in transaction. If the current transaction is a check-in transaction, the microprocessor 60 at a block 1800 instructs the printer 70 to print a receipt indicating the end of the session, and then determines whether items are on the cradle 14 or in the video slot 30. If items are not on the cradle 14 or in the video slot 30, program flow returns to the welcome screen. On the other hand, if items are on the cradle 14 or in the video slot 30, the microprocessor 60 at a block 1802 provides a screen display SCR-26 instructing any patron at or approaching the self-service library terminal 10 that the self-service library terminal 10 is in a walk-away condition and requesting that the self-service library terminal 10 be cleared. The microprocessor 60 flashes the screen display SCR-26 every thirty seconds and repeats a walk-away tone three times, as indicated by the light bulb symbol. (Accordingly, this walk-away tone indicates that the self-service library terminal 10 requires attention or servicing). Thereafter, the microprocessor 60 determines whether a patron's library card is on the self-service library terminal 10 or whether there is a circulating item on the cradle 14 or in the video slot 30. If a patron's library card is on the self-service library terminal 10, or if there is a circulating item on the cradle 14 or in the video slot 30, the self-service library terminal 10 waits in this state. If a patron's library card is not on the self-service library terminal 10, or if there is no circulating item on the cradle 14 or in the video slot 30, program flow returns to the welcome screen.

If the current transaction is not a checkin transaction, the microprocessor 60 at a block 1804 disables the patron's library card (if the library has chosen this option and if the microprocessor 60 determines that a library card was read) so that it is blocked and cannot be used again. The microprocessor 60 at a block 1806 then provides the screen display SCR-26 indicating that the self-service library terminal 10 is in a walk-away condition and requesting that the self-service library terminal 10 be cleared. The microprocessor 60 flashes the screen display SCR-26 every thirty seconds and repeats a walk-away tone three times, as indicated by the light bulb symbol. (Accordingly, this walk-away tone indicates that the self-service library terminal 10 requires attention or servicing.) Thereafter, the microprocessor 60 determines whether a patron's library card is on the self-service library terminal 10 or whether there is a circulating item on the cradle 14 or in the video slot 30. If a patron's library card is on the self-service library terminal 10, or if there is a circulating item on the cradle 14 or in the video slot 30, the self-service library terminal 10 waits in this state. If a patron's library card is not on the self-service library terminal 10, or if there is a circulating item on the cradle 14 or in the video slot 30, program flow returns to the welcome screen.

When the routine shown in FIG. 23 is entered, the microprocessor 60 has determined that a walkaway timer expired and, at a block 1900, turns off the reader 18 so that no scan line is projected into the cradle 14. The microprocessor 60 then determines whether there are circulating items on the cradle 14 or in the video slot 30. If circulating items are not on the cradle 14 or in the video slot 30, program flow returns to the welcome screen. On the other hand, if there are circulating items on the cradle 14 or in the video slot 30, the microprocessor 60 at a block 1902 provides the screen display SCR-26 indicating that the self-service library terminal 10 is in a walk-away condition and requesting that the self-service library terminal 10 be cleared. Thereafter, the microprocessor 60 determines whether there are still circulating items on the cradle 14 or in the video slot 30. If circulating items are still on the cradle 14 or in the video slot 30, the microprocessor 60 remains in this state until the circulating items are removed. Also, the microprocessor 60 repeats the walk-away tone three times and flashes the walk-away screen display SCR-26 every thirty seconds. If circulating items are not on the cradle 14 or in the video slot 30, program flow returns to the welcome screen.

The routine shown in FIG. 24 is entered when the self-service library terminal 10 is configured only for checkin. At start-up, if the staff of the library in which the self-service library terminal 10 is used determines that the self-service library terminal 10 is not to be used during a particular time period, then the microprocessor 60 at a block 2000 retrieves the out-of-service screen display SCR-28 from the memory 62 and displays that out-of-service screen display on the display 28. On the other hand, if the microprocessor 60 detects an error at start up, then the microprocessor 60 as indicated by a block 2002 retrieves the out-of-service screen display SCR-82 from the memory 62 and displays this out-of-service screen display on the display 28.

As indicated in FIG. 4, the self-service library terminal 10 may be arranged to allow the patron to continue under certain error conditions.

However, assuming that the staff of the library has not determined that the self-service library terminal 10 is not to be used during a particular time period, and assuming that the microprocessor 60 does not detect an error at start up, or if the patron is allowed to continue even though there is an error, the microprocessor 60 at a block 2004 retrieves a screen display SCR-80 directing the patron to place a circulating item on the cradle 14 or in the video slot 30, as appropriate. Thereafter, the microprocessor 60 changes the scan line projected by the reader 18 to a long and flashing (LF) scan line, and program flow proceeds to the point B of FIG. 25.

Figure 25A:
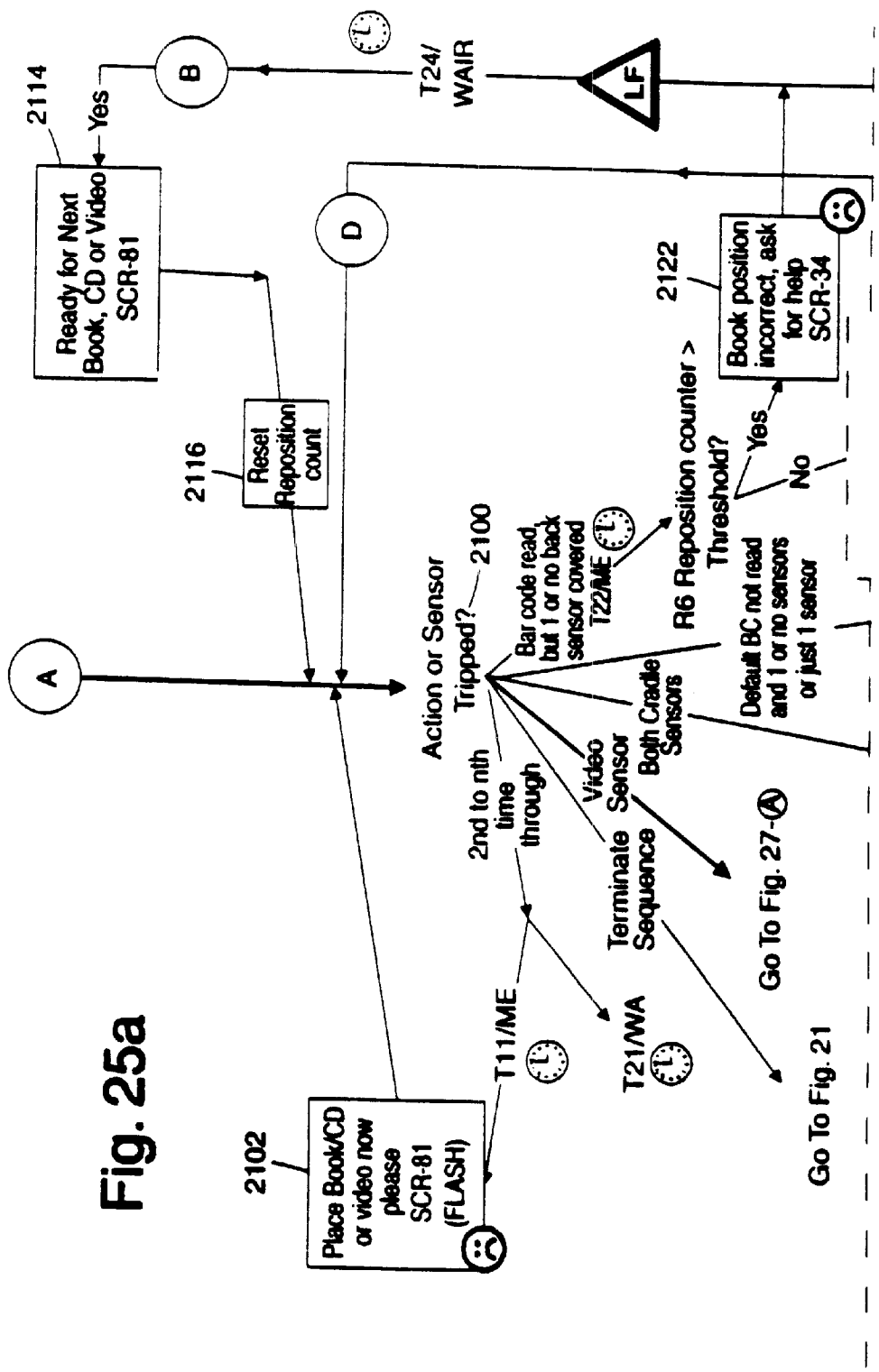
FIGS. 25–27 illustrate a circulating item check in routine performed by the self-service library terminal illustrated in FIG. 1.
Figure 25B:
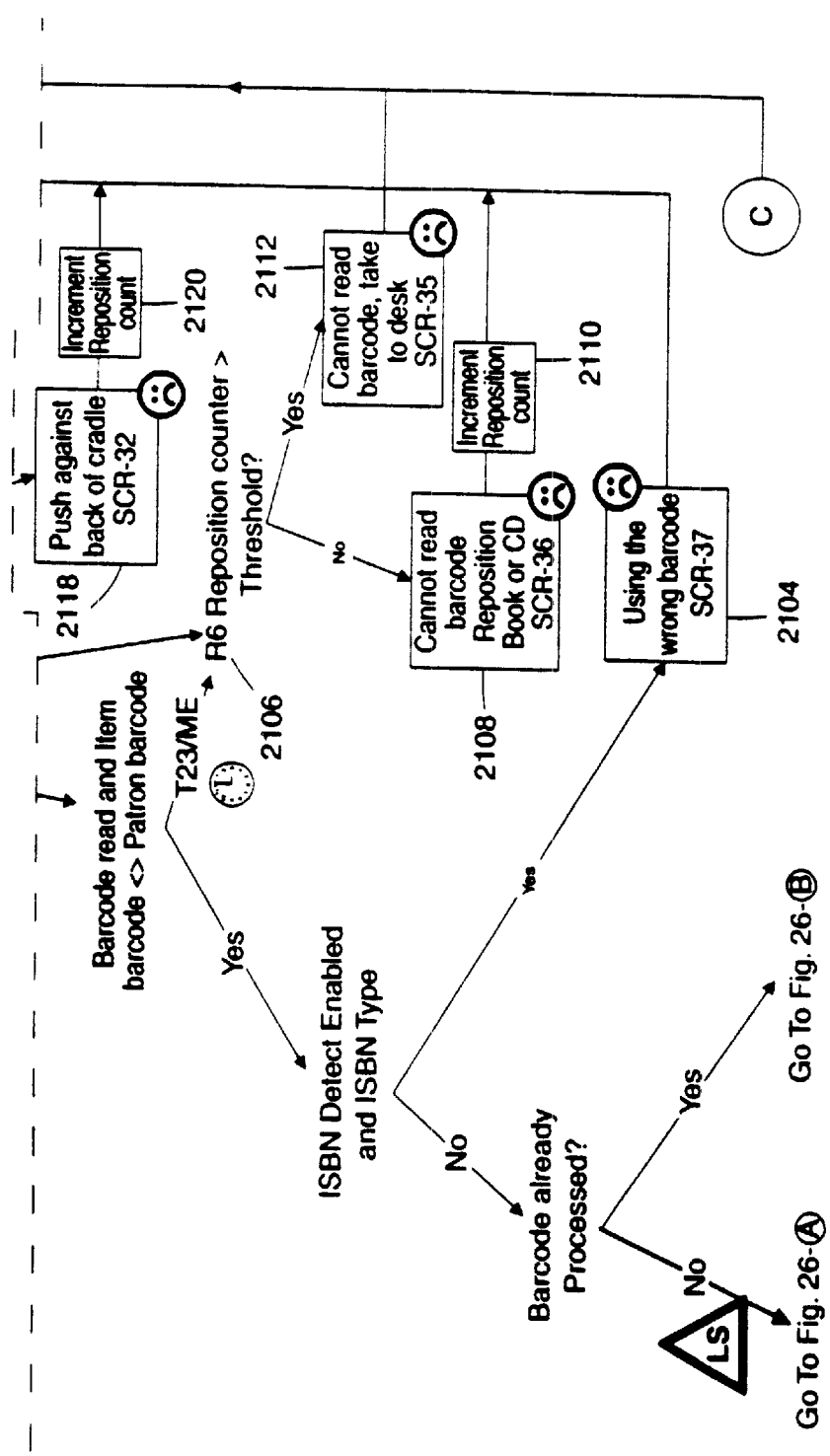

The flow chart of FIG. 25 is entered from FIG. 5 or 24. When the flow chart of FIG. 25 is entered, the microprocessor 60 at a point 2100 determines an appropriate action. For example, if the microprocessor 60 determines that a circulating item has already been checked in during the patron's current session at the self-service library terminal 10, but that the maximum event timer T11 has timed out before the patron takes a further action, the microprocessor 60 at a block 2102 provides the screen display SCR-81 directing the patron to place a book or CD on the cradle or a video in the video slot 30, and program flow returns to the point 2100. On the other hand, if the microprocessor 60 determines that a circulating item has already been checked in during the patron's current session at the self-service library terminal 10, and if the walkaway timer T21 times out before the patron takes any action, the microprocessor 60 executes a walkaway routine similar to those shown in FIGS. 22 and 23.

If the action determined by the microprocessor 60 is that the library patron has initiated a termination sequence desiring to terminate the current transaction, the microprocessor 60 enters the program represented by the flow chart of FIG. 21.

Figure 27:
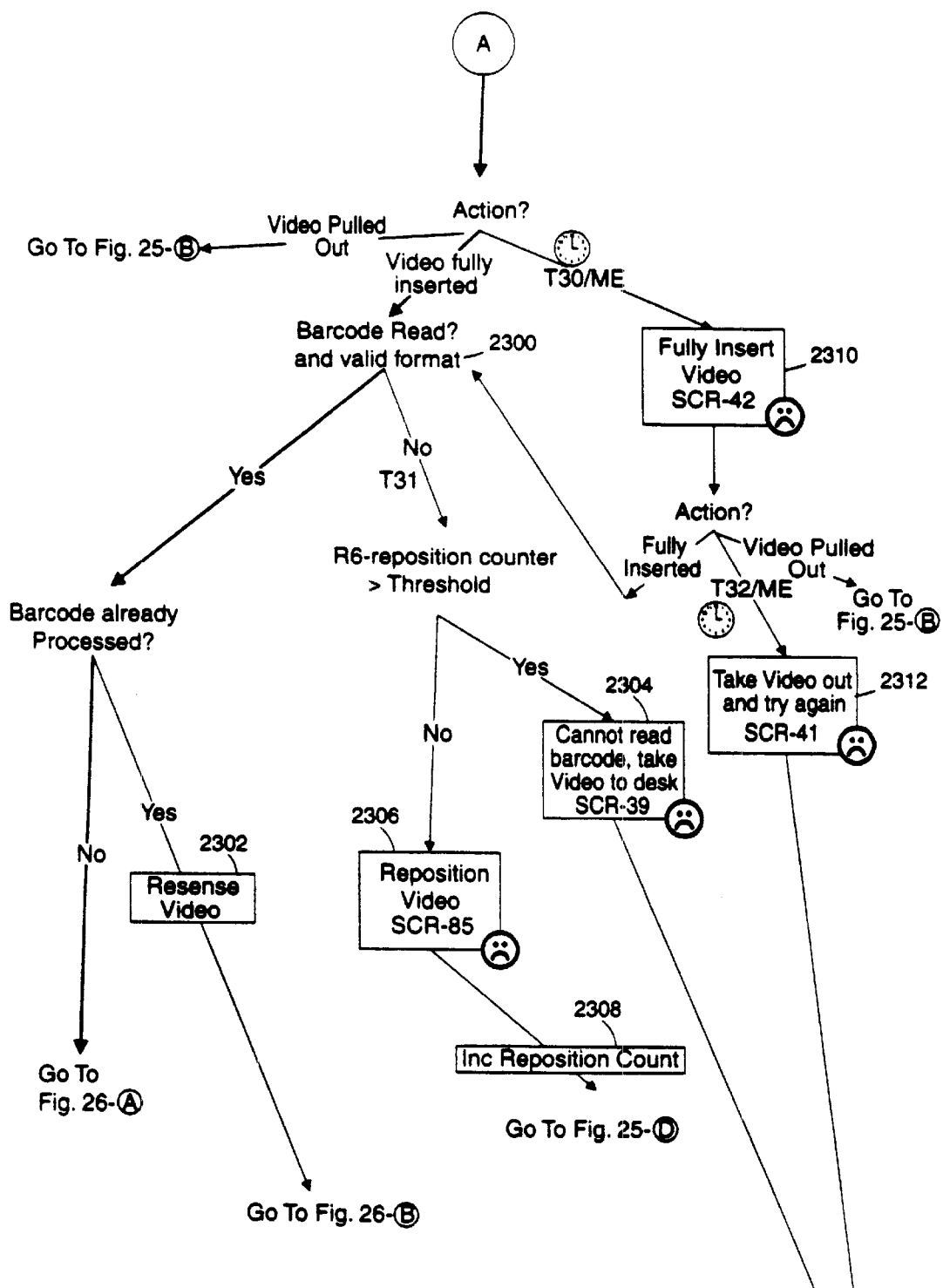

If the action determined by the microprocessor 60 is that a video cassette has been inserted into the video slot 30 of the self-service library terminal 10, program flow proceeds to point A of FIG. 27.

If the action determined by the microprocessor 60 is that both of the photoelectric sensors 20 and 22 are covered, the microprocessor 60 determines whether an item identifier is being read by the reader 18 from a circulating article, and whether the item identifier being read is not a patron ID. If an item identifier is being read by the reader 18 from a circulating item, and if the item identifier being read is not a patron ID, the microprocessor 60 determines whether a code-type check (inspection) is enabled and, if so, whether the item identifier being read by the reader 18 is of an incorrect type (i.e., a type which is different from the item identifier used on circulating items meant to be processed on the cradle 14). If the code-type check is not enabled, or if the reader 18 is reading an item identifier used on circulating items meant to be processed on the cradle 14, the microprocessor 60 determines whether the item identifier read by the reader 18 has been previously processed during the patron's current transaction. If the item identifier read by the reader 18 has not been previously processed during the patron's current transaction, the scan line projected by the reader 18 is controlled so that it is long and steady (LS), and program flow proceeds to point A of FIG. 26 in order to proceed with the checkout of the circulating item that is currently on the cradle 14. On the other hand, if the item identifier read by the reader 18 has been previously processed, program flow proceeds to point B of FIG. 26.

If the code-type check is enabled, and if the reader 18 is not reading an item identifier used on circulating items meant to be processed on the cradle 14, the microprocessor 60 provides the screen display SCR-37 at a block 2104 indicating that the library patron is using the wrong item identifier, and program flow returns to point 2100 of the routine shown in FIG. 25.

If both of the photoelectric sensors 20 and 22 are covered, but if the maximum event timer T23 times out before the reader 18 reads an item identifier on a circulating item, the microprocessor 60 at a point 2106 determines whether the reposition counter R6 has accumulated a count greater than the predetermined R6 threshold. If the reposition counter R6 has not accumulated a count greater than the predetermined R6 threshold, the microprocessor 60 at a block 2108 provides the screen display SCR-36 indicating that the reader 18 cannot read the item identifier and directing the patron to reposition the circulating item on the cradle 14. Also, the microprocessor 60 at a block 2110 increments the reposition counter R6, and program flow proceeds to the point 2100.

If the count accumulated by the reposition counter R6 exceeds the predetermined R6 threshold, the microprocessor 60 at a block 2112 provides the screen display SCR-35 indicating that the reader 18 cannot read the bar code on the circulating item and directing the patron to take the circulating item to the circulating desk for processing by a member of the library staff. Thereafter, the microprocessor 60 sets the scan line projected by the reader 18 to long and flashing (LF). If the patron does not remove the circulating item from the cradle 14 before the walkaway-item-removed timer T24 times out, the walkaway routine of FIG. 22 is entered. If the patron does remove the circulating item from the cradle 14 before the walkaway-item-removed timer T24 times out, program flow proceeds to a block 2114 where the microprocessor 60 provides the screen display SCR-81 indicating that the self-service library terminal 10 is ready for the next circulating item, and resets the reposition counter R6 at a block 2116.

If the action determined by the microprocessor 60 is that the idle indicator 16 is not read (indicating that a circulating item may be on the cradle 14 and covering the idle indicator 16), and that both of the photoelectric sensors 20 and 22 are not covered, the microprocessor 60 proceeds to the point 2106 and follows the flow through the blocks 2108 and 2110, or the block 2112, as described above.

If the action determined by the microprocessor 60 is that an item identifier is read by the reader 18, that both of the photoelectric sensors 20 and 22 are not covered, and that the maximum event timer T22 has timed out, the microprocessor 60 determines whether the reposition counter R6 has accumulated a count greater than the predetermined R6 threshold. If the reposition counter R6 has not accumulated a count greater than the predetermined R6 threshold, the microprocessor 60 at a block 2118 provides the screen display SCR-32 directing the patron to push the circulating item against the back wall 26. Also, the microprocessor 60 at a block 2120 increments the reposition counter R6, and program flow proceeds to the point 2100.

If the count accumulated by the reposition counter R6 exceeds the predetermined R6 threshold, the microprocessor 60 at a block 2122 provides the screen display SCR-34 indicating that the position of the circulating item on the cradle 14 is incorrect and directing the patron to ask for help. Thereafter, the microprocessor 60 sets the scan line projected by the reader 18 to long and flashing. If the patron does not ask for help before the walkaway-item-removed timer T24 times out, program flows proceeds to the walkaway routine shown in FIG. 22. If the patron does not ask for help before the walkaway-item-removed timer T24 times out, program flows proceeds to the block 2114.

Figure 26:
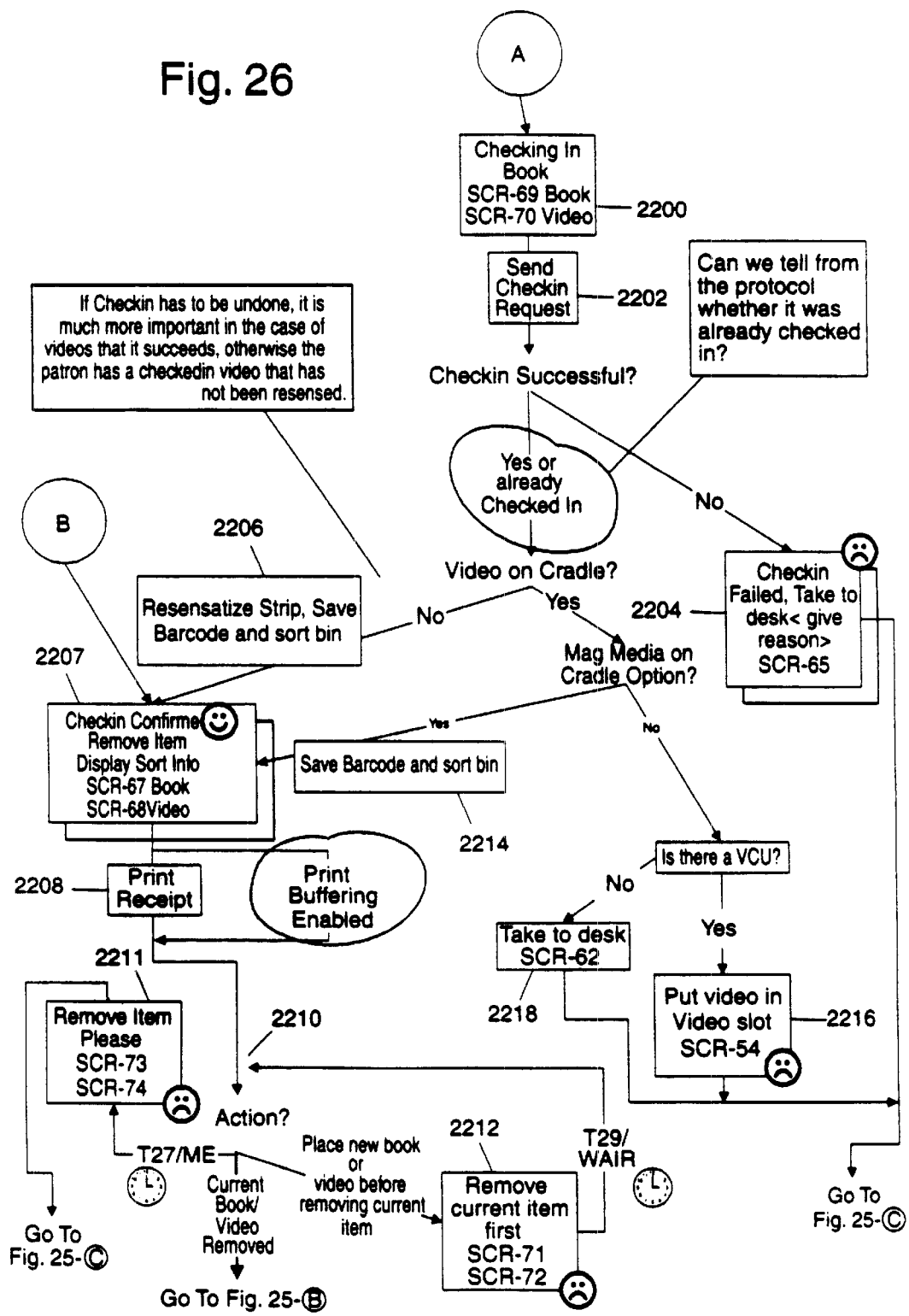

The routine shown in FIG. 26 is entered from the routine shown in FIG. 25. When the routine shown in FIG. 26 is entered through point A, the microprocessor 60 at a block 2200 provides either a screen display SCR-69 indicating that the self-service library terminal 10 is being used to check in a book or CD or a screen display SCR-70 indicating that the self-service library terminal 10 is being used to check in a video, as appropriate. Thereafter, the microprocessor 60 at a block 2202 sends a check-in request to the data server 50 of the circulation system. The microprocessor 60 then determines if checkin is successful. If checkin is not successful, the microprocessor 60 at a block 2204 provides a screen display SCR-65 indicating that checkin has failed, providing the particular reason for the failed checkin, and directing the library patron to take the circulating item to the circulation desk. Thereafter, program flow proceeds to point C of FIG. 25.

If checkin is successful (or if the item has already been checked-in), the microprocessor 60 determines whether a video is on the cradle 14. If a video is not on the cradle 14, the microprocessor 60 at a block 2206 resensitizes the magnetic security marker in the circulating item, saves the item identifier, and designates a storage bin or other location into which the library patron will be directed to place the circulating item. These storage bins may be arranged as sort bins so that, when the microprocessor 60 directs the library patron to place the circulating item into a storage bin, the library patron is in effect sorting the circulating item. Thereafter, the microprocessor 60 at a block 2207 provides either a screen display SCR-67 in the case where a book or a CD is being checked in or a screen display SCR-68 in the case where a video is being checked in. Both of these screen displays confirm the checkin, direct the patron to remove the circulating item, and directs the library patron to place the circulating item into the designated storage bins.

The microprocessor 60 at a block 2208 then directs the printer 70 to print a receipt, unless the information to be printed is being buffered, in which case the block 2208 is bypassed. The microprocessor 60 at a point 2210 then determines which appropriate action to take. For example, if the maximum event timer T27 times out before the current circulating item is removed, the microprocessor 60 at a block 2211 provides either a screen display SCR-73 directing the patron to remove the book or CD from the cradle 14 or a screen display SCR-74 directing the patron to remove the video from the video slot 30. Thereafter, program flow proceeds to point C of FIG. 25.

If the microprocessor 60 determines that the book or CD on the cradle 14 or the video in the video slot 30 has been removed, program flow proceeds to point B of FIG. 25.

If the microprocessor 60 determines that a new book or CD has been placed on the cradle 14 before the current book or CD is removed, or that a new video has been inserted into the video slot 30 before the current video is removed, the microprocessor 60 at a block 2212 provides either a screen display SCR-71 directing the library patron to first remove the current book or CD from the cradle 14, or a screen display SCR-72 directing the library patron to first remove the current video from the video slot 30. If the patron does not remove the circulating item before the walkaway-itemremoved timer T29 times out, program flow proceeds to a walkaway routine similar to the walkaway routines shown in FIGS. 22 and 23. If the patron removes the circulating item before walkaway-item-removed timer T29 times out, program flow returns to point 2210.

If a video is on the cradle 14, the microprocessor 60 determines whether the library has selected the Magnetic Media on Cradle option. If the Magnetic Media on Cradle option has been selected, the microprocessor 60 at a block 2214 essentially executes the same processing as indicated by the block 2206, except that the sensitizer/desensitizer 24 is not energized because, otherwise, information would be lost from the video. Program flow then proceeds to the block 2207. However, if the Magnetic Media on Cradle option has not been selected, the microprocessor 60 determines whether the self-service library terminal 10 has a video slot 30 and a video reader 74 (i.e., a VCU). If the self-service library terminal 10 has a VCU, the microprocessor 60 at a block 2216 provides the screen display SCR-54 directing the patron to put the video in the video slot 30. Thereafter, program flow proceeds to point C of FIG. 25. If the self-service library terminal 10 does not have a VCU, the microprocessor 60 at a block 2218 provides the screen display SCR-62 directing the patron to take the video to the circulation desk. Thereafter, program flow proceeds to point C of FIG. 25.

The routine shown in FIG. 27 is entered from the routine shown in FIG. 25. When the routine shown in FIG. 27 is entered, the microprocessor 60 determines an appropriate action. For example, if a video is pulled out of the video slot 30, program flow proceeds to point B of FIG. 25, where the library patron is informed that the self-service library terminal 10 is ready to process the next item.

If the microprocessor 60 determines that a video has been fully inserted into the video slot 30, the microprocessor 60 at a point 2300 determines whether an item identifier in the proper format is read from the video in the video slot 30. If an item identifier in the proper format is read from the video in the video slot 30, the microprocessor 60 determines whether the item identifier has already been processed. If the item identifier has not already been processed, program flow proceeds to point A of FIG. 26. If the item identifier in the proper format has already been processed, the microprocessor 60 at a block 2302 causes the video to be resensitized, program flow proceeds to point B of FIG. 26. In order to avoid erasing the data on the video, a lower intensity desensitizer should be used.

If an item identifier in the proper format is not read from the video in the video slot 30 before the maximum event timer T31 times out, the microprocessor 60 determines whether the count of the reposition counter R6 has exceeded the predetermined R6 threshold. If the count accumulated by the reposition counter R6 is greater than the predetermined R6 threshold, the microprocessor 60 at a block 2304 provides the screen display SCR-39 informing the patron that the self-service library terminal 10 cannot read the item identifier from the video and directing the patron to take the video to the circulation desk. Thereafter, program flow proceeds to point C of FIG. 25. On the other hand, if the count accumulated by the reposition counter R6 is less than the predetermined R6 threshold, the microprocessor 60 at a block 2306 provides the screen display SCR-85 directing the patron to reposition the video in the video slot 30. The microprocessor 60 also increments the count of the reposition counter R6 at a block 2308, and program flow then proceeds to point D of FIG. 25.

If the maximum event timer T30 times out before the video is pulled out of the video slot 30 or the video is fully inserted into the video slot 30, the microprocessor 60 at a block 2310 provides the screen display SCR-42 instructing the patron to fully insert the video into the video slot 30. Thereafter, the microprocessor 60 functions in one of three ways. First, if the video is fully inserted into the video slot 30, program flow proceeds to the point 2300. Second, if the maximum event timer T32 times out before the video is pulled out of the video slot 30 or the video is fully inserted into the video slot 30, the microprocessor 60 at a block 2312 provides the screen display SCR-41 directing the patron to take the video out of the video slot 30 and to try reinserting the video into the video slot 30. Thereafter, program flow proceeds to point C of FIG. 25. Third, if the microprocessor 60 determines that the video has been pulled out of the video slot 30 before its item identifier has been read, program flow proceeds to point B of FIG. 25.

The routine shown in FIG. 28 is entered from FIGS. 20 and 21 if there is a printer error state. This error state may be entered when the printer 70 is out of paper or when the printer 70 otherwise needs servicing. If the printer 70 is in an error state, the microprocessor 60 at a block 2500 provides either a screen display SCR-76 informing the patron that the printer 70 is out of paper or a screen display SCR-53 informing the patron that there is a general printer error, as appropriate. Alternatively, the self-service library terminal 10 may give the patron the option of proceeding with a checkout or checkin if, for example, the printer problem is merely that the printer 70 is out of paper. Thereafter, program flow returns to the particular block from which the routine shown in FIG. 28 was invoked.

Figure 29:
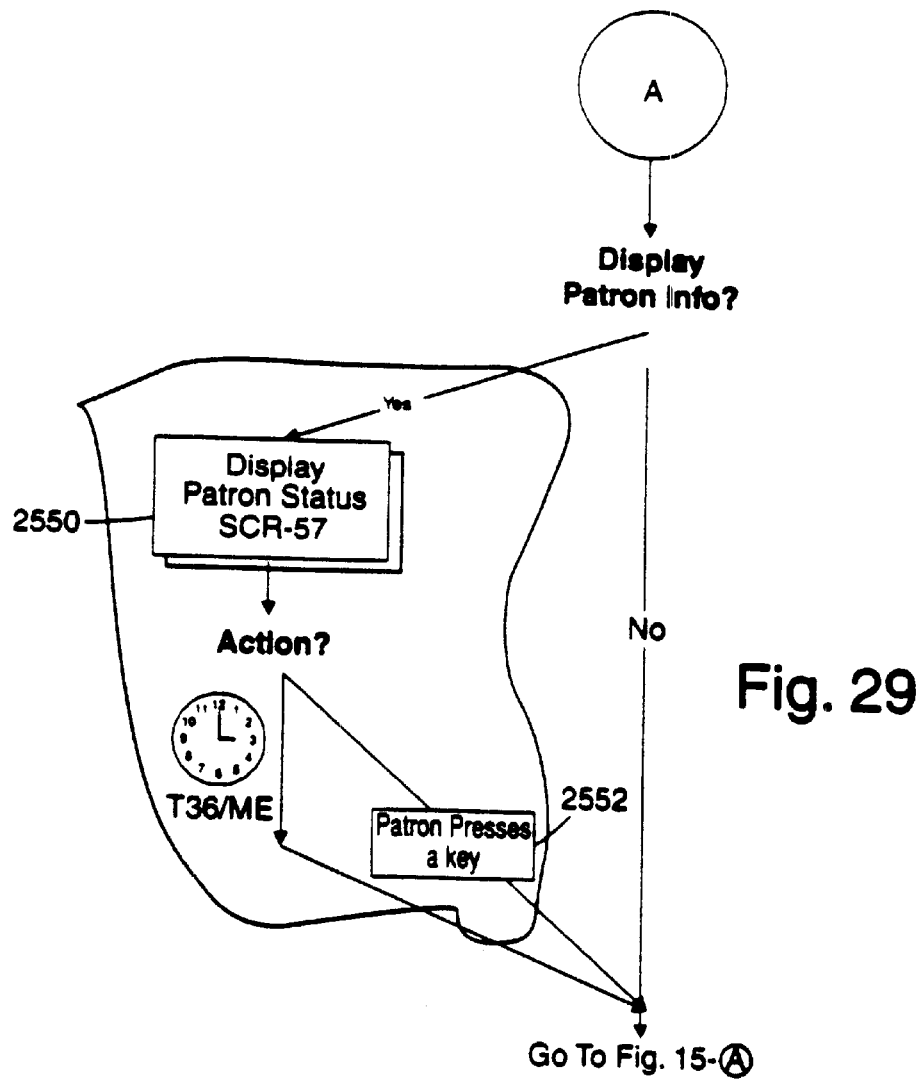
FIG. 29 illustrates a post identification processing routine performed by the self-service library terminal illustrated in FIG. 1.

The routine shown in FIG. 29 is entered from the routines shown in FIGS. 7, 9, 11, and 14. When this routine is entered, the microprocessor 60 determines whether to display patron information (as may be determined by a software switch). If not, program flow proceeds to point A of FIG. 15. If patron information is to be displayed, the microprocessor at a block 2550 provides the screen display SCR-57 informing the patron of the appropriate patron status. Thereafter, the microprocessor 60 determines an appropriate action. For example, if a maximum event timer T36 times out before the patron presses a key on the keypad 32, or if a library patron presses a key of the keypad 32 as indicated by a block 2552, program flow proceeds to point A of FIG. 15.

Figure 30:
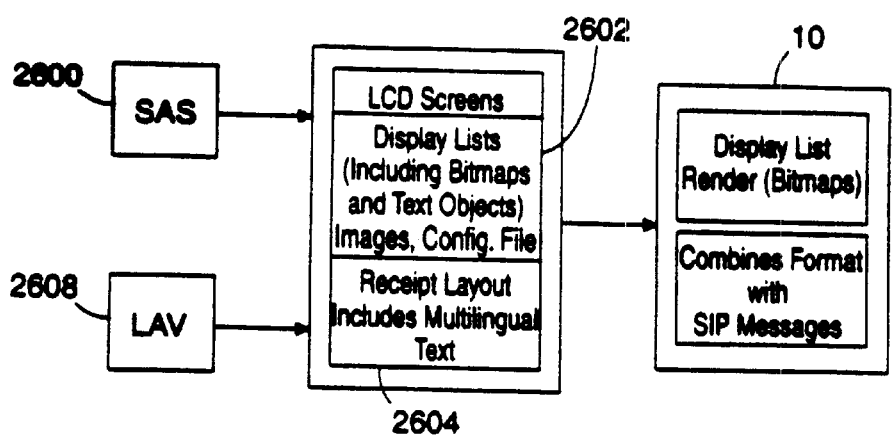
FIG. 30 illustrates an arrangement for configurating the self-service library terminal illustrated in FIG. 1.

FIG. 30 shows how configuration data is prepared using either the data server 50 or the self-check library terminal 10. This configuration data includes, inter alia, screen display layouts, text objects, receipt layouts, receipt text, machine setup data, language selection data, bar code filters, sends/selects, upgrades, diagnostics, host interfaces, fonts, timer durations, and the like. The screen display layouts, receipt layouts, and text objects are configured using a personal computer 2600 (or, alternatively, the self-service library terminal 10) running a configuration program (labeled SAS in FIG. 30). The screen display layouts may be prepared as bit maps by a screen display editor operating on the personal computer 2600 (or, alternatively, the self-service library terminal 10). These screen display bit maps may include the fonts used in the screen displays. Also, the screen display editor may present configuration screens to the user in order to aid the user in preparing the screen display layouts.

The screen display layouts and text are stored in a file 2602, and the receipt layouts and text are stored in a file 2604. The screen display layouts may be stored as bit maps in the file 2602. Message response text is typically configured for or by a library using a personal computer 2608 (or the personal computer 2600) running a configuration program (labeled LAV in FIG. 30). The message response text may be stored along with the configuration data. The configuration data stored in the files 2602 and 2604, together with the message response text are then downloaded into the self-service library terminal 10 in order to configure this terminal.

Certain modifications of the present invention have been discussed above. Other modifications will occur to those practicing in the art of the present invention. For example, the data server 50 is described above as an apparatus on which configuration data can be generated, or a self-service library terminal on which configuration data can be generated, or a gateway such that configuration data is generated on one of the other library terminals 52, 54, 56, 58, . . . n shown in FIG. 2. Alternatively, the terminal 50 can be arranged to function as both a self-service library terminal and a gateway.

Also, as described above, the scan line projected by the reader 18 may be long and steady, long and flashing, short and steady, and short and flashing. However, the scan line projected by the reader 18 may be controlled so that it has different blink rates.

In addition, as described above, the microprocessor 60 provides a sad tone, a happy tone, and a walk-away tone through use of the audible transducer 40. The microprocessor 60 may also be arranged to control the audible transducer 40 so as to provide a tone indicating that the self-service library terminal 10 requires non-walk-away servicing, such as servicing because the printer 70 is out of paper.

Moreover, various maximum event timers have been described above such that, when they time out, program flow proceeds to a predetermined point in the program. As an interim step, however, the library patron may first be asked whether the patron needs additional time. If the patron does not respond within a fixed amount of time, program flow proceeds to the predetermined point in the program. On the other hand, if the patron does respond within the fixed amount of time, the patron is given additional time before program flow proceeds to the predetermined point in the program. Also, the self-service library terminal 10 may be arranged to block the patron's library card if the patron does not respond within the patron's allotted time.

Furthermore, as described above, the microprocessor 60 is arranged to detect a printer error state. Likewise, the microprocessor 60 may be arranged to detect error states other than printer error states. For example, an error state may occur when the communication link 72 is down, or when the reader 18 or the reader 74 is out of service. In any of these error states, the library patron may be given the option of continuing or not continuing with a loan transaction, or the microprocessor 60 may be arranged to simply block the current loan transaction. If any part of the self-service library terminal 10 is out of service, the self-service library terminal 10 may be arranged to notify the patron which part is out of service.

Also, as described above, the cradle 14 is arranged to receive both a book and a CD. Instead, a separate receiving area may be provided in the housing 12 for receiving CD's.

In addition, if the self-service library terminal 10 is enabled to process a chargeable load, and if the patron agrees to the charge, the patron is allowed to proceed. However, if the patron does not agree to the charge, the patron is instructed to remove the circulating item and the patron is not permitted to continue with that circulating item. Instead, the self-service library terminal 10 may be arranged to allow the patron to continue checking out a circulating item even if the patron does not agree to pay a loan fee or fine. Similarly, the self-service library terminal 10 may be arranged to remind the patron of previous exacted fines and of other circulating items that the patron has on hold and that the patron has not yet checked out.

Moreover, as described above, the photoelectric sensors 20 and 22 are used to sense circulating items on the cradle 14. Instead, other types of proximity sensors may be used to sense circulating items on the cradle 14.

Furthermore, as described above, a library patron may choose one of three ways (the keypad 32, the reader 18, or the magnetic stripe reader 34) to enter the patron's identification. Instead, the library in which the self-service library terminal 10 is used may restrict the patron to only one mode or may provide the patron with any number of identification modes greater than or less than three.

Also, more photoelectric sensors than the photoelectric sensors 20 and 22 may be used on the cradle 14.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of preparing configuration data for multiple self-service library terminals and of storing the configuration data in data storage memories of the multiple self-service library terminals, wherein the multiple self-service library terminals are configured by the configuration data to interact with users during loan transactions, the method comprising the following steps:

a) preparing the configuration data on an administration terminal; and b) transferring the configuration data from the administration terminal to the data storage memories of the multiple self-service library terminals, wherein the configuration data includes bit maps.

2. The method of claim 1 wherein at least a first of the self-service library terminals has a video display memory, and wherein the method further comprises the steps of:

c) preparing the bit maps representing screen displays;

d) storing the bit maps in the data storage memory of the first self-service library terminal; and e) transferring the bit maps from the data storage memory of the first self-service library terminal to the video display memory during interaction with at least one of the users.

3. The method of claim 2 wherein step c) comprises the step of preparing the bit maps by use of a screen display editor which is separate from the first self-service library terminal.

4. The method of claim 2 wherein step c) comprises the step of preparing the bit maps by use of a screen display editor which is part of the first self-service library terminal.

5. The method of claim 2 wherein step e) comprises the step of transferring the bit maps from the data storage memory to the video display memory in order to render fonts.

6. The method of claim 1 further comprising the step of reading a code on an article placed on an article receiving area of one of the self-service library terminals.

7. The method of claim 6 wherein the step of reading a code comprises the step of reading a code on a circulating item.

8. The method of claim 6 wherein the step of reading a code comprises the step of reading a code on an identification card.

9. The method of claim 6 wherein the step of reading a code comprises the step of reading an idle indicator on the article receiving area in order to determine whether an article is placed in the article receiving area.

10. The method of claim 1 further comprising the step of sensing proximity of the borrower.

11. The method of claim 1 further comprising the step of presenting the configuration data in screen displays to a user so as to lead the user through configuration of the self-service library terminal.

12. The method of claim 1 wherein the step of transferring the configuration data from the administration terminal to the data storage memories of the multiple self-service library terminals comprises the following steps:
transferring the configuration data from the administration terminal to a first self-service library terminal; and
transferring the configuration data from the first self-service library terminal to a second self-service library terminal.

13. The method of claim 1 wherein the administration terminal is one of the self-service library terminals.

14. The method of claim 1 wherein the step of transferring the configuration data from the administration terminal to the data storage memories of the multiple self-service library terminals comprises the following steps:
transferring the configuration data from a first self-service library terminal to a second self-service library terminal; and,
transferring the configuration data from the second self-service library terminal to a third self-service library terminal.

15. The method of claim 1 wherein the bit maps comprise first and second sets of bit maps representing screen displays in corresponding first and second different languages.

16. The method of claim 1 wherein the configuration data pertain to machine setup data.

17. The method of claim 1 wherein the configuration data pertain to language selection data.

18. The method of claim 1 wherein the configuration data pertain to bar code filters.

19. The method of claim 1 wherein the configuration data pertain to layout of receipts.

20. The method of claim 1 wherein the configuration data pertain to sends/selects.

21. The method of claim 1 wherein the configuration data pertain to upgrades.

22. The method of claim 1 wherein the configuration data pertain to diagnostics.

23. The method of claim 1 wherein the configuration data pertain to communication diagnostics.

24. The method of claim 1 wherein the configuration data pertain to a host interface.

25. The method of claim 1 further comprising the steps of projecting visible indicators onto article receiving areas of the multiple self-service library terminals and changing the visible indicator between first and second visible states.

26. A method of preparing configuration data for multiple self-service library terminals and of storing the configuration data in data storage memories of the multiple self-service library terminals, wherein each of the multiple self-service library terminals has a loan transaction user interface, and wherein the loan transaction user interfaces are configured by the configuration data, the method comprising:
a) preparing the configuration data on an administration terminal; and,
b) transferring the configuration data from the administration terminal to the data storage memories of the multiple self-service library terminals, wherein the configuration data includes bit maps.

27. The method of claim 26 wherein the bit maps comprise first and second sets of bit maps representing screen displays in corresponding first and second different languages.

28. The method of claim 26 wherein at least a first of the self-service library terminals has a video display memory, and wherein the method further comprises:
c) preparing the bit maps to represent screen displays;
d) storing the bit maps in the data storage memory of the first self-service library terminal; and,
e) transferring the bit maps from the data storage memory of the first self-service library terminal to the video display memory during interaction with at least one of the users.

29. The method of claim 26 wherein c) comprises preparing the bit maps by use of a screen display editor which is separate from the first self-service library terminal.

30. The method of claim 26 wherein c) comprises preparing the bit maps by use of a screen display editor which is part of the first self-service library terminal.

31. The method of claim 26 wherein e) comprises transferring the bit maps from the data storage memory to the video display memory in order to render fonts.

32. The method of claim 26 further comprising presenting the configuration data in screen displays to a user so as to lead the user through configuration of the self-service library terminal.

33. The method of claim 26 wherein the transferring of the configuration data from the administration terminal to the data storage memories of the multiple self-service library terminals comprises:
transferring the configuration data from the administration terminal to a first self-service library terminal; and,
transferring the configuration data from the first self-service library terminal to a second self-service library terminal.

34. The method of claim 26 wherein the configuration data pertain to language selection data.

35. The method of preparing configuration data for multiple self-service library terminals and of storing the configuration data in data storage memories of the multiple self-service library terminals, wherein the configuration data includes bit maps, wherein the multiple self-service library terminals are configured by the configuration data to interact with users during loan transactions, the method comprising:
a) preparing the configuration data on an administration terminal; and,
b) transferring the configuration data from the administration terminal to the data storage memories of the multiple self-service library terminals.

36. The method of claim 35 wherein at least a first of the self-service library terminals has a video display memory, and wherein the method further comprises:
c) preparing the bit maps to represent screen displays;
d) storing the bit maps in the data storage memory of the first self-service library terminal; and,
e) transferring the bit maps from the data storage memory of the first self-service library terminal to the video display memory during interaction with at least one of the users.

37. The method of claim 36 wherein e) comprises transferring the bit maps from the data storage memory to the video display memory in order to render fonts.

38. The method of claim 35 further comprising reading a code on an article placed on an article receiving area of one of the self-service library terminals.

39. The method of claim 38 wherein the code comprises a code on a circulating item.

40. The method of claim 38 wherein the code comprises a code on an identification card.

41. The method of claim 38 wherein the code comprises an idle indicator on the article receiving area.

42. The method of claim 35 wherein the configuration data comprises screen displays.

43. The method of claim 35 wherein the bit maps comprise first and second sets of bit maps representing screen displays in corresponding first and second different languages.

* * * * *

UNITED STATES PATENT AND TRADEMARK OFFICE
CERTIFICATE OF CORRECTION

PATENT NO. : 6,542,070 B1
DATED : April 1, 2003
INVENTOR(S) : Larson, Roger D.

It is certified that error appears in the above-identified patent and that said Letters Patent is hereby corrected as shown below:

Title page,
Item [57], ABSTRACT,
Line 11, "transaction" following "financial" should read -- transactions --.

Column 7,
Line 38, "t8" should read -- 18 --.
Line 40, "season" should read -- sensor --.
Line 60, "lick" should read -- link --.

Column 8,
Line 16, "wader" should read -- under --.
Line 49, delete "." following "state".
Line 49, "When" should read -- when --.
Line 54, "sad" should read -- and --.
Line 65, "eater" should read -- enter --.

Column 9,
Line 2, "places" should read -- placed --.
Line 20, "eater" should read -- enter --.

Column 10,
Line 25, "eater" should read -- enter --.

Column 13,
Lines 17 and 41, "sot" should read -- not --.
Line 66, "sad" should read -- and --.

UNITED STATES PATENT AND TRADEMARK OFFICE
CERTIFICATE OF CORRECTION

PATENT NO.    : 6,542,070 B1
DATED         : April 1, 2003
INVENTOR(S)   : Larson, Roger D.

It is certified that error appears in the above-identified patent and that said Letters Patent is hereby corrected as shown below:

<u>Column 36,</u>
Line 27, "The" should read -- A --.

Signed and Sealed this

Twentieth Day of April, 2004

JON W. DUDAS
*Acting Director of the United States Patent and Trademark Office*